US008974590B2

(12) United States Patent
Russell et al.

(10) Patent No.: US 8,974,590 B2
(45) Date of Patent: *Mar. 10, 2015

(54) TREATMENTS AND KITS FOR CREATING RENEWABLE SURFACE PROTECTIVE COATINGS

(75) Inventors: Jodi Lynn Russell, Pleasanton, CA (US); Felix Müller, Velbert (DE); Danielle Coutts, Pleasanton, CA (US); Ashot K. Serobian, Martinez, CA (US); Patrick Winter, Mülheim an der Ruhr (DE); Nicholas Pivonka, Pleasanton, CA (US)

(73) Assignee: The Armor ALL/STP Products Company, Danbury, CT (US)

( * ) Notice: Subject to any disclaimer, the term of this patent is extended or adjusted under 35 U.S.C. 154(b) by 565 days.

This patent is subject to a terminal disclaimer.

(21) Appl. No.: 13/343,514

(22) Filed: Jan. 4, 2012

(65) Prior Publication Data
US 2012/0171419 A1 Jul. 5, 2012

Related U.S. Application Data

(63) Continuation-in-part of application No. 12/941,669, filed on Nov. 8, 2010, now Pat. No. 8,110,037, which is a continuation of application No. 11/264,606, filed on Oct. 31, 2005, now Pat. No. 7,828,889, which is a continuation-in-part of application No. 10/740,346, filed on Dec. 18, 2003, now Pat. No. 7,083,828.

(51) Int. Cl.
C09D 1/00 (2006.01)
C09D 5/00 (2006.01)
B08B 17/06 (2006.01)
B82Y 30/00 (2011.01)
C09C 1/30 (2006.01)
C09D 5/16 (2006.01)
D06M 11/79 (2006.01)
D06M 23/08 (2006.01)
D06M 23/10 (2006.01)
B05D 5/00 (2006.01)

(52) U.S. Cl.
CPC . B08B 17/06 (2013.01); B05D 5/00 (2013.01); B08B 17/065 (2013.01); B82Y 30/00 (2013.01); C01P 2004/51 (2013.01); C01P 2004/62 (2013.01); C01P 2004/64 (2013.01); C09C 1/3081 (2013.01); C09D 1/00 (2013.01); C09D 5/008 (2013.01); C09D 5/1618 (2013.01); C09D 5/1681 (2013.01); D06M 11/79 (2013.01); D06M 23/08 (2013.01); D06M 23/10 (2013.01); D06M 2200/05 (2013.01)
USPC .......... 106/287.11; 106/490; 524/236

(58) Field of Classification Search
USPC .............. 106/287.11, 490; 524/236
See application file for complete search history.

(56) References Cited

U.S. PATENT DOCUMENTS

| 3,354,022 | A | 11/1967 | Dettre et al. |
|---|---|---|---|
| 5,017,322 | A | 5/1991 | Brooks |
| 5,599,489 | A | 2/1997 | Saiki et al. |
| 5,753,735 | A | 5/1998 | Okoroafor et al. |
| 5,902,636 | A | 5/1999 | Grabbe et al. |
| 5,959,005 | A | 9/1999 | Hartmann et al. |
| 6,051,672 | A | 4/2000 | Burns et al. |
| 6,352,581 | B1 | 3/2002 | Murjahn et al. |
| 6,537,665 | B2 | 3/2003 | O'Connor et al. |
| 6,593,417 | B1 | 7/2003 | Anderson et al. |
| 6,660,363 | B1 | 12/2003 | Barthlott |
| 6,683,126 | B2 | 1/2004 | Keller et al. |
| 6,706,798 | B2 | 3/2004 | Kobayashi et al. |
| 6,727,309 | B1 | 4/2004 | Paiva et al. |
| 6,800,354 | B2 | 10/2004 | Baumann et al. |
| 6,811,856 | B2 | 11/2004 | Nun et al. |
| 6,846,512 | B2 | 1/2005 | Rohrbaugh et al. |
| 6,852,389 | B2 | 2/2005 | Nun et al. |
| 6,855,759 | B2 | 2/2005 | Kudo et al. |
| 6,858,284 | B2 | 2/2005 | Nun et al. |
| 6,878,768 | B2 | 4/2005 | Tardivat et al. |

(Continued)

FOREIGN PATENT DOCUMENTS

| EP | 0909747 A1 | 4/1999 |
|---|---|---|
| EP | 0933388 B1 | 10/2002 |
| EP | 0832947 B1 | 5/2003 |
| WO | 2004037944 A1 | 5/2004 |

OTHER PUBLICATIONS

Aerosol Spray, EDinfomatics, pp. 1-2 (1999) (no month available).*

(Continued)

Primary Examiner — David M Brunsman
(74) Attorney, Agent, or Firm — Ohlandt, Greeley, Ruggiero & Perle, L.L.P.

(57) ABSTRACT

Methods, treatment compositions and treatment systems for forming a detachable and renewable coating on a receptive surface by a process of applying a treatment composition comprising a plurality of hydrophobically modified fumed silica particles colloidally dispersed in a volatile solvent; allowing the volatile solvent to evaporate; and thereby depositing a protective coating on the receptive surface consisting of a layer of the hydrophobically modified particles. The process provides a coating with dirt- and water-repellency properties that effectively shed dry particulate soils as well as water from the treated receptive surface. The methods, treatment compositions and treatment systems are useful in providing detachable coatings and treated articles featuring surface protective benefits including dirt- and water-repellency, self-cleaning with water, and easier cleaning benefits when applied to a variety of automotive and home surfaces, both interior and exterior.

41 Claims, 5 Drawing Sheets

(56) References Cited

U.S. PATENT DOCUMENTS

| | | | |
|---|---|---|---|
| 6,887,518 | B2 | 5/2005 | Barthel et al. |
| 6,955,834 | B2 | 10/2005 | Rohrbaugh et al. |
| 7,066,998 | B2 | 6/2006 | Rohrbaugh et al. |
| 7,083,828 | B2 * | 8/2006 | Muller et al. .......... 427/387 |
| 7,196,043 | B2 | 3/2007 | Valpey et al. |
| 7,267,728 | B2 | 9/2007 | Barger et al. |
| 7,452,605 | B2 | 11/2008 | Akamatsu et al. |
| 7,531,594 | B2 * | 5/2009 | Lin et al. .......... 524/487 |
| 7,531,598 | B2 * | 5/2009 | Muller et al. .......... 524/588 |
| 7,811,540 | B2 * | 10/2010 | Adams .......... 423/335 |
| 7,828,889 | B2 * | 11/2010 | Russell et al. .......... 106/287.11 |
| 7,858,104 | B2 | 12/2010 | Simonnet et al. |
| 7,901,731 | B2 * | 3/2011 | Russell et al. .......... 427/154 |
| 8,043,654 | B2 * | 10/2011 | Russell et al. .......... 427/154 |
| 8,110,037 | B2 * | 2/2012 | Russell et al. .......... 106/287.11 |
| 2002/0028288 | A1 | 3/2002 | Rohrbaugh et al. |
| 2002/0048679 | A1 | 4/2002 | Lohmer et al. |
| 2002/0150723 | A1 | 10/2002 | Oles et al. |
| 2002/0192472 | A1 | 12/2002 | Metz et al. |
| 2003/0007911 | A1 | 1/2003 | Le Claire et al. |
| 2003/0108716 | A1 | 6/2003 | Nun et al. |
| 2003/0134086 | A1 | 7/2003 | Nun et al. |
| 2003/0147932 | A1 | 8/2003 | Nun et al. |
| 2004/0154106 | A1 | 8/2004 | Oles et al. |
| 2004/0241456 | A1 | 12/2004 | Yamaki et al. |
| 2004/0242729 | A1 | 12/2004 | Baran, Jr. et al. |
| 2005/0103457 | A1 | 5/2005 | Nun et al. |
| 2005/0118433 | A1 | 6/2005 | Oles et al. |
| 2005/0118911 | A1 | 6/2005 | Oles et al. |
| 2005/0136217 | A1 | 6/2005 | Barthlott et al. |

OTHER PUBLICATIONS

Aerosil Fumed Siilica and Aeroxide Oxides for Toner, Teachnical Infomation TI 1222, Evonik (Aug. 2013).*
Technical Bulletin Pigments, The Use of Hydrophobic Aerosil in the Coatings Industry, Degussa, pp. 1-48, (May 1993).*
Untreated Furned Silica: Cab-o-Sil® HS-5, ° 2008 Cabot Corporation PDS-FS 1045.
"Sprayable Nano Car Finish, o/w-emulsion, 102310-6", Evonik Industries.
"Safety Data Sheet: Tegotop 105," Goldschmidt, 2067 10, pp. 1-6.
Tegotop® 105,"Novel concentrate for care products to create the Lotus-Effect®," Degussa, p. 13.
Gun'Ko, V.M., "Mechanism and Kenetics of Hexamethyldisilazane Reaction with a Furned Silica Surface," J. Coilloid Interface Sci., Aug. 1, 2000; vol. 228, No. 1, pp. 157-170, (abstract).
"Clean Surfaces With the Lotus Effect," Felix Muller and Patrick Winter Jorn. Com. Esp. Deterg. 34 92004, 103-112 (2004).

* cited by examiner

TREATMENTS AND KITS FOR CREATING RENEWABLE SURFACE PROTECTIVE COATINGS

CROSS REFERENCE TO RELATED APPLICATIONS

The present application is a continuation-in-part of application Ser. No. 12/941,669, filed Nov. 8, 2010 now U.S. Pat. No. 8,110,037, which is a continuation of U.S. application Ser. No. 11/264,606 filed Oct. 31, 2005, now U.S. Pat. No. 7,828,889, which is a continuation-in-part of U.S. application Ser. No. 10/740,346, filed Dec. 18, 2003, now U.S. Pat. No. 7,083,828, which is incorporated herein by reference in its entirety.

BACKGROUND OF THE INVENTION

1. Field of the Invention

The present invention relates to methods, treatment compositions and treatment systems for forming detachable and renewable protective coatings on a receptive surface by a process of applying to the receptive surface a treatment composition comprising a plurality of hydrophobic particles colloidally dispersed in a volatile solvent; allowing the volatile solvent to evaporate; and thereby depositing a coating on the receptive surface that provides dirt- and water-repellent properties, self-cleaning and easier next time cleaning benefits.

2. Description of the Related Art

The principle of self-cleaning coatings is well known in the literature. The effect generally requires two essential features: one being a hydrophobic surface or hydrophobic coating on a surface; and the second being some degree of surface roughness which combine to produce a structured "superhydrophobic" surface, exhibiting high water contact angles that act to readily repel water and shed adherent particulate soils with even small amounts of water alone, without requiring the use of typical cleaning agents.

The use of hydrophobic materials, such as perfluorinated polymers, to produce hydrophobic surfaces is known. A further development of these surfaces consists in structuring the surfaces in the μm to nm range. U.S. Pat. No. 5,599,489 discloses a process in which a surface can be rendered particularly repellent by bombardment with particles of appropriate size, followed by perfluorination.

A suitable combination of structure and hydrophobic properties permits even small amounts of water moving on the surface to entrain adherent dirt particles and clean the surface (see, for example, U.S. Pat. Nos. 6,660,363; 3,354,022). The prior art of EP-B-0 933 388 requires an aspect ratio >1 and a surface energy of less than 20 mN/m for these self-cleaning surfaces; the aspect ratio being defined here as the quotient which is the ratio of the height of the structure to its width. The abovementioned criteria are typically found in nature, for example, in the *lotus* leaf. The surface of the plant is composed of a hydrophobic waxy material and has elevations separated by a few μm. Water droplets substantially contact only the peaks of the elevations. There are many descriptions in the literature of water-repellent surfaces of this type.

EP-A-0 909 747 teaches a process for generating a self-cleaning surface. The surface has hydrophobic elevations whose height is from 5 to 200 μm. A surface of this type is produced by applying a dispersion of pulverulent particles and of an inert material in a siloxane solution and then curing. The structure-forming particles are therefore secured to the surface by way of an auxiliary medium.

U.S. Pat. Pub. No. 2005/0136217A1 concludes that it is technically possible to render the surfaces of articles artificially self-cleaning. The surface structures necessary for this purpose, which are composed of elevations and depressions, have a separation in the range from 0.1 to 200 μm between the elevations of the surface structures, and have an elevation height in the range from 0.1 to 100 μm. The materials used for this purpose are composed of hydrophobic polymers or of lastingly hydrophobized material. Release of the particles from the carrier matrix has to be prevented.

This principle has been borrowed from nature. Small contact surfaces lower the level of van der Waals interaction responsible for adhesion to flat surfaces with low surface energy. For example, the leaves of the *lotus* plant have elevations composed of a wax, and these reduce the area of contact with water.

Processes for producing these structured surfaces are likewise known. Besides the use of a master template to mold these structures in fill-in detail by an injection molding or embossing processes, there are also known processes that utilize the application of particles to a surface. This is disclosed, for example, in U.S. Pat. No. 5,599,489.

Recently, attempts have been made to provide self-cleaning surfaces on textiles. It has been found that self-cleaning surfaces can be generated by applying fine-particle $SiO_2$ (AEROSIL®) to textiles. In this process, the AEROSIL® materials are bonded into the polymer matrix of the textile fiber, using a solvent that partially dissolves the fiber to effect adhesion.

U.S. Pat. Pub. No. 2004/0154106A1 describes polymer fibers with self-cleaning surfaces. In the prior art disclosure, the self-cleaning surface is obtained by exposure to a solvent, which comprises structure-forming particles, using the solvent to solvate the surface of the polymer fibers, adhesion of the structure-forming particles to the solvated surface, and removing the solvent. The disadvantage of this process is that, during processing of the polymer fibers (spinning, knitting, etc.), the structure-forming particles, and therefore the structure that renders the surface self-cleaning, can become damaged or sometimes lost entirely, the result being that the self-cleaning effect is also lost.

U.S. Pat. Pub. No. 2005/0103457A1 describes textile sheets with a self-cleaning and water-repellent surface composed of at least one synthetic and/or natural textile base material A, and of an artificial, at least to some extent, hydrophobic surface with elevations and depressions composed of particles that have been securely bonded to the base material A without adhesives, resins, or coatings. The hydrophobic surfaces are obtained by treating the base material A with at least one solvent that comprises the undissolved particles, and removing the solvent, whereupon at least some of the particles become securely bonded to the surface of the base material A. However, the disadvantage of this prior art process is the very complicated finishing of the textile surfaces. Moreover, this prior art process requires precise matching of the solvent to the base material of the textiles. However, in clothing there are generally mixed fabrics present, and this matching therefore becomes more complicated. If the matching of the solvents is not precise, the result can be irreparable damage to parts of the clothing. The textile surfaces therefore have to be treated prior to tailoring.

U.S. Pat. No. 6,800,354 describes substrates with a self-cleaning surface and a process for a permanent coating of the substrates providing the self-cleaning properties. The process includes the following steps: (1) coating of the surface with a composition containing structure forming particles and a layer forming material; (2) forming a cohesive layer that fixes the structure forming particles firmly to the surface, and then; (3) hydrophobizing the structured surface with a hydrophobizing agent which adheres firmly to the structured surface. The structure forming particles preferably have an average diameter of less than 100 nm, more preferably in the range between 5 and 50 nm. In an example, a float glass with a transparent self-cleaning surface was produced by coating the glass with a composition by means of a screen printing process using a 100 T screen. The composition included 0.5 wt. % boric acid and 4 wt. % pyrogenic silica with an average diameter of the primary particles of 12 nm in a water friendly medium. After drying, the coating was shock fired at 660° C. for a duration of 4 min. The hydrophobization of the structured stoved surface was carried out by introducing an ethanolic solution of tridecafluorooctyltriethoxysilane over the surface and curing at an elevated temperature. The disadvantages of the described method is its multiple-step nature and the requirement of a high temperature process. In addition, it results in a permanent coating, which cannot be easily detached by a simple cleaning procedure.

All of these coatings are characterized in that they are intended to be applied permanently to the articles, and thus have the disadvantage that they cannot be simply removed and reapplied in the event of impairment by scratching, discoloration or any other damage to the coating, surface or coated surface structure. If this type of damage occurs, the article either has to be freed from the surface structure by a complicated method and retreated, or has to be disposed of if its appearance is no longer acceptable.

U.S. Pat. Pub. No. 2005/0136217A1 describes a process for producing detachable coatings with dirt- and water-repellent properties. These coatings of the prior art are produced by spray-application of hydrophobic alcohols, such as nonacosan-10-ol, or of alkanediols, such as nonacosane-5,10-diol, or of waxes. The coatings of U.S. Pat. Pub. No. 2005/0136217A1 can be removed from articles by strong mechanical forces, e.g. scratching, brushing, or high-pressure water treatment, or by treatment with water which comprises detergents that disperse some of the structure-formers. A disadvantage of the prior art coatings disclosed in U.S. Pat. Pub. No. 2005/0136217A1 is the strong forces needed for mechanical removal of the coating. The use of strong forces for the mechanical removal of the coating runs the risk that when the coating is removed the surface of the article itself will also be damaged. Treatment with water that comprises detergents can likewise lead to damage to the article, depending on its nature.

U.S. Pat. Pub. No. 2004/0213904 describes a process for producing detachable dirt- and water-repellent surface coatings on articles, wherein during the coating process, hydrophobic particles are applied to the surface of the articles, thus generating a structure with elevations on the surface of the articles that has dirt- and water-repellent properties, which comprises suspending the hydrophobic particles in a solution of an alkyl-modified silicone wax in a highly volatile siloxane, applying this suspension to at least one surface of an article, and then removing the highly volatile siloxane. In this document examples of compositions for producing those surface coatings are given and procedures how they are made. The compositions are dispersions of fumed silica particles present at 1 to 2 wt. % of the total weight of the dispersion in a solution of an alkyl-modified silicone wax present at 0.5 wt. % in decamethylcyclopentasiloxane. They are produced by dissolving the alkyl-modified silicone wax in decamethylcyclopentasiloxane and then dispersing the fumed silica in this solution with vigorous stirring. Although the therein described process for producing detachable dirt- and water-repellent surface coatings proved to provide better results with respect to run-off behavior of water droplets and gloss values on various surfaces compared to processes known from the prior state of the art, it still has some disadvantages. Especially on high gloss surfaces such as glass, brushed metal and varnished or painted surfaces the coating is easily perceptible as a grayish or hazy layer by the naked eye which is not acceptable for many applications.

The various approaches employed in the prior art are directed to modification of the targeted surfaces to have sufficient roughness to provide a coating capable of exhibiting the *Lotus* effect, and generally produce non-transparent coatings and films that suffer from poor visual appearance, particularly on glossy, shiny and/or highly reflective surfaces. Further, approaches that provide protective coatings with improved visual appearances rely on fixatives to firmly attach and/or embed materials onto the treated surface, accompanied by chemical, physical and/or thermal processes required to produce them and resulting in permanent and non-renewable treated articles.

It is therefore an object of the present invention to provide a method, treatment compositions and treatment systems which can produce essentially transparent protective surface coatings on a wide variety of materials and form treated articles providing dirt- and water-repellency and related surface protective benefits.

It is therefore an object of the present invention to provide a method, treatment compositions and treatment systems which can produce detachable and renewable dirt- and water-repellent surface coatings on a receptive surface, and which can also treat articles to give a relatively durable coating, which, however, can be detached using simple means, without requiring any chemical or physical modification or change to the underlying substrate, which may then be readily restored to its pristine initial state when desired.

It is a further object of the present invention to provide a method, treatment compositions and treatment systems which can provide receptive surfaces and treated articles with transparent, detachable and renewable protective surface coatings formable on a wide variety of materials and substrates.

It is a further object of the present invention to provide a method, treatment compositions and treatment systems which can provide receptive surfaces with transparent, detachable and renewable protective surface coatings, which can be easily renewed by removing the coatings by simple means and reapplying the coatings, on a wide variety of materials and substrates.

It is yet a further object of the present invention to provide a method, treatment compositions and treatment systems which can provide receptive surfaces with transparent, detachable and renewable protective surface coatings on a wide variety of materials which thereby exhibit dirt- and water-repellency, self-cleaning and easier next time cleaning benefits.

It is yet another object of the present invention to provide a treatment system for applying and forming a protective coating on a receptive surface using an applicator for applying a treatment composition for forming an essentially transparent, detachable and renewable protective coating on a receptive surface.

SUMMARY OF THE INVENTION

It was surprisingly found that detachable and renewable protective coatings which are substantially transparent can be applied to receptive surfaces by use of a treatment composition containing hydrophobically modified silica particles, provided that said treatment composition has been made by diluting, optionally while adding other functional ingredients, an initial process composition, which, in turn, has been produced at a high concentration of the silica, in the presence of an optional, yet preferable disilazane derivative, and under high shear conditions. It was further surprisingly found that these protective coatings can exhibit good durability, even in the absence of conventional durability agents.

In accordance with the above objects and those that will be mentioned and will become apparent below, one aspect of the present invention is a method of forming a detachable and renewable protective coating on a receptive surface comprising the steps of (a) applying a treatment composition to said receptive surface, said treatment composition comprising a plurality of hydrophobically modified fumed silica particles (to be described in greater detail hereinbelow) colloidally dispersed in a volatile solvent; (b) allowing said volatile solvent to evaporate from said receptive surface; and thereby depositing said protective coating on said receptive surface, wherein said protective coating provides dirt- and water-repellency to said receptive surface. The protective coating comprises a non-smooth coating on the receptive surface at least after the treatment composition has been applied to the receptive surface and has substantially dried or set. The non-smooth coating on the receptive surface includes valleys and peaks and an average height between the valleys and peaks of about 1-2500 nm. The detachable coating can be substantially transparent and result in a change of less than 3.0 Delta E units to the receptive surface measured before and after deposition of the coating.

In accordance with the above objects and those that will be mentioned and will become apparent below, one aspect of the present invention is a method of forming a protective coating on a receptive surface comprising: (a) applying a treatment composition for coating a receptive surface to said receptive surface, said treatment composition comprising a plurality of particles colloidally dispersed in a volatile solvent; (b) allowing said volatile solvent to evaporate from said receptive surface; and (c) depositing a detachable and renewable protective coating on said receptive surface, wherein said protective coating provides dirt- and water-repellency to said receptive surface, wherein said particles comprise hydrophobically modified fumed silica particles having a median size of between 100 and 4,000 nanometers. The protective coating comprises a non-smooth coating on the receptive surface at least after the treatment composition has been applied to the receptive surface and has substantially dried or set. The non-smooth coating on the receptive surface includes valleys and peaks and an average height between the valleys and peaks of about 1-2500 nm. The protective coating can be substantially transparent.

In accordance with the above objects and those that will be mentioned and will become apparent below, another aspect of the present invention is a method of forming a protective coating on a receptive surface comprising application of a treatment composition comprising: (A) a plurality of hydrophobically modified fumed silica particles obtained by a process comprising the steps of: (a) providing a pre-dispersion of silica particles comprising hydrophobically modified fumed silica particles by stirring said silica particles into a solution comprising: (i) at least one compound of general formula (I) or (II):

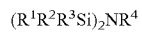
(R$^1$R$^2$R$^3$Si)$_2$NR$^4$      (I)

—(R$^1$R$^2$SiNR$^4$)$_m$-(cyclo)      (II)

wherein R$^1$, R$^2$ and R$^3$ can be the same or different, and are independently selected from hydrogen, straight or branched, saturated or unsaturated alkyl chain groups of from 1 to 8 carbon atoms, or aromatic groups of from 6 to 12 carbon atoms, R$^4$ is hydrogen or a methyl group, and m is from 3 to 8; and (ii) a first volatile solvent or solvent mixture selected from straight or branched, linear or cyclic aliphatic, or aromatic hydrocarbons with 2 to 14 carbon atoms, monovalent linear or branched alcohols with 1 to 6 carbon atoms, ketones or aldehydes with 1 to 6 carbon atoms, ethers or esters with 2 to 8 carbon atoms, or linear or cyclic polydimethylsiloxanes with 2 to 10 dimethylsiloxy units, wherein the concentration of the hydrophobically modified fumed silica particles in the pre-dispersion results in from 10 percent to about 30 percent by weight of the total weight of the pre-dispersion, and wherein the concentration of any one of compounds (I) and/or (II) is between 0.1 and 10 percent by weight of the total weight of the pre-dispersion; and (b) mixing with a disperser said pre-dispersion to provide a process composition while reducing said silica particles to a median particle size in the range between 100 and 4000 nanometers; (B) optionally, a suspending agent; (C) optionally, a functional adjunct; and (D) optionally, a propellant.

In accordance with the above objects and those that will be mentioned and will become apparent below, yet another aspect of the present invention is a treatment composition for forming a protective coating on a receptive surface comprising: (a) a plurality of particles, wherein said particles comprise hydrophobically modified fumed silica particles in the form of silica particle agglomerates; and (b) a volatile solvent; (c) optionally, a suspending agent; and (d) optionally, a propellant; wherein said treatment composition when applied to said receptive surface deposits a detachable and renewable protective coating on said receptive surface, wherein said protective coating provides dirt- and water-repellency to said receptive surface. The protective coating comprises a non-smooth coating on the receptive surface at least after the treatment composition has been applied to the receptive surface and has substantially dried or set. The non-smooth coating on the receptive surface includes valleys and peaks and an average height between the valleys and peaks of about 1-2500 nm. The coating can be substantially transparent and result in a change of less than 3.0 Delta E units to the receptive surface measured before and after deposition of the coating.

In accordance with the above objects and those that will be mentioned and will become apparent below, yet another aspect of the present invention is a treatment composition for forming a protective coating on a receptive surface comprising: (a) a plurality of particles, wherein said particles comprise hydrophobically modified fumed silica particles having a median size of between 100 and 4,000 nanometers; and (b) a volatile solvent; (c) optionally, a suspending agent; and (d) optionally, a propellant; wherein said treatment composition when applied to said receptive surface deposits a detachable and renewable protective coating on said receptive surface, wherein said protective coating provides dirt- and water-repellency to said receptive surface. The protective coating comprises a non-smooth coating on the receptive surface at least after the treatment composition has been applied to the receptive surface and has substantially dried or set. The non-smooth coating on the receptive surface includes valleys and peaks and an average height between the valleys and peaks of about 1-2500 nm. The coating can be substantially transparent and result in a change of less than 3.0 Delta E units to the receptive surface measured before and after deposition of the coating.

In accordance with the above objects and those that will be mentioned and will become apparent below, yet a further aspect of the present invention is a treatment composition for forming a protective coating on a receptive surface comprising a plurality of particles comprising: (1) a colloidal dispersion of hydrophobically modified fumed silica particles processed by intensively mixing in the presence of at least one compound of the general formulas (I) and (II)

$$(R^1R^2R^3Si)_2NR^4 \tag{I}$$

$$—(R^1R^2SiNR^4)_m\text{-(cyclo)} \tag{II}$$

wherein $R^1$, $R^2$, and $R^3$ can be the same or different and are independently hydrogen, straight or branched, saturated or unsaturated alkyl chain groups of from 1 to 8 carbon atoms, optionally substituted with flourine atoms, aromatic groups of from 6 to 12 carbon atoms, optionally substituted with flourine atoms, $R^4$ is hydrogen or a methyl group, m is from 3 to 8; and (2) optionally in the presence of at least one durability agent selected from the group of alkoxysilanes of the general formula (III)

$$R^5_a Si(OR^6)_{4-a} \tag{III}$$

wherein $R^5$ is a straight or branched, saturated or unsaturated alkyl chain group of from 1 to 16 carbon atoms, optionally substituted with flourine atoms, hydroxyl, amino, mercapto, or epoxy groups, $R^6$ is an alkyl chain of 1 to 2 carbon atoms, a is 1 or 2; or selected form the group of alkyl-modified linear or cyclic polydimethylsiloxanes of the general formulas (IV) and (V)

$$(CH_3)_3SiO[(CH_3)_2SiO]_n[(CH_3)R^7SiO]_oSi(CH_3)_3 \tag{IV}$$

$$—[(CH_3)_2SiO]_p[(CH_3)R^7SiO]_q\text{-(cyclo)} \tag{V}$$

wherein $R^7$ is an alkyl chain group of from 6 to 24 carbon atoms, n is from 1 to 100, o from 1 to 40, p from 0 to 7, q from 1 to 7, provided that the sum (p+q) is at least 3; and a volatile solvent selected from the group of aromatic, branched, cyclic, and/or linear hydrocarbons with 2 to 14 carbon atoms, optionally substituted with flourine or chlorine atoms, monovalent linear or branched alcohols with 1 to 6 carbon atoms, ethers or esters with 2 to 8 carbon atoms, linear or cyclic polydimethylsiloxanes with 2 to 10 dimethylsiloxy units, and mixtures thereof; and optionally, a suspending agent; and optionally, a propellant; wherein said treatment composition when applied to said receptive surface deposits a detachable and renewable protective coating on said receptive surface, wherein said protective coating provides dirt- and water-repellency to said receptive surface. The coating can be substantially transparent and result in a change of less than 3.0 Delta E units to the receptive surface measured before and after deposition of the coating.

In accordance with the above objects and those that will be mentioned and will become apparent below, yet another aspect of the present invention is a treatment system for applying and forming a protective coating on a receptive surface comprising: (A) an applicator; and (B) a treatment composition for forming a protective coating on said receptive surface comprising: (i) a plurality of particles, wherein said particles comprise hydrophobically modified fumed silica particles in the form of silica particle agglomerates; and (ii) a volatile solvent; and (iii) optionally, a suspending agent; (iv) optionally, a propellant; and (C) optionally a drying article; wherein said treatment composition when applied to said receptive surface deposits a detachable and renewable protective coating on said receptive surface, wherein said protective coating provides dirt- and water-repellency to said receptive surface. The protective coating comprises a non-smooth coating on the receptive surface at least after the treatment composition has been applied to the receptive surface and has substantially dried or set. The non-smooth coating on the receptive surface includes valleys and peaks and an average height between the valleys and peaks of about 1-2500 nm. The coating can be substantially transparent and result in a change of less than 3.0 Delta E units to the receptive surface measured before and after deposition of the coating.

In accordance with the above objects and those that will be mentioned and will become apparent below, yet another aspect of the present invention is a method of forming a detachable and renewable protective coating on a receptive surface comprising the steps of: (a) applying a treatment composition to said receptive surface, said treatment composition comprising a plurality of hydrophobically modified fumed silica particles colloidally dispersed in a volatile solvent; (b) allowing said volatile solvent to evaporate from said receptive surface; and (c) thereby depositing said protective coating on said receptive surface, wherein said protective coating provides dirt- and water-repellency to said receptive surface. The protective coating comprises a non-smooth coating on the receptive surface at least after the treatment composition has been applied to the receptive surface and has substantially dried or set. The non-smooth coating on the receptive surface includes valleys and peaks and an average height between the valleys and peaks of about 1-2500 nm. The detachable coating can be substantially transparent and result in a change of less than 250 Delta Haze units to the receptive surface measured before and after deposition of the coating, as measured by the Chrome Test.

In accordance with the above objects and those that will be mentioned and will become apparent below, yet another aspect of the present invention is a protective coating on a receptive surface comprising a plurality of hydrophobically modified fumed silica particles obtained by a process comprising the steps of: (a) providing a pre-dispersion of silica particles comprising hydrophobically modified fumed silica particles by stirring said silica particles into a solution comprising: (i) at least one compound of general formula (I) or (II)

$$(R^1R^2R^3Si)_2NR^4 \tag{I}$$

$$—(R^1R^2SiNR^4)_m\text{-(cyclo)} \tag{II}$$

wherein $R^1$, $R^2$ and $R^3$ can be the same or different, and are independently selected from hydrogen, straight or branched, saturated or unsaturated alkyl chain groups of from 1 to 8 carbon atoms, or aromatic groups of from 6 to 12 carbon atoms, $R^4$ is hydrogen or a methyl group, and m is from 3 to 8; and (ii) a first volatile solvent or solvent mixture selected from straight or branched, linear or cyclic aliphatic, or aromatic hydrocarbons with 2 to 14 carbon atoms, monovalent linear or branched alcohols with 1 to 6 carbon atoms, ketones or aldehydes with 1 to 6 carbon atoms, ethers or esters with 2 to 8 carbon atoms, or linear or cyclic polydimethylsiloxanes with 2 to 10 dimethylsiloxy units, wherein the concentration of the hydrophobically modified fumed silica particles in the pre-dispersion results in from 10 percent to about 30 percent by weight of the total weight of the pre-dispersion, and wherein the concentration of any one of compounds (I) and/or (II) is between 0.1 and 10 percent by weight of the total weight of the pre-dispersion; and (b) mixing with a disperser said pre-dispersion to provide a process composition while reducing said silica particles to a median particle size in the range between 100 and 4000 nanometers; and (c) optionally adding a durability agent to said solution at step (a) and/or with step (b), wherein said durability agent is selected from alkoxysilanes of general formula (III)

$$R^5_a Si(OR^6)_{4-a} \tag{III}$$

wherein $R^5$ is a straight or branched, saturated or unsaturated alkyl chain group of from 1 to 16 carbon atoms, optionally substituted with fluorine atoms, hydroxyl, amino, mercapto, or epoxy groups, $R^6$ is an alkyl chain of 1 to 2 carbon atoms, and a is 1 or 2; or alkyl-modified linear or cyclic polydimethylsiloxanes of general formulas (IV) or (V)

$$(CH_3)_3SiO[(CH_3)_2SiO]_n[(CH_3)R^7SiO]_oSi(CH_3)_3 \quad (IV)$$

$$—[(CH_3)_2SiO]_p[(CH_3)R^7SiO]_q\text{-(cyclo)} \quad (V)$$

wherein $R^7$ is an alkyl chain group of from 6 to 24 carbon atoms, n is from 1 to 100, o is from 1 to 40, p from 0 to 7, and q is from 1 to 7, provided that the sum (p+q) is at least 3, to the dispersion as obtained in step (b) or step (c), whereby the concentration of any one of the durability agents (III) and/or (IV) and/or (V) is between 0.01 and 10 percent by weight of the total weight of the process composition; wherein said protective coating is detachable and renewable, wherein said protective coating provides dirt- and water-repellency to said receptive surface. The detachable coating can be substantially transparent and result in a change of less than 3.0 Delta E units to the receptive surface measured before and after deposition of the coating.

In accordance with the above objects and those that will be mentioned and will become apparent below, yet another aspect of the present invention is a treated article comprising: (1) a substrate bearing at least one receptive surface; and (2) a detachable and renewable protective coating deposited onto said receptive surface, wherein said protective coating comprises a plurality of hydrophobically modified fumed silica particles obtained by a process comprising the steps of: (a) providing a pre-dispersion of silica particles comprising hydrophobically modified fumed silica particles by stirring said silica particles into a solution comprising: (i) at least one compound of general formula (I) or (II):

$$(R^1R^2R^3Si)_2NR^4 \quad (I)$$

$$—(R^1R^2SiNR^4)_m\text{-(cyclo)} \quad (II)$$

wherein $R^1$, $R^2$ and $R^3$ can be the same or different, and are independently selected from hydrogen, straight or branched, saturated or unsaturated alkyl chain groups of from 1 to 8 carbon atoms, or aromatic groups of from 6 to 12 carbon atoms, $R^4$ is hydrogen or a methyl group, and m is from 3 to 8; and (ii) a first volatile solvent or solvent mixture selected from straight or branched, linear or cyclic aliphatic, or aromatic hydrocarbons with 2 to 14 carbon atoms, monovalent linear or branched alcohols with 1 to 6 carbon atoms, ketones or aldehydes with 1 to 6 carbon atoms, ethers or esters with 2 to 8 carbon atoms, or linear or cyclic polydimethylsiloxanes with 2 to 10 dimethylsiloxy units, wherein the concentration of the hydrophobically modified fumed silica particles in the pre-dispersion results in from 10 percent to about 30 percent by weight of the total weight of the pre-dispersion, and wherein the concentration of any one of compounds (I) and/or (II) is between 0.1 and 10 percent by weight of the total weight of the pre-dispersion; and (b) mixing with a disperser said pre-dispersion to provide a process composition while reducing said silica particles to a median particle size in the range between 100 and 4000 nanometers; and (c) optionally adding a durability agent to said solution at step (a) and/or with step (b), wherein said durability agent is selected from alkoxysilanes of general formula (III)

$$R^5_aSi(OR^6)_{4-a} \quad (III)$$

wherein $R^5$ is a straight or branched, saturated or unsaturated alkyl chain group of from 1 to 16 carbon atoms, optionally substituted with fluorine atoms, hydroxyl, amino, mercapto, or epoxy groups, $R^6$ is an alkyl chain of 1 to 2 carbon atoms, and a is 1 or 2; or alkyl-modified linear or cyclic polydimethylsiloxanes of general formulas (IV) or (V)

$$(CH_3)_3SiO[(CH_3)_2SiO]_n[(CH_3)R^7SiO]_oSi(CH_3)_3 \quad (IV)$$

$$—[(CH_3)_2SiO]_p[(CH_3)R^7SiO]_q\text{-(cyclo)} \quad (V)$$

wherein $R^7$ is an alkyl chain group of from 6 to 24 carbon atoms, n is from 1 to 100, o is from 1 to 40, p from 0 to 7, and q is from 1 to 7, provided that the sum (p+q) is at least 3, to the dispersion as obtained in step (b) or step (c), whereby the concentration of any one of the durability agents (III) and/or (IV) and/or (V) is between 0.01 and 10 percent by weight of the total weight of the process composition; and wherein said protective coating provides dirt- and water-repellency to said receptive surface. The detachable coating can be substantially transparent and result in a change of less than 3.0 Delta E units to the receptive surface measured before and after deposition of the coating.

Further features and advantages of the present invention will become apparent to those of ordinary skill in the art in view of the detailed description of preferred embodiments below, when considered together with the attached drawings and claims.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Figure 1:
FIG. 1 is a scanning electron micrograph (SEM) image of a conventional *Lotus* effect coating formulation obtained according to the methods described in U.S. Pat. Pub. No. 2004/0213904, corresponding to comparative process example H diluted to 0.75 wt. % as active silica with Dow Corning DC 245 fluid (Comparative Example 21), and applied to an automotive test panel using a PreVal Sprayer according to the test methods described herein below.

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

It must be noted that, as used in this specification and the appended claims, the singular forms "a," "an" and "the" include plural referents unless the content clearly dictates otherwise. Thus, for example, reference to a "surfactant" includes two or more such surfactants.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

In the application, effective amounts are generally those amounts listed as the ranges or levels of ingredients in the descriptions, which follow hereto. Unless otherwise stated, amounts listed in percentage ("%'s") are in weight percent as indicated as "wt. %", (based on 100 wt. % active) of the total composition or formulation described.

As used herein, the term "particle" is intended to include any discrete particle, primary particle, aggregate and/or aggregated collection of primary particles, agglomerate and/or agglomerated collection of aggregates, and/or colloidally dispersed particles, aggregates, agglomerates and/or loose assemblies of particulate materials, and combinations thereof.

It is noted that particle size determination provides an average of particle sizes, generally calculated as a median particle size, of a selected distribution obtained by measuring a sample of material either in the form of an aliquot of a liquid composition, and/or a sample of material in-situ as present as an applied surface coating on a surface. Measurement techniques to determine the particle size differ on the nature of the material, providing for some variability in measured particle size distributions, mean, median and average particle size parameters, and the like. Measured particle sizes thus typically indicate an average value and distribution of all the various particulate structures present in the measured system, providing an average particle size whose value reflects some proportional contribution from all primary, aggregated and/or agglomerated particulate structures present.

The median particle size (mass median particle diameter), also referred to as "D50", is the particle diameter that divides the frequency distribution in half; fifty percent of the mass has particles with a larger diameter, and fifty percent of the mass has particles with a smaller diameter. According to this definition, the median particles size as such does not specify whether the particle size distribution curve is monomodal, bimodal or multimodal. The median particle size is generally determinable from a graphic plot of the cumulative integrated area under the curve obtained from a particle size histogram analysis of the respective system measured.

"Specific surface area" means the surface area per unit weight of a particulate solid, e.g. as determined by the B.E.T. (Brunauer, Emmett, and Teller) method.

As stated above, one aspect of the invention is a method of forming a detachable and renewable protective coating on a receptive surface comprising the steps of: (a) applying a treatment composition to said receptive surface, said treatment composition comprising a plurality of hydrophobically modified fumed silica particles colloidally dispersed in a volatile solvent; (b) allowing said volatile solvent to evaporate from said receptive surface; and (c) thereby depositing said protective coating on said receptive surface, wherein said protective coating provides dirt- and water-repellency to said receptive surface. The protective coating comprises a non-smooth coating on the receptive surface at least after the treatment composition has been applied to the receptive surface and has substantially dried or set. The non-smooth coating on the receptive surface includes valleys and peaks and an average height between the valleys and peaks of about 1-2500 nm. The detachable coating can be substantially transparent and result in a change of less than 3.0 Delta E units to the receptive surface measured before and after deposition of the coating.

In one embodiment, the method employs a treatment composition comprising (A) a plurality of hydrophobically modified fumed silica particles obtained by a process comprising the steps of: (a) providing a pre-dispersion of silica particles comprising hydrophobically modified fumed silica particles by stirring said silica particles into a solution comprising: (i) at least one compound of general formula (I) or (II):

$$(R^1R^2R^3Si)_2NR^4 \tag{I}$$

$$-(R^1R^2SiNR^4)_m\text{-(cyclo)} \tag{II}$$

wherein $R^1$, $R^2$ and $R^3$ can be the same or different, and are independently selected from hydrogen, straight or branched, saturated or unsaturated alkyl chain groups of from 1 to 8 carbon atoms, or aromatic groups of from 6 to 12 carbon atoms, $R^4$ is hydrogen or a methyl group, and m is from 3 to 8, and (ii) a first volatile solvent or solvent mixture selected from straight or branched, linear or cyclic aliphatic, or aromatic hydrocarbons with 2 to 14 carbon atoms, monovalent linear or branched alcohols with 1 to 6 carbon atoms, ketones or aldehydes with 1 to 6 carbon atoms, ethers or esters with 2 to 8 carbon atoms, or linear or cyclic polydimethylsiloxanes with 2 to 10 dimethylsiloxy units, wherein the concentration of the hydrophobically modified fumed silica particles in the pre-dispersion results in from 10 percent to about 30 percent by weight of the total weight of the pre-dispersion, and wherein the concentration of any one of compounds (I) and/or (II) is between 0.1 and 10 percent by weight of the total weight of the pre-dispersion; and then (b) mixing with a disperser said pre-dispersion to provide a process composition while reducing said silica particles to a median particle size in the range between 100 and 4000 nanometers, and further including (B) an optional suspending agent, (C) an optional functional adjunct and (D) an optional propellant.

In yet another embodiment, the process solution used to obtain the inventive treatment compositions of the present invention further comprises at least one durability agent selected from alkoxysilanes of general formula (III)

$$R^5_a Si(OR^6)_{4-a} \tag{III}$$

wherein $R^5$ is a straight or branched, saturated or unsaturated alkyl chain group of from 1 to 16 carbon atoms, optionally substituted with fluorine atoms, hydroxyl, amino, mercapto, or epoxy groups, $R^6$ is an alkyl chain of 1 to 2 carbon atoms, and a is 1 or 2; or alkyl-modified linear or cyclic polydimethylsiloxanes of general formula (IV) or (V)

$$(CH_3)_3SiO[(CH_3)_2SiO]_n[(CH_3)R^7SiO]_oSi(CH_3)_3 \tag{IV}$$

$$-[(CH_3)_2SiO]_p[(CH_3)R^7SiO]_q\text{-(cyclo)} \tag{V}$$

wherein $R^7$ is an alkyl chain group of from 6 to 24 carbon atoms, n is from 1 to 100, o is from 1 to 40, p from 0 to 7, and q is from 1 to 7, provided that the sum (p+q) is at least 3; whereby the concentration of any one of the durability agents (III) and/or (IV) and/or (V) is between 0.1 and 10 percent by weight of the total weight of the pre-dispersion.

In an alternative embodiment, the method can further comprise (c) diluting the process composition with a second volatile solvent or solvent mixture selected from straight or branched, linear or cyclic aliphatic, or aromatic hydrocarbons with 2 to 14 carbon atoms, optionally substituted with fluorine or chlorine atoms, monovalent linear or branched alcohols with 1 to 6 carbon atoms, ketones or aldehydes with 1 to 6 carbon atoms, ethers or esters with 2 to 8 carbon atoms, or linear or cyclic polydimethylsiloxanes with 2 to 10 dimethylsiloxy units to a final concentration of the hydrophobically modified fumed silica particles of minimum 5 percent by weight of the total weight of the process composition.

In another alternative embodiment, the method can further be augmented by adding a durability agent to the process composition wherein said durability agent is selected from alkoxysilanes of general formula (III)

$$R^5{}_a Si(OR^6)_{4-a} \quad (III)$$

wherein $R^5$ is a straight or branched, saturated or unsaturated alkyl chain group of from 1 to 16 carbon atoms, optionally substituted with fluorine atoms, hydroxyl, amino, mercapto, or epoxy groups, $R^6$ is an alkyl chain of 1 to 2 carbon atoms, and a is 1 or 2; or alkyl-modified linear or cyclic polydimethylsiloxanes of general formulas (IV) or (V)

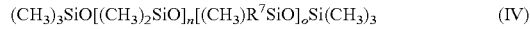
$$(CH_3)_3SiO[(CH_3)_2SiO]_n[(CH_3)R^7SiO]_oSi(CH_3)_3 \quad (IV)$$

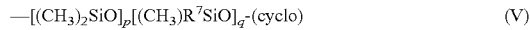
$$-[(CH_3)_2SiO]_p[(CH_3)R^7SiO]_q\text{-(cyclo)} \quad (V)$$

wherein $R^7$ is an alkyl chain group of from 6 to 24 carbon atoms, n is from 1 to 100, o is from 1 to 40, p from 0 to 7, and q is from 1 to 7, provided that the sum (p+q) is at least 3, to the dispersion as obtained in step (b) or step (c), whereby the concentration of any one of the durability agents (III) and/or (IV) and/or (V) is between 0.01 and 10 percent by weight of the total weight of the process composition.

In yet another embodiment of the present invention, the hydrophobically modified fumed silica particles have a median particle size of between 100 and 4,000 nanometers, and alternatively have a median particle size of between 100 and 3,000 nanometers, and yet alternatively have a median particle size of between 100 and 1,000 nanometers.

In one embodiment of the present invention, the method of forming a detachable and renewable protective coating on a receptive surface comprises forming the coating onto a receptive surface selected from a non-porous substrate, porous substrate, and combinations thereof. Suitable receptive surfaces include, but are not limited to those found on automotive surfaces, household interior surfaces, household exterior surfaces, articles of construction, and combinations thereof.

In another embodiment of the present invention, the method of forming a detachable protective coating on a non-porous substrate produces a coating that is substantially transparent and results in a change of less than 3.0 Delta E units of said non-porous substrate after application of said detachable coating.

In another embodiment of the present invention, the method of forming a detachable protective coating on a non-porous substrate produces a coating that is substantially not transparent and results in a change of more than 3.0 Delta E units of said non-porous substrate after application of said detachable coating.

In yet another embodiment of the present invention, the method of forming a detachable protective coating on a porous surface produces a coating that is substantially transparent and results in a change of less than 3.0 Delta L units of said porous substrate after application of said detachable coating.

In yet another embodiment of the present invention, the method of forming a detachable protective coating on a porous surface produces a coating that is substantially not transparent and results in a change of more than 3.0 Delta L units of said porous substrate after application of said detachable coating.

In yet a further embodiment of the present invention, the method of forming a detachable protective coating employing the inventive treatment compositions produces a detachable and renewable protective coating comprising hydrophobically modified fumed silica particles deposited onto a treated surface or treated article wherein the coating is sufficiently durable to exhibit a Durability Duration value of greater than or equal to 15 seconds.

In another embodiment of the present invention is a treatment composition for forming a detachable and renewable protective coating on a receptive surface comprising: (a) 0.05 to 5.0 percent by weight of a plurality of hydrophobically modified fumed silica particles having a median particle size of between 100 and 4,000 nanometers; (b) 99.95 to 5 percent by weight of a volatile solvent; (c) optionally, 0.001 to 5 percent by weight of a suspending agent; (d) optionally, 0.001 to 5 percent by weight of a functional adjunct; and optionally, in balance to 100 percent by weight if present, a propellant, which provides a treatment composition that when applied to said receptive surface deposits said protective coating on said receptive surface, wherein said protective coating provides dirt- and water-repellency to said receptive surface. The protective coating comprises a non-smooth coating on the receptive surface at least after the treatment composition has been applied to the receptive surface and has substantially dried or set. The non-smooth coating on the receptive surface includes valleys and peaks and an average height between the valleys and peaks of about 1-2500 nm. The detachable coating can be substantially transparent and result in a change of less than 3.0 Delta E units to the receptive surface measured before and after deposition of the coating.

In another embodiment of the invention, the treatment compositions employed for producing the detachable and renewable protective coatings of the present invention are obtained by dilution of a process composition comprising a plurality of hydrophobically modified fumed silica particles obtained by a process comprising the steps of: (a) providing a pre-dispersion of silica particles comprising hydrophobically modified fumed silica particles by stirring said silica particles into a solution comprising: (i) at least one compound of general formula (I) or (II):

$$(R^1R^2R^3Si)_2NR^4 \quad (I)$$

$$-(R^1R^2SiNR^4)_m\text{-(cyclo)} \quad (II)$$

wherein $R^1$, $R^2$ and $R^3$ can be the same or different, and are independently selected from hydrogen, straight or branched, saturated or unsaturated alkyl chain groups of from 1 to 8 carbon atoms, or aromatic groups of from 6 to 12 carbon atoms, $R^4$ is hydrogen or a methyl group, and m is from 3 to 8; and (ii) a first volatile solvent or solvent mixture selected from straight or branched, linear or cyclic aliphatic, or aromatic hydrocarbons with 2 to 14 carbon atoms, monovalent linear or branched alcohols with 1 to 6 carbon atoms, ketones or aldehydes with 1 to 6 carbon atoms, ethers or esters with 2 to 8 carbon atoms, or linear or cyclic polydimethylsiloxanes with 2 to 10 dimethylsiloxy units, wherein the concentration of the hydrophobically modified fumed silica particles in the pre-dispersion results in from 10 percent to about 30 percent by weight of the total weight of the pre-dispersion, and wherein the concentration of any one of compounds (I) and/or (II) is between 0.1 and 10 percent by weight of the total weight of the pre-dispersion; and then (b) mixing with a disperser said pre-dispersion to provide a process composition while reducing said silica particles to a median particle size in the range between 100 and 4000 nanometers; and further (c) optionally adding a durability agent to said solution at step (a) and/or with step (b), wherein said durability agent is selected from alkoxysilanes of general formula (III)

$$R^5{}_a Si(OR^6)_{4-a} \quad\quad\quad (III)$$

wherein $R^5$ is a straight or branched, saturated or unsaturated alkyl chain group of from 1 to 16 carbon atoms, optionally substituted with fluorine atoms, hydroxyl, amino, mercapto, or epoxy groups, $R^6$ is an alkyl chain of 1 to 2 carbon atoms, and a is 1 or 2; or alkyl-modified linear or cyclic polydimethylsiloxanes of general formulas (IV) or (V)

$$(CH_3)_3SiO[(CH_3)_2SiO]_n[(CH_3)R^7SiO]_o Si(CH_3)_3 \quad\quad (IV)$$

$$-[(CH_3)_2SiO]_p[(CH_3)R^7SiO]_q\text{-(cyclo)} \quad\quad\quad (V)$$

wherein $R^7$ is an alkyl chain group of from 6 to 24 carbon atoms, n is from 1 to 100, o is from 1 to 40, p from 0 to 7, and q is from 1 to 7, provided that the sum (p+q) is at least 3, to the dispersion as obtained in step (b) or step (c), whereby the concentration of any one of the durability agents (III) and/or (IV) and/or (V) is between 0.01 and 10 percent by weight of the total weight of the process composition.

In another embodiment of the present invention, treatment compositions contain a volatile solvent that is selected from the group of aromatic, branched, cyclic, and/or linear hydrocarbons with 2 to 14 carbon atoms, optionally substituted with fluorine or chlorine atoms, monovalent linear or branched alcohols with 1 to 6 carbon atoms, aldehydes and ketones, ethers or esters with 2 to 8 carbon atoms, linear or cyclic polydimethylsiloxanes with 2 to 10 dimethylsiloxy units, and mixtures thereof.

In yet a further embodiment of the present invention, treatment compositions contain a suspending agent selected from the group consisting of polymers, surfactants, and mixtures thereof in order to provide improved or extended storage stability or stability under adverse conditions.

In still another embodiment of the present invention, treatment compositions further incorporate a functional adjunct to exhibit a further benefit, wherein said functional adjunct is selected from the group consisting of ultraviolet light absorbers, ultraviolet light blockers, free-radical scavengers, fluorescent whitening agents, colorants, dyes, pigments, photoactive particles, color changing dyes, color fading dyes, bleaching agents, fixative agents, spreading agents, evaporation modifiers, azeotropic cosolvents, stabilizers, perfume, fragrance, odor control agents, anti-static agents, thickeners, and mixtures thereof.

In a further embodiment of the present invention, a treatment system or kit can be employed for applying and forming a detachable and renewable protective coating on a receptive surface, wherein the treatment system or kit comprises: (a) an applicator; and (b) a treatment composition for forming a protective coating on said receptive surface comprising: (i) 0.05 to 5.0 percent by weight of a plurality of hydrophobically modified fumed silica particles having a median particle size of between 100 and 4,000 nanometers; (ii) 99.95 to 5 percent by weight of a volatile solvent; (iii) optionally, 0.001 to 5 percent by weight of a suspending agent; (iv) optionally, (v) 0.001 to 5 percent by weight of a functional adjunct; and (vi) optionally, in balance to 100 percent by weight if present, a propellant; and further (c) optionally, a drying article; wherein said treatment composition when applied to said receptive surface deposits said protective coating on said receptive surface, wherein said protective coating provides dirt- and water-repellency to said receptive surface, wherein said receptive surface is a non-porous substrate and/or a porous substrate. The protective coating comprises a non-smooth coating on the receptive surface at least after the treatment composition has been applied to the receptive surface and has substantially dried or set. The non-smooth coating on the receptive surface includes valleys and peaks and an average height between the valleys and peaks of about 1-2500 nm. The detachable coating can be substantially transparent and results in a change of less than 3.0 Delta E units to the non-porous substrate and/or results in a change of less than 3.0 Delta L units to said porous substrate, measured before and after deposition of the coating.

In an alternative embodiment of the present invention relating to that embodiment presented immediately above, the treatment system employs an applicator comprising a device capable of dispensing said treatment composition in the form of a fine spray comprising a plurality of liquid droplets, and capable of directing said plurality of liquid droplets onto said receptive surface.

In yet another embodiment of the present invention, the treatment system employs an applicator comprising a pressurized aerosol container in which the treatment composition according to the present invention is charged.

In an additional embodiment of the present invention, the treatment system employs an applicator comprising a non-pressurized delivery means for dispensing and applying the inventive treatment compositions onto a receptive surface.

In yet a further embodiment of the present invention is a method of forming a detachable and renewable protective coating on a receptive surface comprising the steps of: (a) applying a treatment composition to said receptive surface, said treatment composition comprising a plurality of hydrophobically modified fumed silica particles colloidally dispersed in a volatile solvent; (b) allowing said volatile solvent to evaporate from said receptive surface; and (c) thereby depositing said protective coating on said receptive surface, wherein said protective coating provides dirt- and water-repellency to said receptive surface. wherein said detachable coating is substantially transparent and results in a change of less than 250 Delta Haze units to said receptive surface measured before and after deposition of said coating, as measured by the Chrome Test.

In another embodiment of the present invention, a treatment composition is employed for forming a detachable and renewable protective coating on a receptive surface, wherein said treatment composition comprises: (a) 0.05 to 5.0 percent by weight of a plurality of hydrophobically modified fumed silica particles having a median particle size of between 100 and 4,000 nanometers; (b) 99.95 to 5 percent by weight of a volatile solvent; (c) optionally, 0.001 to 5 percent by weight of a suspending agent; (d) optionally, 0.001 to 5 percent by weight of a functional adjunct; and (e) optionally, in balance to 100 percent by weight if present, a propellant; wherein said treatment composition when applied to said receptive surface deposits said protective coating on said receptive surface, wherein said protective coating provides dirt- and water-repellency to said receptive surface, and wherein said coating is substantially transparent and results in a change of less than 250 Delta Haze units to said receptive surface measured before and after deposition of said coating, as measured by the Chrome Test.

In yet one further embodiment of the present invention, a treatment composition is employed for forming a detachable and renewable protective coating on a receptive surface, wherein said hydrophobically modified fumed silica particles have a median particle size of less than 2,000 nanometers and wherein said coating resulting from use of the inventive treatment composition results in a coating exhibiting a change of less than 200 Delta Haze units on said surface, and alternatively wherein said hydrophobically modified fumed silica particles have a median particle size of less than 1,000 nanometers and wherein said coating resulting from use of the inventive treatment composition results in a coating exhibiting a change of less than 100 Delta Haze units on said surface.

In another embodiment of the present invention, use of the inventive treatment compositions provides a treated article comprising: (1) a substrate bearing at least one receptive surface; and (2) a detachable and renewable protective coating deposited onto said receptive surface, wherein said protective coating comprises a plurality of hydrophobically modified fumed silica particles obtained by a process comprising the steps of: (a) providing a pre-dispersion of silica particles comprising hydrophobically modified fumed silica particles by stirring said silica particles into a solution comprising: (i) at least one compound of general formula (I) or (II):

$$(R^1R^2R^3Si)_2NR^4 \quad (I)$$

$$\text{—}(R^1R^2SiNR^4)_m\text{-(cyclo)} \quad (II)$$

wherein $R^1$, $R^2$ and $R^3$ can be the same or different, and are independently selected from hydrogen, straight or branched, saturated or unsaturated alkyl chain groups of from 1 to 8 carbon atoms, or aromatic groups of from 6 to 12 carbon atoms, $R^4$ is hydrogen or a methyl group, and m is from 3 to 8; and (ii) a first volatile solvent or solvent mixture selected from straight or branched, linear or cyclic aliphatic, or aromatic hydrocarbons with 2 to 14 carbon atoms, monovalent linear or branched alcohols with 1 to 6 carbon atoms, ketones or aldehydes with 1 to 6 carbon atoms, ethers or esters with 2 to 8 carbon atoms, or linear or cyclic polydimethylsiloxanes with 2 to 10 dimethylsiloxy units, wherein the concentration of the hydrophobically modified fumed silica particles in the pre-dispersion results in from 10 percent to about 30 percent by weight of the total weight of the pre-dispersion, and wherein the concentration of any one of compounds (I) and/or (II) is between 0.1 and 10 percent by weight of the total weight of the pre-dispersion; and (b) mixing with a disperser said pre-dispersion to provide a process composition while reducing said silica particles to a median particle size in the range between 100 and 4000 nanometers; and (c) optionally adding a durability agent to said solution at step (a) and/or with step (b), wherein said durability agent is selected from alkoxysilanes of general formula (III)

$$R^5{}_aSi(OR^6)_{4-a} \quad (III)$$

wherein $R^5$ is a straight or branched, saturated or unsaturated alkyl chain group of from 1 to 16 carbon atoms, optionally substituted with fluorine atoms, hydroxyl, amino, mercapto, or epoxy groups, $R^6$ is an alkyl chain of 1 to 2 carbon atoms, and a is 1 or 2; or alkyl-modified linear or cyclic polydimethylsiloxanes of general formulas (IV) or (V)

$$(CH_3)_3SiO[(CH_3)_2SiO]_n[(CH_3)R^7SiO]_oSi(CH_3)_3 \quad (IV)$$

$$\text{—}[(CH_3)_2SiO]_p[(CH_3)R^7SiO]_q\text{-(cyclo)} \quad (V)$$

wherein $R^7$ is an alkyl chain group of from 6 to 24 carbon atoms, n is from 1 to 100, o is from 1 to 40, p from 0 to 7, and q is from 1 to 7, provided that the sum (p+q) is at least 3, to the dispersion as obtained in step (b) or step (c), whereby the concentration of any one of the durability agents (III) and/or (IV) and/or (V) is between 0.01 and 10 percent by weight of the total weight of the process composition; and wherein said protective coating provides dirt- and water-repellency to said receptive surface, wherein said detachable coating is substantially transparent and results in a change of less than 3.0 Delta E units to said receptive surface measured before and after deposition of said coating.

In another embodiment of the present invention, the treated article results when said protective coating is formed by use of a treatment composition comprising: (a) 0.05 to 5.0 percent by weight of a plurality of hydrophobically modified fumed silica particles having a median particle size of between 100 and 4,000 nanometers; (b) 99.95 to 5 percent by weight of a volatile solvent; (c) optionally, 0.001 to 5 percent by weight of a suspending agent; (d) optionally, 0.001 to 5 percent by weight of a functional adjunct; and (e) optionally, in balance to 100 percent by weight if present, a propellant.

In yet a further embodiment of the present invention, a protective coating on a receptive surface comprises a plurality of hydrophobically modified fumed silica particles obtained by a process comprising the steps of: (a) providing a pre-dispersion of silica particles comprising hydrophobically modified fumed silica particles by stirring said silica particles into a solution comprising: (i) at least one compound of general formula (I) or (II)

$$(R^1R^2R^3Si)_2NR^4 \quad (I)$$

$$\text{—}(R^1R^2SiNR^4)_m\text{-(cyclo)} \quad (II)$$

wherein $R^1$, $R^2$ and $R^3$ can be the same or different, and are independently selected from hydrogen, straight or branched, saturated or unsaturated alkyl chain groups of from 1 to 8 carbon atoms, or aromatic groups of from 6 to 12 carbon atoms, $R^4$ is hydrogen or a methyl group, and m is from 3 to 8; and (ii) a first volatile solvent or solvent mixture selected from straight or branched, linear or cyclic aliphatic, or aromatic hydrocarbons with 2 to 14 carbon atoms, monovalent linear or branched alcohols with 1 to 6 carbon atoms, ketones or aldehydes with 1 to 6 carbon atoms, ethers or esters with 2 to 8 carbon atoms, or linear or cyclic polydimethylsiloxanes with 2 to 10 dimethylsiloxy units, wherein the concentration of the hydrophobically modified fumed silica particles in the pre-dispersion results in from 10 percent to about 30 percent by weight of the total weight of the pre-dispersion, and wherein the concentration of any one of compounds (I) and/or (II) is between 0.1 and 10 percent by weight of the total weight of the pre-dispersion; and (b) mixing with a disperser said pre-dispersion to provide a process composition while reducing said silica particles to a median particle size in the range between 100 and 4000 nanometers; and then (c) optionally adding a durability agent to said solution at step (a) and/or with step (b), wherein said durability agent is selected from alkoxysilanes of general formula (III)

$$R^5{}_aSi(OR^6)_{4-a} \quad (III)$$

wherein $R^5$ is a straight or branched, saturated or unsaturated alkyl chain group of from 1 to 16 carbon atoms, optionally substituted with fluorine atoms, hydroxyl, amino, mercapto, or epoxy groups, $R^6$ is an alkyl chain of 1 to 2 carbon atoms, and a is 1 or 2; or alkyl-modified linear or cyclic polydimethylsiloxanes of general formulas (IV) or (V)

$$(CH_3)_3SiO[(CH_3)_2SiO]_n[(CH_3)R^7SiO]_oSi(CH_3)_3 \quad (IV)$$

$$\text{—}[(CH_3)_2SiO]_p[(CH_3)R^7SiO]_q\text{-(cyclo)} \quad (V)$$

wherein $R^7$ is an alkyl chain group of from 6 to 24 carbon atoms, n is from 1 to 100, o is from 1 to 40, p from 0 to 7, and q is from 1 to 7, provided that the sum (p+q) is at least 3, to the dispersion as obtained in step (b) or step (c), whereby the concentration of any one of the durability agents (III) and/or (IV) and/or (V) is between 0.01 and 10 percent by weight of the total weight of the process composition; wherein said protective coating is detachable and renewable, wherein said protective coating provides dirt- and water-repellency to said receptive surface, and wherein said detachable coating is substantially transparent and results in a change of less than 3.0 Delta E units to said receptive surface measured before and after deposition of said coating.

Treatment Composition

Methods and treatment systems according to the present invention employ treatment compositions comprising a plurality of particles comprising a colloidal dispersion of hydrophobically modified fumed silica particles, a volatile solvent, optionally processed in the presence of or further comprising a durability agent, and other optional additives including a suspending agent, functional adjunct, and propellant.

In an embodiment, the treatment composition is formulated to form a non-smooth coating on a receptive surface at least after the composition has been applied to the receptive surface and has substantially dried or set. The treatment composition can include a first and second set of hydrophobically modified fumed silica colloidal particles. Each of the first and second sets of hydrophobically modified fumed silica colloidal particles includes a plurality of colloidal particles. The first set of hydrophobically modified fumed silica colloidal particles can have an average particle size that is greater than the average size of the second set of hydrophobically modified fumed silica colloidal particles. The number of hydrophobically modified fumed silica colloidal particles in the second set of colloidal particles can be greater than the number of hydrophobically modified fumed silica colloidal particles in the first set of colloidal particles. One or more of the hydrophobically modified fumed silica colloidal particles can be modified to include one or more hydrocarbon chains.

The inclusion of at least two colloidal particles having a different size is believed to form elevations and depressions on a material upon which these particles have been deposited. As can be appreciated, these colloidal particles can be applied to different types of materials by a variety of mechanisms. For instance, when the colloidal particles are applied to hard surfaces (e.g., glass surfaces, tile surfaces, granite surfaces, formica surfaces, linoleum surfaces, concrete or concrete composite surfaces, metal surfaces, wood surfaces, ceramic surfaces, etc.), the colloidal particles can be applied by a solid solution (e.g., wax, paste, etc.), a liquid solution, and/or by an aerosol. When it is desired to apply the colloidal particles to a non-hard surface (e.g., fabric surfaces, leather surfaces, carpet, woven or non-woven materials, etc.); the solid colloidal particles can be applied by a solid solution, a liquid solution, and/or by an aerosol.

The colloidal particle containing composition of the present invention contains at least two different sized colloidal particles. It is believed that the differing sized colloidal particles, when applied to a surface, result in the colloidal particles stacking on top of one another to form non-smooth surfaces. These non-smooth surfaces are believed to be at least partially caused by the non-uniform particle sizes of the colloidal particles. The non-smooth surfaces generally have an average height between the valleys and peaks of the non-smooth surfaces of up to about 2500 nm; however, it can be appreciated that larger average heights can be achieved. In one non-limiting example, the average height between the valleys and peaks of the non-smooth surfaces is about 1-2000 nm. In another non-limiting example, the average height between the valleys and peaks of the non-smooth surfaces is about 1-1500 nm. In another non-limiting example, the average height between the valleys and peaks of the non-smooth surfaces is about 1-1000 nm. In another non-limiting example, the average height between the valleys and peaks of the non-smooth surfaces is about 1-500 nm. In still another non-limiting example, the average height between the valleys and peaks of the non-smooth surfaces is about 5-250 nm. In yet another non-limiting example, the average height between the valleys and peaks of the non-smooth surfaces is 10-100 nm. In still yet another non-limiting example, the average height between the valleys and peaks of the non-smooth surfaces is 20-80 nm.

These small elevations and depressions on the surface of a material can at least partially result in a *lotus* effect on the surface of the material. As such, liquids (e.g., water, etc.) that contact a surface that includes these small elevations and depressions have a tendency to runoff such surfaces, thereby reducing the opportunity of such liquids to be absorbed into such surfaces and/or dry on and stain such surfaces.

The particle size ratio of at least two sized sets of colloidal particles in the colloidal particle containing composition of the present invention is at least about 1.02:1. In one non-limiting aspect of this embodiment, the average size ratio of at least two different sized colloidal particles is at least about 1.05:1. In another non-limiting aspect of this embodiment, the average size ratio of at least two different sized colloidal particles is at least about 1.1:1. In another non-limiting aspect of this embodiment, the average size ratio of at least two different sized colloidal particles is at least about 1.5:1. In still another non-limiting aspect of this embodiment, the average size ratio of at least two different sized colloidal particles is at least about 2:1. In yet another non-limiting aspect of this embodiment, the average size ratio of at least two different sized colloidal particles is about 2-20:1. In still yet another non-limiting aspect of this embodiment, the average size ratio of at least two different sized colloidal particles is about 2-10:1. In still yet another non-limiting aspect of this embodiment, the average size ratio of at least two different sized colloidal particles is about 2.5-8:1. In another non-limiting aspect of this embodiment, the average size ratio of at least two different sized colloidal particles is about 3-7:1. In still another non-limiting aspect of this embodiment, the average size ratio of at least two different sized colloidal particles is about 5-7:1. In yet another non-limiting aspect of this embodiment, the average size ratio of at least two different sized colloidal particles is about 3-5:1. As can be appreciated, other size ratios can be used. In another and/or alternative one non-limiting embodiment of the invention, the number of colloidal particles that are included in each set of sized colloidal particles is controlled to obtain the desired non-smooth surfaces on the surface of a material that is coated with the colloidal particle containing composition of the present invention.

Generally, the number of small colloidal particles in the colloidal particle containing composition of the present invention is greater than the number of larger colloidal particles. In one non-limiting aspect of this embodiment, the ratio of the number of small colloidal particles of at least one set of colloidal particles having some average size to the number of larger colloidal particles in at least one other set of colloidal particles having some average size is at least about 1.5:1. In yet another non-limiting aspect of this embodiment, the ratio of the number of small colloidal particles of at least one set of colloidal particles having some average size to the number of larger colloidal particles in at least one other set of colloidal particles having some average size is at least about 2:1. In still another non-limiting aspect of this embodiment, the ratio of the number of small colloidal particles of at least one set of colloidal particles having some average size to the number of larger colloidal particles in at least one other set of colloidal particles having some average size is at least about 5:1. In still another non-limiting aspect of this embodiment, the ratio of the number of small colloidal particles of at least one set of colloidal particles having some average size to the number of larger colloidal particles in at least one other set of colloidal particles having some average size is at least about 10:1. In yet another non-limiting aspect of this embodiment, the ratio of the number of small colloidal particles of at least one set of colloidal particles having some average size to the number of larger colloidal particles in at least one other set of colloidal particles having some average size is at least about 20:1. In still yet another non-limiting aspect of this embodiment, the ratio of the number of small colloidal particles of at least one set of colloidal particles having some average size to the number of larger colloidal particles in at least one other set of colloidal particles having some average size is about 10-1000:1. In another non-limiting aspect of this embodiment, the ratio of the number of small colloidal particles of at least one set of colloidal particles having some average size to the number of larger colloidal particles in at least one other set of colloidal particles having some average size is about 15-500:1. In still another non-limiting aspect of this embodiment, the ratio of the number of small colloidal particles of at least one set of colloidal particles having some average size to the number of larger colloidal particles in at least one other set of colloidal particles having some average size is about 20-300:1. In yet another non-limiting aspect of this embodiment, the ratio of the number of small colloidal particles of at least one set of colloidal particles having some average size to the number of larger colloidal particles in at least one other set of colloidal particles having some average size is about 30-200:1. In still yet another non-limiting aspect of this embodiment, the ratio of the number of small colloidal particles of at least one set of colloidal particles having some average size to the number of larger colloidal particles in at least one other set of colloidal particles having some average size is about 70-150:1. As can be appreciated, other number of particle ratios can be used.

The colloidal particle containing composition of the present invention can have a controlled maximum average size of colloidal particles in the colloidal particle containing composition of the present invention so as to achieve one or more of the desired properties of the colloidal particle containing composition. For instance, when the colloidal particle containing composition is to be used on a glass surface and/or is used to form a substantially transparent coating, the maximum size of the colloidal particles is generally below 1000 nm, since larger particle colloidal particles can cause the coating to be cloudy and/or colored. In other applications wherein clear coatings are not essential, colloidal particles can have a size that is less than, equal to, or greater than about 1000 nm. In one non-limiting specific example, the colloidal particle containing composition of the present invention does not include colloidal particles that are greater than about 25000 nm.

In another one non-limiting specific example, the colloidal particle containing composition of the present invention includes a maximum set size of colloidal particles that has an average size of less than about 5000 nm. In still another one non-limiting specific example, the colloidal particle containing composition of the present invention includes a maximum set size of colloidal particles that has an average size of less than about 2000 nm. In yet another one non-limiting specific example, the colloidal particle containing composition of the present invention includes a maximum set size of colloidal particles that has an average size of less than about 500 nm.

In still yet another one non-limiting specific example, the colloidal particle containing composition of the present invention includes one set of colloidal particles having an average size of about 2-40 nm and a second set of colloidal particles having an average size of about 15-200 nm. In another one non-limiting specific example, the colloidal particle containing composition of the present invention includes one set of colloidal particles having an average size of about 2-20 nm and a second set of colloidal particles having an average size of about 15-100 nm. In yet another non-limiting specific example, the colloidal particle containing composition of the present invention contains one set of colloidal particles having an average size of about 3-15 nm and a second set of colloidal particles having an average size of about 16-50 nm. In still yet another non-limiting specific example, the colloidal particle containing composition of the present invention contains one set of colloidal particles having an average size of about 4-10 nm and a second set of colloidal particles having an average size of about 18-40 nm. As can be appreciated, other sized particles for the first and/or second set of particles can be used.

As can also or alternatively be appreciated, more than two sets of colloidal particles having different average particle sizes can be included in the colloidal particle containing compositions. For instance, the colloidal particle containing composition of the present invention can include from about 2-10 sized sets of colloidal particles having different average particle sizes.

The colloidal particle containing material of the present invention can include one or more sets of colloidal particles that have been modified. The colloidal particles can be modified to 1) control the size of the colloidal particles, 2) improve the bonding between a plurality of colloidal particles when applied to a surface, 3) improve the bonding between a plurality of colloidal particles and the surface to which the colloidal particles are applied, 4) increase the packing density between a plurality of colloidal particles, and/or 5) increase the hydrophobicity of colloidal particles when applied to a surface. As can be appreciated, one or more colloidal particles can be modified for other or additional reasons.

In an example of an embodiment of the present invention, a treatment composition is obtained by a dilution step employing a second solvent added to a process composition comprising: (a) 5 to 30 percent by weight of hydrophobically modified fumed silica particles with a median particle size in the range between 100 and 4000 nanometers; and (b) 50 to 95 percent by weight of a first volatile solvent or solvent mixture selected from straight or branched, linear or cyclic aliphatic, or aromatic hydrocarbons with 2 to 14 carbon atoms, monovalent linear or branched alcohols with 1 to 6 carbon atoms, ketones or aldehydes with 1 to 6 carbon atoms, ethers or esters with 2 to 8 carbon atoms, or linear or cyclic polydimethyl-siloxanes with 2 to 10 dimethylsiloxy units; such that the said dilution step results in less than 5 percent by weight of said hydrophobically modified fumed silica particles in said treatment composition; wherein said second solvent comprises a volatile solvent or solvent mixture selected from straight or branched, linear or cyclic aliphatic, or aromatic hydrocarbons with 2 to 14 carbon atoms, monovalent linear or branched alcohols with 1 to 6 carbon atoms, ketones or aldehydes with 1 to 6 carbon atoms, ethers or esters with 2 to 8 carbon atoms, or linear or cyclic polydimethylsiloxanes with 2 to 10 dimethylsiloxy units.

The treatment composition can comprise two or more sets of modified colloidal particles, wherein the colloidal particles form a non-smooth surface coating on a substrate surface at least after the composition has been applied to the substrate and has substantially dried or set. The composition includes at least a first and a second set of colloidal particles, each of said first and second sets of colloidal particles including a plurality of colloidal particles, each having an average size of colloidal particles. In each of the first and second sets of colloidal particles, the average particle size of the first set of colloidal particles is greater than the average particle size of said second set of colloidal particles. Moreover, the composition includes a greater number of colloidal particles in the second set of colloidal particles than the number of colloidal particles in the first set of colloidal particles.

In one embodiment, the ratio of average particle sizes between the first set of colloidal particles and the second set of colloidal particles is at least about 1.1:1. In another preferred embodiment, the ratio the average particle size of the first set of colloidal particles to the average particle size of the second set of colloidal particles is at least about 1.5-20:1. In a further embodiment, the composition comprises a ratio of the number of colloidal particles of the second set of colloidal particles to the number of particles of the first set of colloidal particles is at least about 2:1. In another embodiment, the composition comprises a ratio of the number of colloidal particles of the second set of colloidal particles to the number of particles of the first set of colloidal particles is about 10-1000:1. In another embodiment of the invention, the average particle size of the first set of colloidal particles is about 15-2000 nm, and the average particle size of the second set of colloidal particles is about 1-200 nm. In a further embodiment, the average particle size of the first set of colloidal particles is about 15-200 nm, and the average particle size of the second set of colloidal particles is about 1-40 nm.

Hydrophobically Modified Silica

In one non-limiting embodiment of the invention, a plurality of colloidal particles are modified so as to include one or more alkyl chains. As can be appreciated, colloidal particles can be modified to include other or additional types of hydrocarbon chains (e.g., alkane chain, alkene chain, aryl chain, etc.). The hydrocarbon chains can be substituted (e.g., hydrogen substituted with a halogen, another hydrocarbon chain, etc.) or non-substituted chains. The alkyl chains, when used, are believed to increase the hydrophobicity of the modified colloidal particles. Typically, smaller colloidal particles and/or shorter alkyl chains result in improved packing of the colloidal particles, which in turn can also or alternatively increase the hydrophobicity of a coating of colloidal particle containing material of the present invention on a surface. The alkyl chains can be saturated chains or unsaturated chains. The colloidal particles in the colloidal particle containing material of the present invention can all be modified or a portion of the colloidal particles can be modified.

The modified colloidal particles can be modified in the same or different way. For instance, one set of colloidal particles can include one type of hydrocarbon chain and another set of colloidal particles can include a longer and/or different type of hydrocarbon chain. The length of each of the alkyl chains on one or more colloidal particles is up to about a 30 carbon chain; however, larger lengths can be used in some applications. When the alkyl chain is too large, the alkyl chain can begin to interfere with the proper formation of the non-smooth surfaces. In another and/or alternative non-limiting embodiment, the average length of an alkyl chain on colloidal particles that have been modified to include alkyl chains is about a 1-24 carbon chain. In one non-limiting aspect of this embodiment, the length of each of the alkyl chains on one or more colloidal particles is about a 1-18 carbon chain. In another non-limiting aspect of this embodiment, the length of each of the alkyl chains on one or more colloidal particles is about a 2-16 carbon chain. In still another non-limiting aspect of this embodiment, the length of each of the alkyl chains on one or more colloidal particles is about a 3-16 carbon chain. In another yet non-limiting aspect of this embodiment, the length of each of the alkyl chains on one or more colloidal particles is about a 3-8 carbon chain. In still another and/or alternative non-limiting embodiment of the present invention, the colloidal particle containing material of the present invention includes colloidal silica particles that have been modified to include one or more hydrocarbon chains (e.g., alkyl chains, etc.). The modification of silica to include hydrocarbon chains such as alkyl chains is known in the art, thus will not be described herein.

Two or more sets of colloidal particles in the colloidal particle containing material of the present invention can include different lengths and/or types of hydrocarbon chains. The different types and/or lengths of hydrocarbon chains can be used to alter the size of the modified colloidal particles. The modified size of the colloidal particles alone or in combination with the types and/or lengths of hydrocarbon chains can be used to alter the hydrophobicity of the colloidal particle containing material of the present invention. For instance, colloidal particles that are generally the same size, can be differentiated in size by modifying at least a portion of the colloidal particles by use of different types and/or lengths of hydrocarbon chains. The effect of the different sized particles can be the same or similar to when different sized colloidal particles are used as discussed above. As can be appreciated, different sized colloidal particles can also be modified by different types and/or lengths of hydrocarbon chains. In essence, the differentiated particle size of the colloidal particles can be obtained by 1) using different sized colloidal particles, 2) using the same sized colloidal particles but modifying a portion of the colloidal particles with one type and/or size hydrocarbon chain, 3) using the same sized colloidal particles but modifying a portion of the colloidal particles with one type and/or sized hydrocarbon chain and modifying another portion of the colloidal particles with a different type and/or sized hydrocarbon chain, 4) using different sized colloidal particles and modifying a portion of the colloidal particles with one type and/or sized hydrocarbon chain, or 5) using different sized colloidal particles but modifying one sized set of colloidal particles with one type and/or sized hydrocarbon chain and modifying another sized set of colloidal particles with a different type and/or sized hydrocarbon chain.

It is also envisioned to provide a method for forming a hydrophobic coating on a substrate by providing a formulation that includes a solvent and a first and second set of colloidal particles. Each of the first and second sets of colloidal particles includes a plurality of colloidal particles, and the average particle size of each of the first and second sets of colloidal particles are such that the average particle size of the first set of colloidal particles is greater than the average particle size of the second set of particles. Further, the composition if formulated such that the second set of colloidal particles comprises a greater number of colloidal particles than the number of colloidal particles in the first set of colloidal particles. The hydrophobic coating is then applied to the surface of a substrate and is allowed to at least partially set or dry on said surface of said substrate. In this regard, the formulation creates a non-smooth coating on the surface of the substrate that is formed by the at least first and second sets of colloidal particles.

Suitable hydrophobically modified fumed silica particles that may be used in the present invention include silica particles that have been hydrophobicized by any means known in the art. In some embodiments of the invention, the silicon dioxide utilized is a colloidal silicon dioxide. Colloidal silicon dioxide is a generally fumed silica prepared by a suitable process to reduce the particle size and modify the surface properties. A common process in the art to modify the surface properties is to produce fumed silica, for example by production of the silica material under conditions of a vapor-phase hydrolysis at an elevated temperature with a surface modifying silicon compound, such as silicon dimethyl dichloride. Such products are commercially available from a number of sources, including Cabot Corporation, Tuscola, Ill. (under the trade name CAB-O-SIL™) and Degussa, Inc., Piscataway, N.J. (under the trade name AEROSIL®).

Suitable hydrophobically modified fumed silica particles include, but are not limited to, those commercially available from Degussa Corporation, Parsippany, N.J., as designated under the R Series of the AEROSIL® and AEROXIDE® LE trade names. The different AEROSIL® R and AEROXIDE® LE types differ in the kind of hydrophobic coating, the BET surface area, the average primary particle size and the carbon content. The hydrophobic properties are a result of a suitable hydrophobizing treatment, e.g., treatment with at least one compound from the group of the organosilanes, alkylsilanes, the fluorinated silanes, and/or the disilazanes. Commercially available examples include AEROSIL® R 202, AEROSIL® R 805, AEROSIL® R 812, AEROSIL® R 812 S, AEROSIL® R 972, AEROSIL® R 974, AEROSIL® R 8200, AEROXIDE® LE-1 and AEROXIDE® LE-2.

Other silica materials are also suitable when hydrophobically modified by use of hydrophobizing materials capable of rendering the surfaces of the silica particles suitably hydrophobic. The suitable hydrophobizing materials include all those common in the art that are compatible for use with the silica materials to render their surfaces suitably hydrophobic. Suitable examples, include, but are not limited to the organosilanes, alkylsilanes, the fluorinated silanes, and/or the disilazanes. Suitable organosilanes include, but are not limited to alkylchlorosilanes; alkoxysilanes, e.g., methyltrimethoxysilane, methyltriethoxysilane, ethyltrimethoxy-silane, ethyltriethoxy-silane, n-propyltrimethoxysilane, n-propyltriethoxysilane, i-propyltrimethoxysilane, propyltriethoxysilane, butyltrimethoxysilane, butyltri-ethoxysilane, hexyltrimethoxy-silane, octyltrimethoxysilane, 3-mercaptopropyl-trimethoxysilane, n-octyltriethoxy-silane, phenyltriethoxysilane, polytriethoxysilane; trialkoxyarylsilanes; isooctyltrimethoxy-silane; N-(3-triethoxysilylpropyl)methoxy-ethoxyethoxy ethyl carbamate; N-(3-triethoxysilylpropyl)methoxyethoxyethoxyethyl carbamate; polydialkylsiloxanes including, e.g., polydimethylsiloxane; arylsilanes including, e.g., substituted and unsubstituted arylsilanes; alkylsilanes including, e.g., substituted and unsubstituted alkyl silanes including, e.g., methoxy and hydroxy substituted alkyl silanes; and combinations thereof. Some suitable alkylchlorosilanes include, for example, methyltrichlorosilane, dimethyldichlorosilane, trimethylchloro-silane, octylmethyldichlorosilane, octyltrichlorosilane, octadecylmethyldichlorosilane and octadecyltrichlorosilane. Other suitable materials include, for example, methyltrimethoxysilane, dimethyldimethoxysilane and trimethylmethoxysilane; methylethoxysilanes such as methyltriethoxysilane, dimethyldiethoxysilane and trimethylethoxysilane; methylacetoxysilanes such as methyltriacetoxysilane, dimethyldiacetoxysilane and trimethylacetoxysilane; vinylsilanes such as vinyltrichlorosilane, vinylmethyldichlorosilane, vinyldimethyl-chlorosilane, vinyltrimethoxysilane, vinylmethyldimethoxysilane, vinyldimethyl-methoxysilane, vinyltriethoxysilane, vinylmethyldiethoxysilane and vinyldimethyl-ethoxysilane.

Disilazanes which can be employed in the present invention as processing aids are well known in the art. Suitable disilazanes, include for example, but are not limited to hexamethyldisilazane, divinyltetramethyldisilazane and bis(3,3-trifluoropropyl)tetramethyldisilazane. Cyclosilazanes are also suitable, and include, for example, octamethylcyclotetrasilazane. It is noted that the aforementioned disilazanes and cyclosilazanes typically have the basic formula (I) and (II) described above. Thus, these disilazanes and cyclosilazanes can be used as either or both as hydrophobizing material for hydrophobically modifying fumed silica particles and as a processing aide in forming the pre-dispersion mentioned supra.

Suitable fluorinated silanes include the fluorinated alkyl-, alkoxy-, aryl- and/or alkylaryl-silanes, and fully perfluorinated alkyl-, alkoxy-, aryl- and/or alkylaryl-silanes. Examples of fluoroalkyl silanes include, but are not limited to those marketed by Degussa under the trade name of Dynasylan. An example of a suitable fluorinated alkoxy-silane is perfluorooctyl trimethoxysilane.

Coating

In a further embodiment of the present invention, a protective coating is formed on a receptive surface by deposition of a treatment composition comprising: (a) 0.05 to 5.0 percent by weight of a plurality of hydrophobically modified fumed silica particles having a median particle size of between 100 and 4,000 nanometers; (b) 99.95 to 5 percent by weight of a volatile solvent; (c) optionally, 0.001 to 5 percent by weight of a suspending agent; (d) optionally, 0.001 to 5 percent by weight of a functional adjunct; and (e) optionally, in balance to 100 percent by weight if present, a propellant.

The protective coating comprises a non-smooth coating on the receptive surface at least after the treatment composition has been applied to the receptive surface and has substantially dried or set. The non-smooth coating on the receptive surface includes valleys and peaks and an average height between the valleys and peaks of about 1-2500 nm. The protective coating can be substantially transparent or non-transparent.

Another and/or alternative non-limiting object of the present invention is the provision of a formulation that includes colloidal particles that form a surface structure on an applied surface which surface structure includes elevations and depressions that are at least partially formed by colloidal particles.

Still another and/or alternative non-limiting object of the present invention is the provision of a formulation that includes colloidal particles that form a surface structure on an applied surface which surface structure includes elevations and depressions that are at least partially formed by different sized colloidal particles.

The non-smooth surface coating that is formed when the composition is applied to the substrate surface includes valleys and peaks. The non-smooth surface coating results in an average height between the valley and peaks of about 1-2500 nm. In another embodiment, the non-smooth surface on the substrate surface includes valleys and peaks having an average height between the valley and peaks of about 2-100 nm.

Process Equipment

Suitable equipment for effectively dispersing the hydrophobically modified fumed silica particles of the present invention include any kind of device which is capable of applying high enough shear forces to a concentrated particulate slurry and thus being effective at decreasing the average particle size distribution of particles within the slurry down to 100 to 4,000 nanometers where initial particle sizes range from about 1 to 1,000,000 nanometers can be employed according to the methods of the present invention. Suitable examples include, but are not limited to, mixers and/or dispersers based on the rotor stator principle such as the L4RT type available from Silverson Machines, Waterside at Chesham Bucks, England. Further suitable examples are mixers using dissolver or dispenser blades, such as the CV type available from Dispermat (BYK-Gardner, Geretsried, Germany), and/or the H-Trieb 4REB/L model available from Heynau Getriebe, Landshut, Germany. Effective dispersing can also be achieved with a horizontal mill, one suitable example being the MH2P type from OKK USA Company, Glendale Heights, Ill.

Durability Agent

A durability agent may optionally be included in the process and/or treatment compositions of the present invention. When included, one possible embodiment is to include the durability agent during the processing step. Suitable durability agents may be selected from the group of alkoxysilanes of the general formula (III)

$$R^5{}_a Si(OR^6)_{4-a} \quad (III)$$

wherein $R^5$ is a straight or branched, saturated or unsaturated alkyl chain group of from 1 to 16 carbon atoms, optionally substituted with flourine atoms, hydroxyl, amino, mercapto, or epoxy groups, $R^6$ is an alkyl chain of 1 to 2 carbon atoms, a is 1 or 2; or selected form the group of alkyl-modified linear or cyclic polydimethylsiloxanes of the general formulas (IV) and (V)

$$(CH_3)_3SiO[(CH_3)_2SiO]_n[(CH_3)R^7SiO]_o Si(CH_3)_3 \quad (IV)$$

$$-[(CH_3)_2SiO]_p[(CH_3)R^7SiO]_q\text{-(cyclo)} \quad V)$$

wherein $R^7$ is an alkyl chain group of from 6 to 24 carbon atoms, n is from 1 to 100, o from 1 to 40, p from 0 to 7, q from 1 to 7, provided that the sum (p+q) is at least 3. Additional durability agents suitable for use herein include those previously disclosed in U.S. Pat. Pub. No. 2004/0213904A1.

The level of durability agent employed herein is typically between 0.1 and 10 percent by weight of the total weight of the composition.

Volatile Solvent

A volatile solvent is employed in the inventive process and/or treatment compositions in the capacity of a liquid carrier for methods of delivering and effectively applying the treatment compositions to a receptive surface in a manner capable of forming a functional protective coating on the surface.

Suitable volatile solvents are selected from the group of aromatic, branched, cyclic, and/or linear hydrocarbons with 2 to 14 carbon atoms, optionally substituted with flourine or chlorine atoms, monovalent linear or branched alcohols, aldehydes or ketones with 1 to 6 carbon atoms, ethers or esters with 2 to 8 carbon atoms, linear or cyclic polydimethylsiloxanes with 2 to 10 dimethylsiloxy units, and mixtures thereof. Examples of suitable volatile solvents include, but are not limited to, n-propane, n-butane, n-pentane, cyclo-pentane, n-hexane, cyclo-hexane, n-heptane, isododecane, kerosene, methanol, ethanol, 1-propanol, isopropanol, 1-butanol, dimethylether, diethylether, petroleum ether and ethylacetate, octamethyltrisiloxane, marketed under the trade name Dow Corning 200 Fluid 1cst, decamethylcyclo-pentasiloxane, marketed under the trade name Dow Corning 245 (available from Dow Chemical), TEGO® Polish Additiv 5 (available from Degussa), perfluorinated solvents, and other halogenated materials such as chlorinated solvents are also suitably employed where their use is appropriate.

Additional solvents that may be employed include those organic solvents having some water solubility and/or water miscibility, and at least some ability to couple with water or moisture that may be present or become incorporated into the inventive treatment compositions through processing, packaging and during application. These are generally added in addition to the more volatile solvent, although they may be employed alone as well as in any suitable combination or mixture capable of stabilizing the dispersion of the hydrophobically modified silica particles during processing, packaging, storage and use.

Suitable organic solvents include, but are not limited to, C1-6 alkanols, C1-6 diols, C1-10 alkyl ethers of alkylene glycols, C3-24 alkylene glycol ethers, polyalkylene glycols, short chain carboxylic acids, short chain esters, isoparafinic hydrocarbons, mineral spirits, alkylaromatics, terpenes, terpene derivatives, terpenoids, terpenoid derivatives, formaldehyde, and pyrrolidones. Alkanols include, but are not limited to, methanol, ethanol, n-propanol, isopropanol, butanol, pentanol, and hexanol, and isomers thereof. Diols include, but are not limited to, methylene, ethylene, propylene and butylene glycols. Alkylene glycol ethers include, but are not limited to, ethylene glycol monopropyl ether, ethylene glycol monobutyl ether, ethylene glycol monohexyl ether, diethylene glycol monopropyl ether, diethylene glycol monobutyl ether, diethylene glycol monohexyl ether, propylene glycol methyl ether, propylene glycol ethyl ether, propylene glycol n-propyl ether, propylene glycol monobutyl ether, propylene glycol t-butyl ether, di- or tri-polypropylene glycol methyl or ethyl or propyl or butyl ether, acetate and propionate esters of glycol ethers. Short chain carboxylic acids include, but are not limited to, acetic acid, glycolic acid, lactic acid and propionic acid. Short chain esters include, but are not limited to, glycol acetate, and cyclic or linear volatile methylsiloxanes.

Organic solvents that are less volatile can optionally be included in combination with the more volatile solvent for the purpose of modifying evaporation rates. Suitable examples of less volatile organic solvents are those with lower vapor pressures, for example those having a vapor pressure less than 0.1 mm Hg (20° C.) which include, but are not limited to, dipropylene glycol n-propyl ether, dipropylene glycol t-butyl ether, dipropylene glycol n-butyl ether, tripropylene glycol methyl ether, tripropylene glycol n-butyl ether, diethylene glycol propyl ether, diethylene glycol butyl ether, dipropylene glycol methyl ether acetate, diethylene glycol ethyl ether acetate, and diethylene glycol butyl ether acetate (all available from ARCO Chemical Company).

Volatile solvent is typically present at a level of between 99.95 to 5 wt. % of the finished treatment composition.

Propellant

Propellants which may optionally be used in conjunction with the inventive treatment compositions are those well known and conventional in the art and include, for example, a hydrocarbon, of from 1 to 10 carbon atoms, such as n-propane, n-butane, isobutane, n-pentane, isopentane, and mixtures thereof; dimethyl ether and blends thereof as well as individual and mixtures of chloro-, chlorofluoro- and/or fluorohydrocarbons- and/or hydrochlorofluorocarbons (HCFCs). Useful commercially available compositions include A-70 (Aerosol compositions with a vapor pressure of 70 p.s.i.g. available from companies such as Diversified and Aeropress) and Dymel 152a (1,1-difluoroethane from DuPont). Also suitable as propellants are compressed gases such as carbon dioxide, compressed air, nitrogen, and possibly dense or supercritical fluids may also be used, either alone or in combination, and alternatively in combination with other propellant types.

In dispensing applications employing a propellant, the inventive treatment composition is dispensed by activating the actuator nozzle of an aerosol type container onto the area in need of treatment, and in accordance with the application manner as described herein, the area is treated when the inventive treatment composition is deposited onto the surface, the propellant normally dissipating during the dispensing step so that minimal residue of the propellant remains associated with the inventive treatment composition as it impinges the surface to be treated. The nature of the atomization by extremely rapid propellant dissipation is believed to produce extremely fine droplets of the inventive treatment compositions to aid in producing an even spray pattern and allow deposition of a uniform and consistent film of the liquid inventive treatment composition onto the surface, although alternative non-propellant assisted delivery means may also be suitably employed.

If a propellant is used, it will generally be in an amount of from about 1 wt. % to about 75 wt. % of the aerosol formulation. Generally, the amount of a particular propellant employed should provide an internal pressure of from about 20 to about 150 p.s.i.g. at 70° F. in order to provide good atomization and delivery of the inventive treatment compositions.

Suspending Agent

Suspending agents may optionally be included in the inventive treatment compositions to improve the suspension and/or dispersion properties of the inventive compositions. Suspending agents when employed, may function to improve the suspension and dispersion properties of the hydrophobically modified fumed silica particles, other solid particulate additives, and other optional agents and functional adjuvants included in the treatment composition. They are generally employed at levels sufficient for stabilization and so that when present, the level of usage does not negatively impact the beneficial transparent properties of films provided by use of the inventive treatment compositions containing them.

Suitable suspending agents include polymers and surfactants, and combinations thereof.

Polymer type suspending agents include anionic, cationic and nonionic polymers. Examples include, but are not limited to vinyl polymers such as cross linked acrylic acid polymers with the CTFA name Carbomer, cellulose derivatives and modified cellulose polymers such as methyl cellulose, ethyl cellulose, hydroxyethyl cellulose, hydroxypropyl methyl cellulose, nitro cellulose, sodium cellulose sulfate, sodium carboxymethyl cellulose, crystalline cellulose, cellulose powder, polyvinylpyrrolidone, polyvinyl alcohol, guar gum, hydroxypropyl guar gum, xanthan gum, arabia gum, tragacanth, galactan, carob gum, guar gum, karaya gum, carrageen, pectin, agar, quince seed (*Cyclonia oblonga* Mill), starch (rice, corn, potato, wheat), algae colloids (algae extract), microbiological polymers such as dextran, succinoglucan, pulleran, starch-based polymers such as carboxymethyl starch, methylhydroxypropyl starch, alginic acid-based polymers such as sodium alginate, alginic acid propylene glycol esters, acrylate polymers such as sodium polyacrylate, polyethylacrylate, polyacrylamide, and polyethyleneimine.

Other optional suspending agents include anionic, cationic, nonionic, amphoteric and zwitterionic surfactants. Examples of surfactants that are useful as particle suspending agents, which can be categorized as acyl derivatives, include long chain amine oxides, and mixtures thereof. Exemplary suspending agents of this type are described in U.S. Pat. No. 4,741,855. Additional suitable suspending agents include ethylene glycol esters of fatty acids, preferably having from about 16 to about 22 carbon atoms. Also suitable are the ethylene glycol stearates, both mono and distearate; alkanol amides of fatty acids, for example stearic monoethanolamide, stearic diethanolamide, stearic monoisopropanolamide and stearic monoethanolamide stearate; long chain acyl derivatives including long chain esters of long chain fatty acids, for example, stearyl stearate and cetyl palmitate; long chain esters of long chain alkanol amides, for example, stearamide diethanolamide distearate, stearamide monoethanolamide stearate); and glyceryl esters, for example, glyceryl distearate, trihydroxystearin, a commercial example of which is Thixin® available from Rheox, Inc. Also suitable are long chain acyl derivatives, ethylene glycol esters of long chain carboxylic acids, long chain amine oxides, and alkanol amides of long chain carboxylic acids.

Other long chain acyl derivatives suitable for use as suspending agents include N,N-dihydrocarbyl amido benzoic acid and soluble salts thereof including for example the sodium and potassium salts; N,N-di(hydrogenated) C16, C18 and tallow amido benzoic acid species of this family, which are commercially available from Stepan Company (Northfield, Ill., USA).

Examples of suitable long chain amine oxides for use as suspending agents include longer chain alkyl dimethyl amine oxides, for example, stearyl dimethyl amine oxide.

Other suitable suspending agents include primary amines having a fatty alkyl moiety having about 12 or more carbon atoms, examples of which include palmitamine or stearamine; and secondary amines having two fatty alkyl moieties each having at least about 12 carbon atoms, examples of which include dipalmitoylamine or di(hydrogenated tallow) amine. Still other suitable suspending agents include di(hydrogenated tallow)phthalic acid amide, and crosslinked maleic anhydride-methyl vinyl ether copolymer.

In addition, other polymer and surfactant materials known in the art may also be suitably employed in the inventive treatment compositions provided that they do not negatively impact the performance of the protective films when applied to a receptive surface.

When included, the suspending agent is typically employed at a level of about 0.001 to 5 wt. % of the finished treatment composition, or at a level that does not impact the desirable beneficial optical properties of the films provided by use of the present invention.

Functional Adjunct

Treatment compositions, methods and treatment systems of the present invention may optionally further include one or more functional adjuncts. Functional adjuncts may be combined with the inventive treatment compositions, combined during processing of the concentrated process materials or process compositions, or alternatively post added or delivered simultaneously during dispensing and application of the inventive treatment compositions according to the methods and treatment systems described herein.

Functional adjuncts are optionally included to provide at least one additional beneficial property, functional and/or corollary benefit, or aesthetic enhancement to the treatment compositions, or the resultant protective coatings provided by use of the treatments compositions and/or treatment systems employing them. The functional property can be one that provides enhanced product properties owing to improved storage stability, and thus incorporating for example, but not limited to phase stabilizers, corrosion protection agents, dispersants, and the like, including combinations thereof for improving treatment composition storage properties when packaged. Additionally, functional adjuncts that provide enhanced dispensing properties, including for example, flow agents, atomization aids, wetting agents, spreading agents, evaporation modifiers, solvent couplers, drying aids, azeotropic cosolvents, droplet-size modifiers, and the like, including combinations thereof for improving the step of application wherein the treatment compositions are dispensed and applied to the targeted surface to provide the inventive protective properties described herein.

Further functional adjuncts may be included that provide enhanced protective benefits and/or corollary benefits to the protective films present on receptive surfaces treated by use of the inventive treatment compositions. Suitable functional adjuncts providing such enhanced protective benefits and/or corollary benefits may be selected from ultraviolet light absorbers, ultraviolet light blockers, free-radical scavengers, fluorescent whitening agents, colorants, dyes, pigments, photoactive particles, color changing dyes, color fading dyes, bleaching agents, fixative agents, perfume, fragrance, odor control agents, anti-static agents, and combinations thereof.

When included, the functional adjunct is typically employed at a level of about 0.001 to 5 wt. % of the finished treatment composition, or at a level that does not impact the desirable beneficial optical properties of the films provided by use of the present invention.

Water

Since the inventive treatment compositions described herein are generally non-aqueous, water is generally excluded from the composition, and materials employed, including optional functional adjuncts, are selected which are free of excessive water and/or moisture. The inventive treatment compositions and methods of application described herein may tolerate some water, particularly if a coupling solvent, selected from a water miscible, water soluble, and/or partially water soluble solvent or combinations thereof, is employed as an optional functional adjunct in the treatment composition. If water is present, it may be de-ionized, industrial soft water, or any suitable grade of water for the particular application.

For non-aqueous treatment compositions, water is preferably limited to levels of less than 5% by weight or volume, more preferably less than 2% by weight or volume and most preferably less than 1% by weight or volume. When coupling solvents are employed, water may be present at significantly higher levels, any level being suitable provided that the level of water and any necessary coupling agent does not interfere with the ability of the inventive treatment compositions to form transparent, renewable and durable surface protective coatings on the receptive surfaces to which they are applied.

Areas of Use

The methods, treatment compositions and treatment systems employing the inventive treatment compositions and methods according to the present invention may be used to treat a receptive surface of a substrate, material, article, and/or object, wherein the respective surfaces are receptive to treatment and capable of hosting the durable and non-permanent deposited film comprising the hydrophobically modified fumed silica particles in the form of silica particle agglomerates on the surface.

The treatment compositions of the present invention can be used for treating a variety of receptive surfaces of inanimate articles, including non-porous and porous surfaces comprising automotive and household materials, and their respective surfaces. Examples of suitable automotive surfaces and articles include, but are not limited to, wheels, wheel trim, wheel covers, removable wheel covers, splash guards, car panels and painted surfaces, clear-coated car surfaces, metal, painted metal fixtures, chromed articles, bumpers, bumper stickers, bug deflectors, rain deflectors, vinyl materials including car boots, wheel covers, convertible tops, camper awnings, sun shades, vehicle covers, license plates, plastic articles, lens covers, signal light lens covering, brake light lens covering, headlamp and fog light lens covering, and the like. Examples of suitable interior automotive surfaces include, but are not limited to, vinyl and upholstery surfaces, dashboard, dash instrument lens covering, seats, carpet, floor runners, speaker covers, and the like.

Treatment compositions of the present invention can be used on articles and surfaces found inside and outside the home, including for example, kitchen and bathroom areas, living areas, interior and exterior surfaces. Suitable surfaces include both porous and non-porous surfaces, materials and substrates. Non-limiting examples of non-porous surfaces include metals, metal oxides, aluminum, anodized aluminum, painted substrates, stainless steel, chrome, clear-coated automotive surfaces, ellastomers, vinyl, plastics, polymers, sealed wood, laminates, composites, and the like. Non-limiting examples of porous surfaces include fibers, textiles, non-wovens, woven materials, foam substrates, cloth, clothing, leather, upholstery, carpet, curtains, marble, granite, grout, mortar, concrete, spackling, plaster, adobe, stucco, brick, unglazed tile, tile, unglazed porcelain, porcelain, clay, wallpaper, cardboard, paper, wood, and the like.

Examples of suitable surfaces and articles found in and around a home dwelling include, but are not limited to, ceilings, walls, wallpaper, floors, counter tops, sinks, backsplashes, cabinets, wood paneling, laminates, stone, granite, marble, limestone, tile, porcelain, plastics, polymers, coated materials, caulking, grout, spackling, shower walls, shower enclosures, shower curtains including cloth, plastic and laminated, toilets, bidets, and the like. Suitable articles and materials that may be treated according to the present invention further include carpet, furniture, drapes, curtains, blinds, vinyl blinds, pull-shades, rugs, upholstered items, and the like.

Surfaces and materials exterior to the home on which the present invention may be used include exterior walls, trim, doors, gutters, windows, screens and window coverings, and the like. Materials of construction suitable for treatment include wood, painted surfaces, metal surfaces, vinyl, receptive glass, polymeric substrates, including plastic materials, and porous materials such as adobe, clay, concrete, stone, brick, mortar, stucco, siding, and the like that are located in an exterior environment.

In an embodiment, the protective coatings of this disclosure can provide anti-corrosion properties to a receptive surface. For example, the protective coatings may be applied to a component part to prevent or minimize corrosion of that component part. For such anti-corrosion applications, the coating can be transparent and result in a change of less than 3.0 Delta E units to the receptive surface measured before and after deposition of the coating, or the coating can be non-transparent and result in a change of more than 3.0 Delta E units (e.g., 3-9 Delta E units) to the receptive surface measured before and after deposition of the coating. Coatings that result in a change of more than 3.0 Delta E units typically exhibit greater durability and longer lasting properties than coatings that result in a change of less than 3.0 Delta E units. The coatings of this invention can be useful in applications where transparency is not a desired property, as well as applications where transparency is a desired property.

Polymeric Substrates

Articles treated according to the inventive methods and compositions as described herein may be selected from those articles of construction comprising polymeric substrates that normally exhibit hydrophobic surface properties in that they exhibit the tendency to collect dirt and/or bead water when water is applied to their untreated surfaces. Articles include those wholly constructed of, laminated with, and/or coated with a polymeric substrate, film, or coating.

Polymeric substrates include condensed polymers which are rendered into materials of construction having at least one treatable or receptive surface. These polymeric substrates can be in any physical form, for example, but are not limited to, panels, molded forms, foams, sheets, solid surfaces, laminated films and coatings on a secondary substrate, and the like. The polymeric substrates may have any desired physical properties, for example, but not limited to, forms that are substantially elastic, non-elastic, flexible, compressible, or essentially rigid, and combinations thereof.

Suitable articles of the present invention include those constructs and articles of construction typically found in and around the home and commercial environments featuring at least one treatable surface comprising a hydrophobic polymeric substrate, including for example, but are not limited to, plastics, elastomers and laminates used in the construction of floors, tiles, panels, walls, doors, ceilings, bathtubs, shower stalls, sinks, cabinets, countertops, fixtures, and the like.

Suitable polymeric substrates and articles constructed thereof, include, but are not limited to polyethylene terephthalate, polyamide, polyurethane, polyester, polyethylene, polyvinyl chloride (PVC), chlorinated polyvinylidene chloride, polyacrylamide, polystyrene, polypropylene, polycarbonate, polyaryletherketone, poly(cyclohexylene dimethylene cyclohexanedicarboxylate), poly(cyclohexylene dimethylene terephthalate), poly(cyclohexylene dimethylene terephthalate)glycol, polyetherimide, polyethersulfone, poly(ethylene terephthalate)glycol, polyketone, poly(oxymethylene), polyformaldehyde, poly(phenylene ether), poly(phenylene sulfide), poly(phenylene sulfone), polystyrene, polysulfone, polytetrafluoroethylene, polyurethane, poly(vinylidene fluoride), polyamide, polyamide thermoplastic elastomer, polybutylene, polybutylene terephthalate, polypropylene terephthalate, polyethylene naphthalate, polyhydroxyalkanoate, polyacrylate, poly(methyl)-methacrylate (PMMA), polytrimethylene terephthalate, polyvinylidene chloride and combinations thereof.

Suitable polymeric substrates and articles constructed thereof further include copolymeric materials made of one or more monomers selected from acrylate, acrylonitrile, butadiene, ethylene, formaldehyde, maleic anhydride, melamine, methacrylate, methyl methacrylate, phenol, propylene, styrene, urethane, and vinyl acetate. Specific examples of these copolymeric materials (and their common industrial acronyms) include acrylonitrile:butadiene:styrene (ABS), acrylonitrile:styrene:acrylate (ASA), ethylene:propylene (E/P), ethylene:vinyl acetate (EVAC), methyl methacrylate:acrylonitrile:butadiene:styrene (MABS), methacrylate:butadiene:styrene (MBS), melamine:formaldehyde (MF), melamine:phenol:formaldehyde (MPF), phenol:formaldehyde (PF), styrene:butadiene (SB), styrene:maleic anhydride (SMAH), styrene: acrylonitrile (SAN), styrene:butadiene (SBC), vinyl acetate:ethylene copolymer (VAE), and combinations thereof.

Also suitable are polymeric substrates and articles constructed of thermoplastic elastomers including, but not limited to, copolyester thermoplastic elastomer (TPC), olefinic thermoplastic elastomer (TPO), styrenic thermoplastic elastomer (TPS), urethane thermoplastic elastomer (TPU), thermoplastic rubber vulcanisate (TPV), neoprene, vinyl, silicone elastomer, and combinations thereof.

Methods of Use

Treatment compositions of the present invention are generally applied in a manner so as to deposit fine droplets of the liquid composition comprising the colloidally dispersed hydrophobically modified fumed silica particles in a volatile solvent as a continuous coating upon a receptive surface such that the droplets completely cover the surface to effectively merge to form a thin continuous liquid film upon initial deposition. This first manner of application is generally preferred for a single treatment application. Alternatively, the liquid treatment compositions can be applied in a manner to uniformly coat the area of the surface to a nearly complete extent as an array of fine droplets arranged in high density, but finely separated so as not to form a continuous liquid film. In this latter method of application, depending on the degree of surface protection desired, a single application, or multiple repeated applications of the inventive treatment compositions can be applied to produce the desired level of surface coverage.

Following this application step of applying the liquid treatment composition to the surface, the volatile solvent is left to evaporate in the second step of the process, effectively leaving a deposited film of particles in the form of silica particle agglomerates than is essentially transparent. The evaporation of the volatile solvent results in a thin, macroscopically uniform and essentially transparent film on the receptive surface that is detachable and renewable, and exhibits excellent dirt-repellency, and also water-repellency owing to high. water contact angles sufficient to effect beading water incident on the surface so that the deposited film exhibits provides soil- and water-repellency, and the ability of the soiled surface to be self-cleaning, and readily cleanable with only the application of water.

Without being bound by theory, it is believed that the evaporation of the volatile solvent of the present invention provides for some relative ordering and separation of the particles across the area of the treated surface following application, without significant clumping or association between the particles and/or agglomerates, which likely results in a mono-layer of deposited particles having favorable optical properties owing to the absence of significant scattering centers due to otherwise unfavorable clustering of agglomerates. Thus, treatment compositions of the present invention tend to form essentially transparent films on the treated surfaces that are nearly invisible to the human eye, even when applied to particularly glossy or highly reflective surfaces where surface defects or other coatings in the art are readily discernable. Without being bound by theory, it is further believed that the volatile solvent serves to effect reversible attachment of the particles to the receptive surfaces by weaker, non-covalent binding forces by enabling the particles during the evaporation step to settle onto the surfaces in their lowest energetically favorable binding states with maximum surface contact. Owing to the extremely small particle sizes, and the ability of the particle agglomerates to adopt the most favorable positions during solvent evaporation, binding forces owing to hydrophobic-hydrophobic interactions and van der Waals forces are sufficient to enable the hydrophobically modified silica particles to bind tightly enough to suitably receptive surfaces to effectively resist displacement even under flowing water and/or air, yet be readily removed when desired by moderate means.

Thus, the films produced by the treatment compositions, treated articles bearing such films according to the methods of the present invention provide films that are detachable and may be readily removed by physical means, such as by abrasion, rubbing or wiping using some appropriate physical tool or wiping article and/or by chemical means, such as by use of a surface active agent, dispersant and/or solvent, or some suitable combination of these to overcome the relatively weak binding energies of the particles and displace them from the surface. It is noted that water alone under typical temperatures and pressures, such as rain water, splashed water and a moderate water spray using a home garden hose, and further, even water with significant soil load and contaminants present, is not effective in displacing the films of the present invention, thus enabling them to act as detachable but durable protective coatings on receptive surfaces and substrates that favorably repel dirt, and owing to their hydrophobic nature and high water contact angles are water-repellent and capable of being cleaned of any adhering soil or dirt using water alone. The treated surfaces also exhibit a surprising ability to repel and resist the adhesion of dry soils and particulate matter, such as brake-dust and household dust, and the surfaces bearing the protective films according to the present invention can be cleaned using a gentle stream of air alone, or if a vertical surface the use of a gentle tapping, shaking or slight percussive motion to displace particulate soils. Thus, receptive materials treated according to the methods and treatment compositions of the present invention exhibit dirt-repellency, are self-cleaning, and their favorable repellency properties provide easy cleaning using water alone. Further, treated materials exhibit easier cleaning and easier next-time cleaning in that non-removable and/or excessive soil load that may adhere to the film are prevented from associating with the underlying surface, and thus are more readily removed from the surface during a cleaning step employing a cleaning agent, such as a surfactant solution, owing to the films being detachable in nature and thus acting as a removable sacrificial barrier in protecting the treated surface from soil adhesion and build-up, while still providing self-cleaning characteristics to the surface. Surfaces thus cleaned to remove a previously applied protective film, may then be reprotected by a fresh application of the present inventive treatment compositions to restore the self-cleaning and easier next time cleaning benefits. Thus, the surface treatment and resulting protective benefit is infinitely renewable in that the surface may subsequently be retreated periodically, or at any desired interval without any harm or degradation of the original surface.

In addition, an inventive protective coating on a previously treated surface may be renewed by repeated application of the inventive treatment compositions, without prior removal of the protective coating, even if the coating is partially worn away or damaged. Generally, it is desirable to remove a prior coating, particularly if the surface becomes damaged and/or excessively soiled between treatments, but this is not a requirement. Without being bound by theory, it is believed that reapplication of the inventive treatment compositions to a previously treated surface, owing to the reintroduction of the solvent carrier and an additional fresh aliquot of the hydrophobic silica agglomerates, results in sufficient resuspension and redistribution of the inventive materials across the surface in a manner that essentially renews the protective coating while preventing excessive build-up that would otherwise diminish the superior optical properties exhibited by the inventive treatment compositions.

Application Means

Application of the inventive treatment compositions to a receptive surface may be achieved by use of an application device employing any suitable means known in the art capable of producing a fine distribution of fine liquid droplets and directing them to the surface to be treated. The application device can be an aerosol or non-aerosol device. Treatment compositions can be sprayed using any suitable type of sprayer. One suitable type of sprayer is an aerosol pressurized package using a propellant. If an aerosol sprayer is used, it can use any suitable type of propellant. The propellant can include hydrocarbon propellants, or non-hydrocarbon propellants. A non-hydrocarbon propellant may include, but is not limited to a compressed and/or liquefiable gas. Suitable compressed gases include, but are not limited to compressed air, nitrogen, inert gases, carbon dioxide, etc., and suitable liquefiable volatile materials include, but are not limited to propane, butane, pentane, and materials selected from hydrocarbons, fluorocarbons, perfluorocarbons, chlorofluorocarbons, and mixtures thereof.

In one embodiment, a pressurized aerosol package is employed, using the liquid treatment compositions of the present invention, optionally pressurized by use of a suitable pressurized gas, compressible liquid and/or liquid propellant, and/or gaseous propellant or combinations thereof, in combination with a dispensing valve capable of suitably dispensing the liquid treatment composition in the form of a plurality of fine droplets.

Suitable aerosol delivery includes the Truspray® system (available from Boehringer Ingelheim-Steag microParts, Dortmund, Germany) which employs capillary atomization technology to deliver fine atomization with reduced propellant and solvent levels, enabling more concentrated colloidal dispersions and/or thickened treatment compositions according to the present invention to be suitably dispensed.

Also suitable are application devices and/or dispensing devices not requiring the use of a pressurization means and/or propellant means.

One suitable example disclosed in U.S. Pat. No. 6,708,852 to Blake describes a mechanically pressurized dispensing system that offers an alternative to chemically pressurized aerosol dispensers. The system is fitted over a standard container holding a liquid product, and includes a dip tube assembly to draw liquid into the dispensing head assembly, where the contents are released through the dispensing head assembly, via the nozzle and valve. A twist of the threaded cap raises a piston, thereby opening a charging chamber within the dispensing head assembly. This creates a vacuum with the resulting suction pulling the product up through the dip tube to fill the charging chamber. Twisting the cap in the opposite direction lowers the piston in a down stroke, which closes the charging chamber, forcing the product into the expandable elastic reservoir where it is then discharged through the nozzle.

Also suitable are applicator devices in which the container encloses the liquid treatment composition present in a separate pouch, either foiled or foil-less bag, that is surrounded by propellant within the container and surrounding the inner sealed pouch. Examples include those disclosed in U.S. Pat. No. 6,196,275 to Yazawa et al., U.S. Pat. No. 4,308,973 to Irland, and U.S. Pat. No. 5,730,326 to Kaeser describing a rechargeable container. U.S. Pat. App. 2003/0102328 to Abplanalp et al. describes an aerosol container lacking a return spring and product dip tube. For some applications, a dip tube may still be appropriate. The valve may have multiple product delivery openings. The container may use a propellant driven piston to dispense the product or the product may be in a collapsible, flexible bag.

U.S. Pat. No. 5,111,971 to Winer describes a pressurized liner-sleeve assembly that can be fitted with an aerosol valve, and requires no propellant.

Elimination of the chemical propellant can reduce or eliminate volatile organic content (VOC) to allow compliance with various state and federal regulations designed to reduce green-house gas emissions. Alternatives to chemically pressurized dispensers include various mechanically pressurized models that obtain prolonged spray time by storing a charge without the use of chemical propellants. Such "stored charge" dispensers include types that are mechanically pressurized at the point of assembly, as well as types that may be mechanically pressurized by an operator at the time of use. Stored charge dispensers that are pressurized at the point of assembly often include a bladder that is pumped up with product. Examples include those described in U.S. Pat. Nos. 4,387,833 and 4,423,829.

Stored charge dispensers that are pressurized by an operator at the time of use typically include charging chambers that are charged by way of screw threads, cams, levers, ratchets, gears, and other constructions providing a mechanical advantage for pressurizing a product contained within a chamber. This type of dispenser is generally be referred to as a "charging chamber dispenser." Many ingenious charging dispensers have been produced. Examples include those described in U.S. Pat. No. 4,872,595 of Hammett et al., U.S. Pat. No. 4,222,500 of Capra et al., U.S. Pat. No. 4,174,052 of Capra et al., U.S. Pat. No. 4,167,941 of Capra et al., and U.S. Pat. No. 5,183,185 of Hutcheson et al., which are expressly incorporated by reference herein.

U.S. Pat. App. 2005/0035213 to Erickson et al. describes an ultrasonic spray coating system comprising an ultrasonic transducer with spray forming head, integrated fluid delivery device with air and liquid supply passage ways, support brackets and an ultrasonic power generator. The ultrasonic transducer consists of an ultrasonic converter that converts high frequency electrical energy into high frequency mechanical energy. The converter has a resonant frequency. A spray forming head is coupled to the converter and is resonant at the same resonant frequency of the converter. The spray forming head has a spray-forming tip and concentrates the vibrations of the converter at the spray-forming tip. The separate passage ways for air and the liquid supply allows the treatment compositions to remain separated from potential contaminants until used. The ultrasonic transducer can produce a fine mist or a spray as the transducer is adjusted. Additional ultrasonic spray devices are described in U.S. Pat. App. 2004/0256482 to Linden and U.S. Pat. No. 6,651,650 to Yamamoto et al., which describes an ultrasonic atomizer for pumping up a liquid from a liquid vessel by an ultrasonic pump and atomizing the liquid by passing it through a mesh plate formed to have multiplicity of minute holes. The device can be controlled for automatic, manual, or intermittent operation.

Another non-limiting example is the TrueSpray™ (TTP Group, The Technology Partnership) and TouchSpray™ (ODEM affiliates of TTP, Bespak PLC and PARI GmbH, Germany) atomization devices which both employ a microdroplet generating system based on a perforated membrane that is vibrated at selected frequencies to convert a continuous flow of an atomizable liquid composition on one side of the membrane into a fine spray of liquid droplets emanating from the opposite side. The system employs an electrical means using either a battery or other electronic power supply and a circuit to control the vibrational frequencies, amplitudes and duration of membrane oscillation in order to control liquid flow and dispensing rates as well as droplet size, distribution, velocity and atomization rate. A favorable property of this application means is the tendency of the system to produce smaller liquid droplet sizes on the order of 10 to 100 microns in diameter, with a majority of the liquid droplets of a size within several standard deviations of the mean liquid droplet size, thus producing a homogeneous distribution of fine liquid droplets of uniform size, which would be capable of forming a more uniform surface film of applied material when used to deposit the inventive treatment compositions onto a receptive surface.

Also suitable are electrostatic applicators, which may be employed as a delivery means that combines any suitable atomization means with a dispenser capable of imparting a unipolar charge on the dispensed liquid droplets, which may be selected to be net positive or net negative depending on the conditions desired and target substrate. Imparting a unipolar charge to the dispensed droplets acts to disperse them during atomization, as the like-charged droplets tend to repel one another so that coherence of the spray pattern of the plurality of droplets is maintained while the droplets are in flight. The unipolar charge, suitably selected, may also act to accelerate, attract and/or adhere the charged droplets onto either a neutral, polarizable or oppositely charged surface to effectively increase deposition efficiency and further decrease overspray and droplet bounce from the target surface, as well as producing more uniform films on the surface.

Treatment System (Kit)

The inventive treatment compositions, suitably packaged in a dispensing and/or applicator means for direct application to a receptive surface, may be combined in the form of a treatment system (treatment kit or kit). The treatment system may further contain instructions for use of the inventive treatment compositions, including a list of suitable surfaces and substrates that may be treated, application techniques and application instructions illustrating use of and most suitable means of applying the compositions to surfaces, pre-cleaning instructions, drying instructions, and post-treatment cleaning instructions, and the like.

Generally, it is desirable to treat a surface that has been previously cleaned so as to form a first protective coating on a cleaned receptive surface. This is typically done for most surfaces by washing with a detergent, hard surface cleaner, soap or some similar cleaning agent followed by either rinsing with water and allowing to dry, or wiping dry directly, or wiping dry after rinsing with water. Generally, it is desirable to remove all trace residue of water, cleaning agent and other adherent materials before treatment. The inventive treatment compositions may be applied to damp or slightly wetted surfaces, but generally a substantially dry surface, such as one free of adherent water droplets, to which the inventive treatment compositions are applied provides for the most appealing aesthetic surface treatment. Thus, treatment systems according to the present invention may optionally include a drying article, such as for example, but not limited to an absorbent material, a drying aid, and/or combinations thereof. Examples of suitable absorbent materials that may be used as a drying article include, but are not limited to a woven, non-woven, sponge, polymeric foam, microfiber, paper towel, paper pad, tissue or other similar absorbent article or wiping article capable of effectively absorbing and/or removing water from a wetted surface prior to application of the inventive treatment compositions. Other alternative drying articles include drying devices. Examples of suitable drying devices include for example, but are not limited to, a compressed gas source, infrared heat generating device, forced air device, such as a powered fan, combinations thereof, and the like.

Preparation of Treatment Compositions

Treatment compositions according to the present invention may be prepared by a variety of methods well known in the art depending on the quantity and scale desired. For the purpose of consistency in preparing small batches for testing and evaluation, inventive treatment compositions were prepared using process compositions, i.e. concentrated hydrophobically modified fumed silica dispersions as indicated, produced according to the inventive process described herein, and then further processed in the following manner described below suitable for obtaining quantities of 100 to 5,000 grams of a finished or ready-to-use treatment composition. First, a major aliquot, or total desired level of the volatile solvent is weighed into a plastic vessel, optionally with a remaining minor aliquot of the volatile solvent retained in order to later rinse the walls of the mixing vessel, if desired. Stirring is then begun using a conventional motorized mixer using a mechanical stirring rod of suitable size, operated at a speed of about 300 to 400 r.p.m. sufficient to create a smooth vortex without splashing of the volatile solvent. Addition of the optional dispersing agent, and/or addition of the optional durability agent, if any, is performed by slowly adding each separately in turn and mixing sufficiently to achieve a uniform solution and/or suspension of the agents in the volatile solvent, generally following about 5 to 10 minutes mixing duration. The process composition is then added slowly to the solution, and after complete addition, any remaining aliquot of the volatile solvent added in such a manner as to rinse any adhering particles on the mechanical stirring rod and/or sides of the mixing vessel into the bulk liquid. The mixing speed is generally maintained at 400 r.p.m., but may optionally be increased to about 1000 r.p.m. if desired, and stirring continued for a time sufficient to produce a homogeneous dispersion of the particles, which can be as short as a minute or so, or longer if additional materials are to be added. Alternatively, the optional dispersing agent, and/or optional durability agent may be added at this stage of the mixing to produce a final treatment composition.

This approach produces suitable treatment compositions of colloidal dispersions of the hydrophobically modified fumed silica particles according to the present invention in a volatile solvent, which may then be combined with a suitable applications means to provide for suitable dispensing onto a target surface. In one embodiment, for example, the treatment compositions may be packaged into a suitable aerosol container (i.e. a conventional pressurized spray can with pin hole nozzle) as an application means combined in the form of a treatment system, and optionally combined with a propellant or compressible gas to provide for suitable dispensing by atomization.

In another embodiment, treatment compositions may be processed further with addition of, and/or dilution with additional volatile solvent, and/or additional optional suspending agent(s), and/or additional optional functional adjuncts, and/or optional propellant prior to packaging or use. In yet another alternative embodiment, the colloidal dispersion of the hydrophobically modified fumed silica particles may be packaged or associated with a non-aerosol applicator for dispensing by suitable means not requiring direct pressurization and/or use of a propellant.

For testing purposes, treatment compositions prepared from the process compositions described herein comprising dispersions of the hydrophobically modified fumed silica particles in the volatile solvent were applied using the Pre-Val™ system commercially available from Precision Valve (New York, N.Y.).

Preparation of Samples for Particle Size Analysis

Particle size analysis of the hydrophobically modified fumed silica particles was performed following application to a treated surface by use of scanning electron microscopy (SEM) to image and evaluate particle size, distribution and coverage of the particles present in-situ on the surface. Representative substrates were tested, including plastic and metal surfaces, by employing flat plastic and aluminum test panels, respectively, of approximately 1"×1" size that are carefully cleaned with anhydrous isopropanol and dried prior to use. Coated test panels are prepared by first covering one-half of the panel (approximately ½"×1" portion) with heavy stock paper or suitable barrier that will not wet through or overspray during application of test formulations, which are then sprayed manually in essentially the same manner as used in applying a spray paint to a surface, by evenly spraying the treatment compositions onto the test panel surface using a smooth uninterrupted linear motion during spraying, with the nozzle located approximately 6" from the surface, with the spraying action commencing a short time prior to reaching the one edge of the test panel and continuing for a short time after passing the second edge of the test panel in order to produce a uniform coating. The treated panel is allowed to dry with the partial cover paper attached, and then mounted onto a carrier sheet, e.g. a thicker piece of paper stock by using double sticky tape, and the sample stored under a dust cover prior to imaging to preserve the treated surface.

The surface morphology of the test panels coated with the inventive treatment compositions were examined using a Hitachi S-4300SE SEM (Hitachi USA) operated at an accelerating voltage of 2 kilovolts (KV). The test panels were dried at room temperature and no additional coating was performed prior to the examination.

Figure 2:
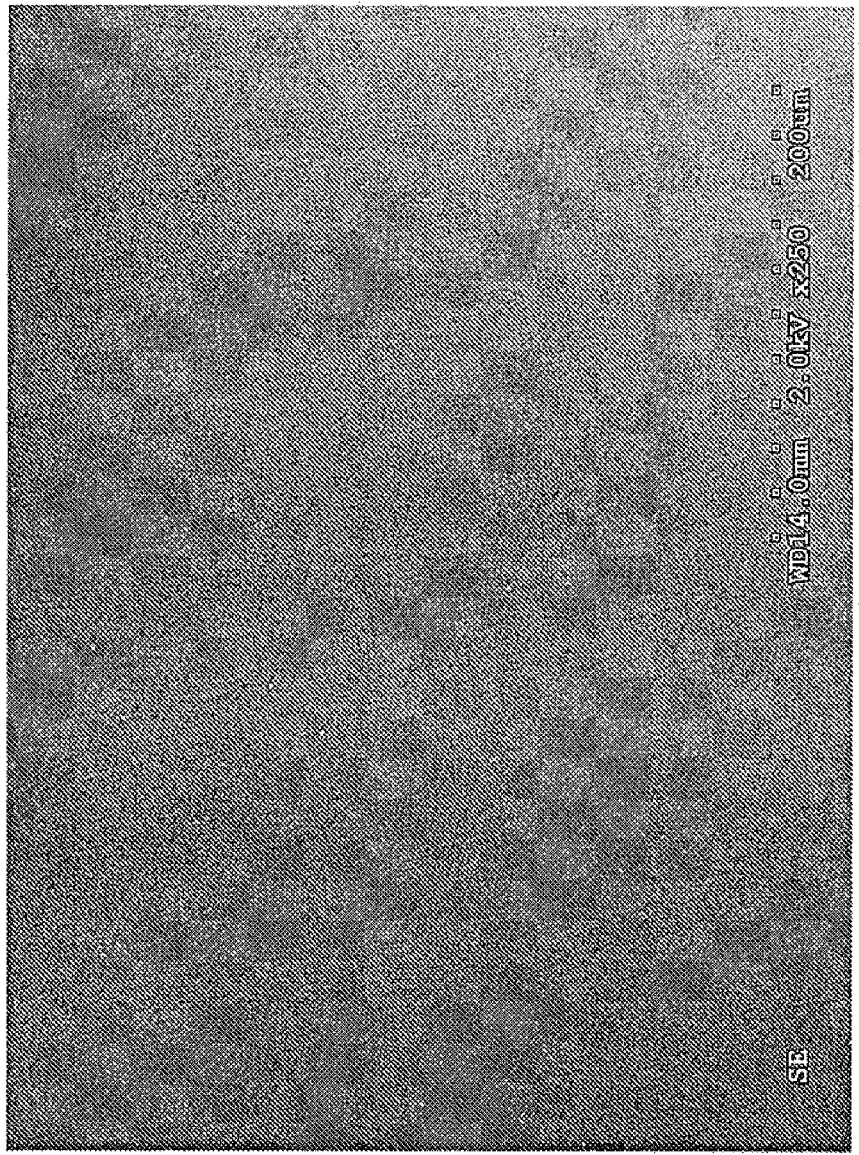
FIG. 2 is an SEM image of one embodiment of an inventive treatment composition, containing about 0.5 wt. % active silica processed according to the methods of the present invention according to inventive treatment composition Example 15, applied to a black automotive test panel according to the methods of the present invention as described herein below.

Results of the SEM imaging are shown in the accompanying FIGS. 1 and 2. In FIG. 1, a black test panel was treated with a conventional *Lotus* effect coating formulation prepared according to the methods described in U.S. Pat. Pub. No. 2004/0213904, corresponding to comparative Example 21 as referenced herein. By eye, the panel treated by the comparative material appeared visually hazy and the SEM image shows a generally uneven (non-homogenous) surface covered by small particles presumed to be larger silica agglomerates and/or clumps of agglomerated material. In FIG. 2, a black test panel was treated with the inventive treatment composition (Example 15) employing means of application according to the methods of the present invention, but otherwise prepared, treated and evaluated in an identical manner as the first test panel. By eye, the panel was extremely glossy and reflective, no noticeable film or haziness being apparent on the surface under normal lighting conditions. The SEM image in FIG. 2 reveals an extremely smooth and uniform film of particulate materials on the surface of the panel, evidence of a very isotropic and homogeneous surface morphology. The scale of both SEM images is about 200 μm, corresponding to an effective magnification of about 250×.

Atomic Force Microscopy

Figure 3:
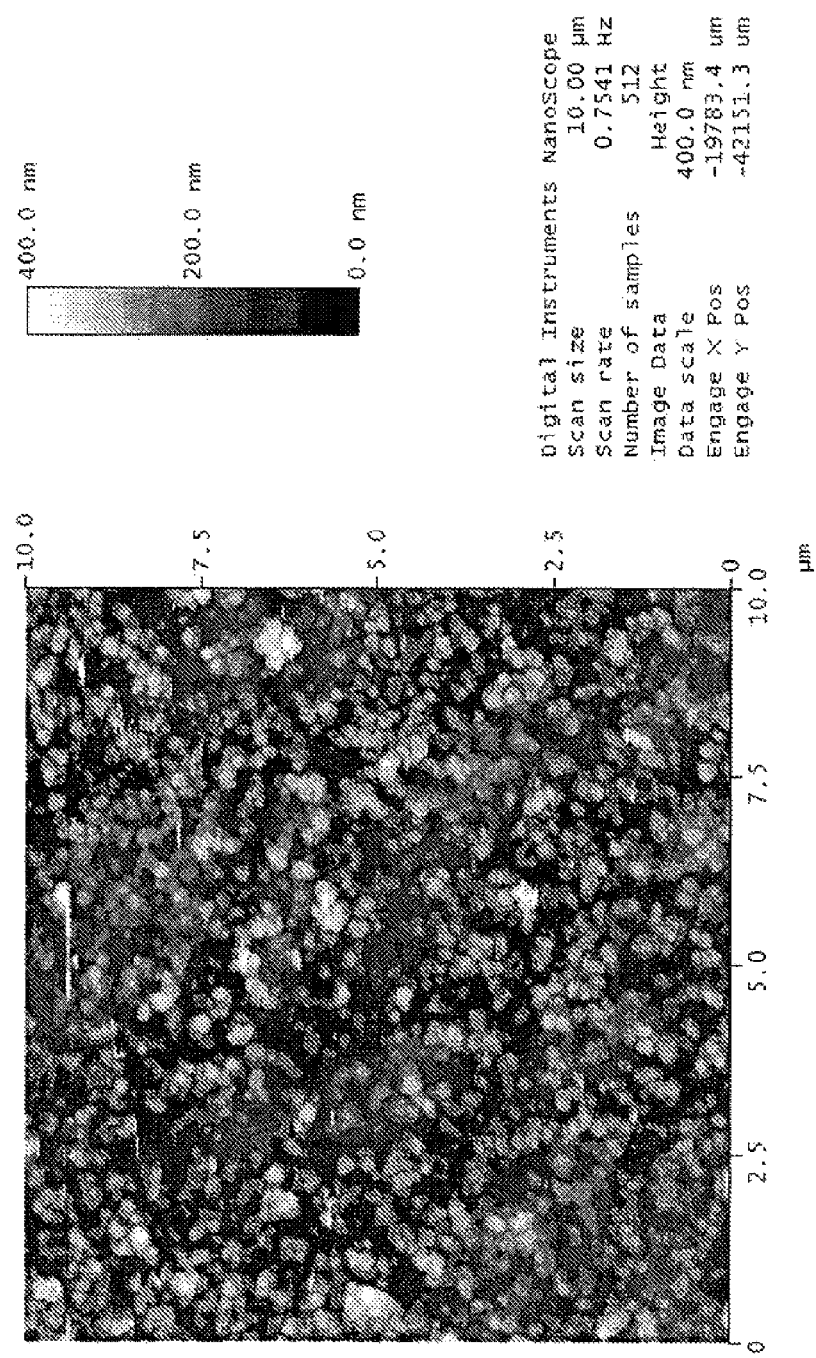
FIG. 3 is an atomic force microscope (AFM) topographical image of a treated black paint panel bearing a renewable coating applied according to the present invention.
Figure 4:
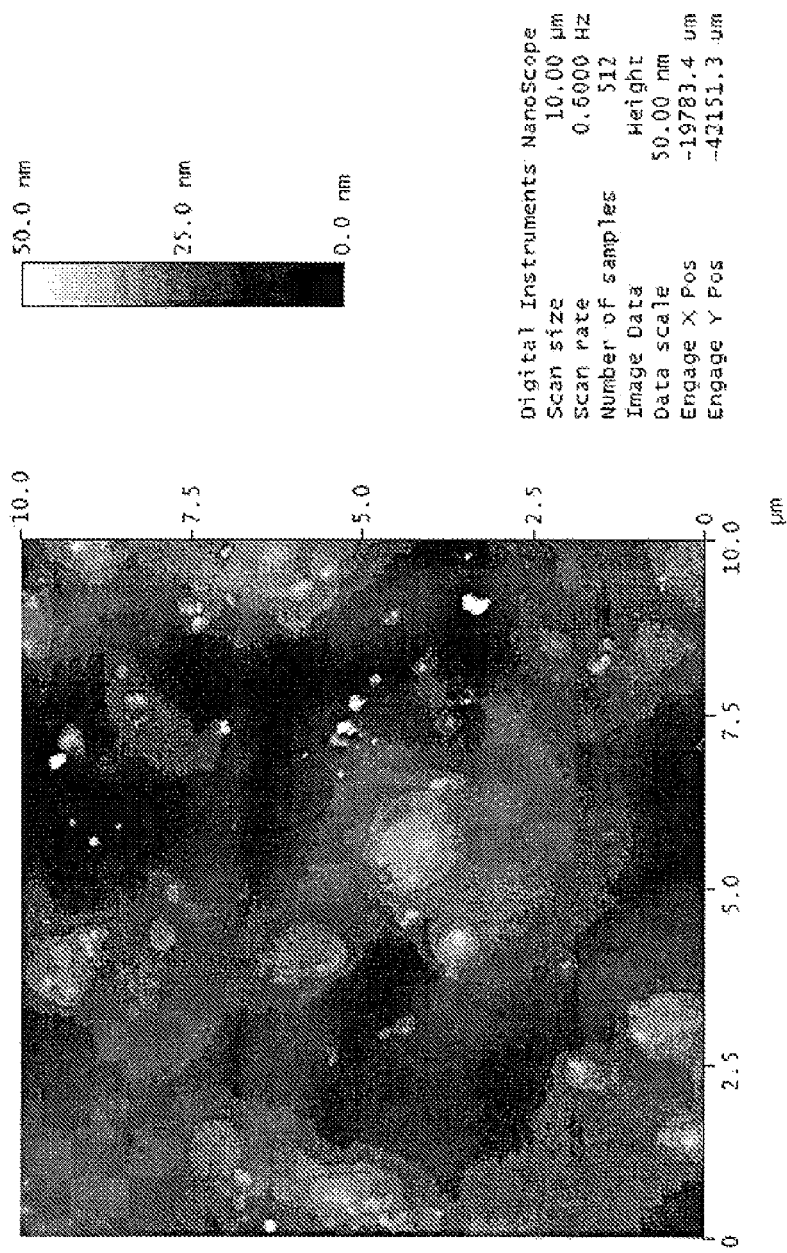
FIG. 4 is an AFM topographical image of the untreated black paint panel prior to treatment showing the original, unmodified surface.

Atomic force microscopy (AFM) was used to determine the extent and nature of the renewable surface modification effects according to the materials, treatment compositions and methods of application of the present invention. The AFM technique allows virtual imaging of the surface at a scale fairly comparable to that of the applied deposited materials so that surface topography can be ascertained to a high degree of precision. AFM images were obtained using a Digital Instruments Nanoscope III in non-contact mode with Olympus Tapping Etched Silicon Problem Aluminum-coated (OTESPA) sensing tips. Images were acquired from the center of each one inch square segment of panel. Although phase data was simultaneously acquired, no significant phase difference in the topography were detected, so images were generated without including this factor. Photomicrographs of the AFM data generated images are presented herein with appropriate vertical height scales indicated by the relative intensity of the image at the indicated coordinates, scaled from black (0) to white (1) on a relative basis with respect to the relative vertical height range indicated in the key insert accompanying the photomicrograph, and the horizontal length scale length is indicated on the borders in units of micrometers (um). FIG. 3 shows typical topographical images obtained on a treated black paint panel after treatment with a treatment composition applied according to the present invention, compared to FIG. 4 of an untreated black paint panel.

Preparation of Coated Paint Panels

Treatment compositions of the present invention were applied to a variety of surfaces for testing and evaluation, using representative materials selected for convenience of testing under controlled conditions including a clear coated black painted metal rectangular test panel obtained from ACT Laboratories Co., Hillsdale, Mich., designated APR41841, Batch 50505412, having an exceptionally high gloss surface owing to clear-coating finish R10CG060Z UreClear. Test panels were first thoroughly cleaned with isopropyl alcohol (IPA), washed with a soap and water solution, and finally rinsed with IPA, rinsed with de-ionized water, wiped dry with a dry lint-free paper towel. Visual inspection of each panel was performed to insure cleanliness and panels were handled by the edges to prevent fingerprints from marring the surface. Selected portions of the panel were masked to produce control and treatment areas, the middle roughly ⅓ area section being masked by use of a folded paper covering the center of the test panel or temporary barrier when sprayed to prevent overspray. Samples were placed in a holder so that they could be sprayed while in a vertical orientation. After masking, the exposed right and left side sections were treated by spraying test formulas using the PreVal™ sprayer system, held about 8 to 10 inches above the panel surface with spraying times of about 3 seconds, in a consistent overlapping spray pattern with motion from top to bottom of the panel, repeated consistently for every panel in the set, which usually included three sets of panels and four replicates per set per treatment composition under evaluation. Following spraying, test panels are either dried at 80° C. for 15 minutes (accelerated drying), followed by at least 5 minutes of cooling time, or allowed to dry at room temperature or about 70° F. overnight or until dry by appearance (typically 5-30 minutes depending on the surface and up to two hours for heavy applications on some non-porous surfaces).

The first set of panels was used for evaluation of hydrophobic surface modification with respect to water repellency ("Roll Off Test"), appearance evaluation with a haze meter instrument ("Chrome Test"), and gloss-meter instrument, and durability testing under repeated water rinse conditions ("Durability Test"). The second set of panels were used to evaluate self-cleaning soil repellency characteristics measured both qualitatively by visual rankings using trained evaluators and/or quantitatively using a combined gloss-meter and colorimeter instrument.

Roll Off Test

To measure the ability of treated surfaces to repel water, contact angle measurements and visual evaluation of the behavior of a water droplet was performed. A single drop of tap water (roughly 0.05 mL) was applied to the test panel surface held in a horizontal position. Contact angles were measured using an N.R.L. Model C.A. 100-00 goniometer (Rame-Hart, Mountain Lake, N.J.). Surface behavior of the water droplet was observed while the panel was moved and rocked gently while held by hand in a generally horizontal position, and a rating score assigned to the treated panel based on the behavior of the water droplet as described below:

| Rating | Description of Visual Behavior |
|---|---|
| 1 | "Marble on a surface" - water droplet rolls easily |
| 2 | Rolls easily, but sticks occasionally |
| 3 | Rolls freely but sticks some times |
| 4 | Rolls freely but sticks more often |
| 5 | Remains mostly in place with hardly any movement |
| 6 | Water droplet remains fixed in place (untreated surface) |

Roll Off Height Test

In addition to visually assessing roll off behavior, a "roll off height" measurement was performed to determine the height of inclination required for water to roll off from a panel following a surface treatment to be evaluated. Panels were prepared using the same approach as described in the preceding Roll Off Test herein.

Panels to be evaluated are then placed on a flat or elevated flat surface in a horizontal position, with one side of the panel, and if rectangular in shape this being one of the short sides of the rectangular panel, placed in close proximity to a vertically positioned scaled ruler placed perpendicular to the flat or elevated surface such that the height of the selected edge as it is displaced from the horizontal position can be readily measured by comparing the edge to the markings on the scale.

With the panel in the initial horizontal position, from about three to five independent drops of water (about 0.1 mL each) are gently pipetted onto the panel in an approximately straight line located approximately parallel to the selected edge and located approximately 1 inch from the selected edge. The panel is then lifted so as to elevate the selected edge of the panel in an upward vertical direction slowly and smoothly to prevent any undesirable motions, until all of the water droplets "break free of the surface" and/or begin to move or roll down the inclined surface of the panel. The height at which the drop begins to roll off is obtained from the scale, being the "Roll Off Height", and generally expressed in centimeters (cm).

Any residual liquid (spotting or trailing) after the drops have rolled off is noted. Additional replicates or measurements of the Roll Off Height are obtained by rotating the test panel 180 degrees and repeating the test again.

Chrome Test

All appearance measurements under identical conditions were taken either before and after treatment, or taken from treated and untreated (masked) sections of the test panel, with the difference between these measurements calculated to determine changes as a result of the treatment or soiling test employed. Colorimetric, gloss and haze measuring instrumentation and techniques can be employed to demonstrate the surprisingly transparent nature of the surface protective films and coatings formed onto receptive surfaces by means of employing the inventive treatment compositions.

Colorimeter measurements were performed using a Minolta spectrophotometer, Model CM-508D, Serial No. 15711032, with an illuminating/viewing geometry selected to compensate for specular reflection, SCE (specular component excluded), obtained from Konica Minolta Photo Imaging Inc. Instruments Systems Division, Mahwah, N.J.

Measurements before and after treatment or soiling were taken as described above, although tests can be done in different order to enable sequential testing against the various test methods for convenience. All measurements are generally replicates of duplicate or additional trials that are then averaged, differences before and after treatment being reported at Delta E, which is the total color difference between the sample and a reference sample, or alternatively the initial untreated and final post-treated sample after treatment was applied. To determine the major contribution to the Delta E value, Delta L and the colorimetric "a" and "b" parameters were examined and Delta L was found to best represent, and be most sensitive to changes in the visually appearance of treated materials, likely owing to the colorimetric "L" parameter being the parameter that tracks total neutral shade values from pure black (L=0) to pure white (L=100) in the absence of any color contributions. Similar measurements were also employed to measure the relative influence on Delta E and Delta L following application and removal of soil to provide an approach to measuring comparative soil removal. Visual evaluation of the surfaces held at a reflective angle to a light source (a suitable example being normal overhead fluorescent room lighting, incandescent lamp and outdoor sunlight) was also performed to judge aesthetic characteristics of treated surfaces, in particular appearance associated with common visual descriptors including: "uneven" and/or "streaky", "hazy", cloudy" and/or "dull", "pearlescent" and/or "rainbow effect", and "clear" and/or "glossy". Here, both "pearlescent" and "rainbow effect" refer to the tendency of thin transparent films, depending on their thickness, regularity of thickness and the substrate to which applied, produce interference and diffraction effects upon reflection of incident white light which are perceived as a plurality of colored patterns and colored bands, respectively.

Haze measurements were performed using a Haze Gloss Meter, Model No. 4606, available form BYK Gardner, Silver Spring, Md., U.S.A. calibrated with a haze-gloss standard reference No. 195829312 providing a haze set point value corresponding to H'(20°)=463. Haze unit measurements obtained were uncompensated (indicated as "nc") values determined after calibration. Delta Haze units corresponded to the difference in measured Haze units obtained by subtraction of haze unit values obtained before and after treatment of a chromed panel, or between an untreated control panel and a treated panel, or between an untreated and treated portion of the same panel, as indicated. Generally, Delta Haze unit measurements using the same panel before and after treatment and other test procedures as described herein are preferred for improved accuracy, with a multiple number of replicate readings taken across the surface to enable an average value to be calculated.

Delta Haze unit measurements were made on the treated surfaces to correlate the level of haze associated with the typical ability of the human eye to discern noticeably perceptible visual change in the surface appearance of treated substrates viewed under normal room lighting. A highly polished mirror finished reflective chromed test panel was selected as a preferred surface for the purposes of testing and demonstrating the advantageous optical properties of surface protective films provided by use of the instant treatment compositions, as the chrome surface showed a high sensitivity to changes in surface appearance and measured haze parameters. The chrome test panels, 4"×8" in size are designated SAE-1010 CR with ⅛" hole for suspension, Chrome Plated Steel, available from Metaspec, Inc., San Antonio, Tex. Thus the Chrome Test, conducted to provide a Delta Haze unit measurement on treated chrome, provides a convenient means of measuring the surprisingly improved transparent protective films produced by the inventive treatment compositions.

Generally, the inventive treatment compositions when applied to the polished chrome test panels produced transparent and nearly invisible surface coatings that demonstrated the beneficial protective properties as described herein. Haze measurements confirmed that Delta Haze unit values of below around 250 as measured according to the Chrome Test methodologies described hereinabove are readily achievable by use of the inventive compositions, these Delta Haze unit values corresponding to a change in the measured haze value wherein the level of haze produced on the surface is barely, if at all perceptible to the human eye.

Substantivity and Durability Test

Substantivity testing was also performed to determine the ability of the treated surfaces to maintain their beneficial properties following treatment, and the durability of the beneficial properties following challenge by soils, dirt, water, mechanical abrasion and action of cleaning solutions. These substantivity and durability tests provide a measure of the inventive treatment compositions utility for treated interior and exterior surfaces, and materials likely to be exposed to a variety of typical environmental challenges.

Panels previously used for the Roll Off Test may be employed, or newly prepared panels, placed and held in an approximately vertical position. For substantivity testing, panels are sprayed over an approximately 3"×6" area, using an electrosprayer charged with regular tap water (Febreze Power Sprayer, carefully cleaned and rinsed with water before use, distributed by the Procter and Gamble Company, Cincinnati, Ohio) for 15 seconds of continuous spray, measured using a timer.

Following spraying, the surface of the panel is visually evaluated to determine the tendency of any water drops to remain on the surface, which would be indicative of a loss of the protective benefit, compared to an untreated control panel. The number of drops and surface appearance of the panels following the rinsing are collectively assigned a visual substantivity grading score being an integer from 0 to 10, using the following scale as guidance, with intermediate assignments possible:

| Rating | Description of Visual Behavior (Water Adhesion) |
| --- | --- |
| 10 | No observed water droplets |
| 7 | Small number of water droplets |
| 5 | Some water droplets |
| 3 | Numerous water droplets |
| 1 | Appearance similar to untreated control |
| 0 | Appearance worse than untreated control |

Durability Test

Durability testing is performed in a similar manner as the substantivity test described hereinabove, with the substantivity test procedure repeated a multiple number of times (cycles) until a visual grading score of approximately 5 is observed, at which point the number of cycles is recorded as the Durability Test Score. This Durability Test Score essentially represents the number of water rinses over which the protective benefit may be observed, with a higher number of cycles representing both increased substantivity (the effect) and persistence of effect (duration) of the surface protective benefit at an acceptable level of performance (about 5 on the substantivity visual grading scale). Durability Test Scores of at least 1 are suitable for sacrificial surface protective coatings that will provide durability following at least one rinse event using water to remove incidental soil, dirt and grime from a protected surface to which the inventive treatment compositions are applied. Higher durability scores are more suitable for detachable, yet more durable surface coatings that can provide multiple rinse cleaning cycles using water. A Durability Duration value (in units of seconds) can also be calculated by multiplying the total number of cycles determined according to the durability test (Durability Test Score) times the individual spray time used (15 seconds per spray in the test method) to determine a Durability Duration time for the inventive films present on a treated surface according to the methods described herein.

Self Cleaning Test (Qualitative)

Self cleaning performance testing (designated "SCL Test") is done to determine the ability of treated panels to be cleaned of adhering soil, dust, grime and the like following simple mechanical tapping or rinsing by water alone (soil-repellency and self-cleaning performance, and easier cleaning performance). Treated panels are first exposed to a soil laden environment, or may be soiled artificially to mimic such exposure in the following manner: Treated panels and control panels are positioned on a flat or inclined surface, depending on the surface to be modeled or for worst case testing positioned in a horizontal orientation. Powdered soil of choice is shaken onto the panels to produce a thin uniform coating, the panel is re-orientated into a vertical position so that excess (non-adherent) soil will fall away. To simulate brake-dust as a test soil, brake fines obtained from replacement brake pads as described below were combined to obtain a dry free flowing finely powdered dust. The brake dust thus obtained was placed into a large cheese shaker can with fine holes on the top, inverted and applied evenly across the test panel surfaces by hand.

Brake-dust test soil was prepared by finely grinding down the top three purchased brands of brake pads obtained from Grand Auto, a national retailer with branches throughout the United States, corresponding to Honda Accord front new pads #45022-S84-A02, Honda Accord rear new pads #43022-SY8-A01, VW Jetta front new pads #1SATZ 1-J0698 151 J, VW Jetta rear new pads #1 SATZ 1 J0698 451 D, Ford Taurus front new pads #2F1Z-2001-AA, and Ford Taurus rear new pads # F8DZ-2200-AA. All pads were individually ground down to a fine dust, which was then sieved through a 325 mesh screen on a conventional Rotap™ machine to collect only the fines below that mesh size. For an approximately 30 gram portion of finished brake-dust test soil, about 3 grams each of the back brake pad fines and about 7 grams each of the front brake pad fines (the front pads wearing faster during typical use) were combined to produce a representative test soil that closely resembled that observed on actual vehicle wheels produced during normal operation.

Once the soiled panel is prepared, it is rated using the description of visual behavior scale presented herein below, and is then mounted in either an inclined or vertical position. In dry soil resistance testing, the panel is lightly tapped once and the appearance evaluated to determine dry soil repellency/resistance. In a wet soil resistance test, the panel is sprayed with water in a manner as described above in the Substantivity Test Method, using tap water in the electronic sprayer operated for about 15 seconds over the entire surface. For either test, a duplicate replicate panel is treated in an identical manner and reserved as a control for subsequent comparisons. After the test panels are treated, visual surface appearance of the panels are assigned a Self Cleaning Performance score using the following scale as guidance, either in reference to a treated but unsoiled panel (unsoiled control) that is rinsed according to the procedure above, or in reference to an untreated but soiled panel. The visual scale employed is as follows:

| Rating | Description of Visual Behavior (Dry or Water Rinse Test) |
| --- | --- |
| −3 | most/all soil removed (resembles unsoiled control) |
| −1 | slightly less soil sticks or remains |
| 0 | no change (untreated soiled panel control) |
| +1 | slightly more soil remains |
| +3 | most/all soil remains |

Self Cleaning Test (Quantitative)

Quantitative measurements of the self-cleaning performance may be performed by conducting haze test measurements on panels employed as described above in the "SCL Test" procedure. Haze measurements of untreated panels, treated panels, tapped soil-treated panels post testing, and soil-treated rinsed panels and rinsed treated panels are obtained by measuring haze at 20° using a Haze-Gloss BYK Gardner Model 4606 instrument, and averaging four readings per test panel or duplicate readings on at least three replicates panels.

Uniformity Appearance Rating (Qualitative)

A surface appearance uniformity ranking (designated "Chrome Test") are performed by measuring treatments applied to a glossy and reflective surface such as a mirror or high gloss chromed metal substrate. After treatment and drying times as described hereinabove, the highly reflective substrates are view by eye and a qualitative visual score assigned based on general appearance and uniformity of the surface over about a 3.5"×4" size treatment area.

| Rating | Description of Visual Behavior |
| --- | --- |
| 6 | white haze - significant cloudy and/or dull appearance |
| 5 | some hazy appearance |
| 4 | uneven appearance and/or streaks observed |
| 3 | some distortion but mostly clear with high gloss appearance |
| 2 | slight distortion with overall clear and glossy appearance |
| 1 | no distortion or visual change (resembles untreated surface) |

Ratings are assigned according to the above scale and closest appearance to the description of visual behavior noted, using these actual textual descriptions for judges to consider when viewing and rating the panels.

General Components of Inventive Process Compositions

Applicants have determined the shear rate dependent viscosity of the inventive process compositions (at various ranges of silica content and disilazane) as well as prior art compositions. From this study, it was apparent that the amount of disilazane had no influence on the flow behavior in a concentration range between 0.5-3.0%. This supports the finding in Table 1 presented hereinbelow that the amount of disilazane has only a minor impact on the achieved median particle size.

Applicants further note that increasing the amount of silica (5-15%) had a dramatic impact on the viscosity. Doubling of the concentration from 5% to 10% raises the viscosity by approximately one order of magnitude. Increasing the concentration to 15% silica raises the viscosity by an additional half an order of magnitude.

Additionally, the general flow behavior is dramatically influenced by the amount of silica. A particle load of 5% can be regarded as a very low concentration since the flow behavior is that of an ideal (i.e., Newtonian) liquid. At a concentration of 15% silica, however, a decreasing viscosity with increasing shear rate can be observed that increases again at high shear rates (dilatant peak). These results support the finding in Table 1 presented hereinbelow that the amount of silica has a dramatic impact on the achieved median particle size.

EXAMPLES

Process Compositions

Examples A through OO in Table 1 are representative embodiments of materials prepared in the form of process compositions according to the processes of the present invention. Example H is a comparative example prepared in a manner outside the scope of the present invention.

Example A

A quantity of 10.0 g of hexamethyldisilazane (DYNASYLAN® HMDS) was dissolved in 140 g of decamethylcyclopentasiloxane (TEGO® Polish Additiv 5, also designated as siloxane "D 5"). 50.0 g of a commercially available, hydrophobized fumed silica with a BET surface area of 220 $m^2/g$ (AEROSIL® R 812 S) was slowly dispersed in this solution with gentle stirring at 2,000 r.p.m. After all fumed silica had been added, the mixing speed of the Dispermat (single rotating shaft, outfitted with saw-tooth blade proportional to mixing vessel where blade is half the diameter of vessel) was increased to 10,000 r.p.m. and kept operating at this speed for 15 min.

Examples B-OO

Preparation of examples B through OO follows the same procedure as for example A except using otherwise specified parameters as shown in Table 1 below.

TABLE 2

Process Composition (Diluted) Example[1]

| Component | I wt. % | J wt. % | K wt. % | L wt. % | M wt. % | N wt. % | PP wt. % |
|---|---|---|---|---|---|---|---|
| Process Composition A | 20.0 | — | — | — | — | — | — |
| Process Composition B | — | 20.0 | — | — | — | — | — |
| Process Composition C | — | — | 20.0 | — | — | — | — |
| Process Composition D | — | — | — | 20.0 | — | — | — |
| Process Composition F | — | — | — | — | 50.0 | — | — |
| Process Composition G | — | — | — | — | — | 50.0 | — |
| Process Composition OO | — | — | — | — | — | — | 28.57 |
| TEGO ® Polish Additiv 5 | 80.0 | 80.0 | 80.0 | 80.0 | 50.0 | 50.0 | 71.43 |

[1]All diluted process compositions have an active silica level of 5 wt. %.

By comparing Delta Haze values in Table 14 with particle sizes of the corresponding process compositions, it can be concluded that a particle size of approximately 4,000 nm or less is necessary to achieve Delta Haze values of 250 or less which was found to be the Haze value from which the coatings of the present invention start to be perceived as a visible film by the human eye on a highly polished chrome test substrate according to the methods described hereinabove. Table 1 shows that several parameters of different weighting play a role in order to achieve a targeted particle size of 4,000 nm or less. It can be concluded from Table 1 that the concentration of silica (AEROSIL) in the process compositions is by far the most important factor and that a concentration of 10 wt. % seems to be a lower practical limit. With 5 wt. % for example (Comparative example H) a more than tenfold larger median particle size is obtained. It became also obvious that the viscosity of the process composition during mixing is critical and needs to be in a defined range (see also chapter hereinabove on "General Components of Inventive Process

TABLE 1

| Process Composition Example | AEROSIL ® R 812 S wt. % | DYNASYLAN ® HMDS wt. % | TEGO ® Polish Additiv 5 wt. % | Stirrer speed r.p.m. | Time min. | Particle Size Distribution[1] (median) nanometer |
|---|---|---|---|---|---|---|
| Inventive | | | | | | |
| A | 25.0 | 5.0 | 70.0 | 10,000 | 15 | 304 |
| B | 25.0 | 0.5 | 74.5 | 10,000 | 5 | 283 |
| C | 25.0 | 5.0 | 70.0 | 5,000 | 5 | 1,925 |
| D | 25.0 | 0.5 | 74.5 | 5,000 | 15 | 2,115 |
| E | 25.0 | 0.5 | 74.5 | 5,000 | 5 | 2,106 |
| F | 10.0 | 5.0 | 85.0 | 5,000[2] | 15 | 3,328 |
| G | 10.0 | 0.5 | 89.5 | 5,000[2] | 5 | 3,771 |
| OO | 17.5 | 2.75 | 79.75 | 7,500[2] | 10 | 2,851 |
| Comparative | | | | | | |
| H | 5.0 | — | 93.0[3] | 5,000[2] | 15 | 41,265 |

[1]Particle size distribution analysis was performed with a Horiba LA 910 (use of 1.0 micron polystyrene dispersion as calibration standard, measurement of sample dispersions diluted with isopropyl alcohol and with Relative Refractive Index = 1.10). This instrument measures the size and distribution of particles suspended in liquid using laser diffraction.
[2]Examples F, G, H and OO were unable to be processed at 10,000 r.p.m.
[3]Example H additionally contains 2 wt. % of TEGOPREN ® 6814, an alkyl-modified polydimethylsiloxane, as a durability agent and thus is a representative example of the process compositions obtained by following the process disclosed in U.S. Pat. Pub. No. 2004/0213904A1.

Examples I through PP are examples of process compositions obtained by further diluting some of the process compositions in Table 1 with TEGO® Polish Additiv 5.

Compositions"). On the one hand, the process liquid needs to have a high enough viscosity for adequate energy transmission throughout the bulk solution to produce the requisite shear forces needed to effectively reduce particle size to the targeted median range. On the other hand, the process liquid must not be too viscous in order to be still processable in the mixing equipment.

Figure 5:
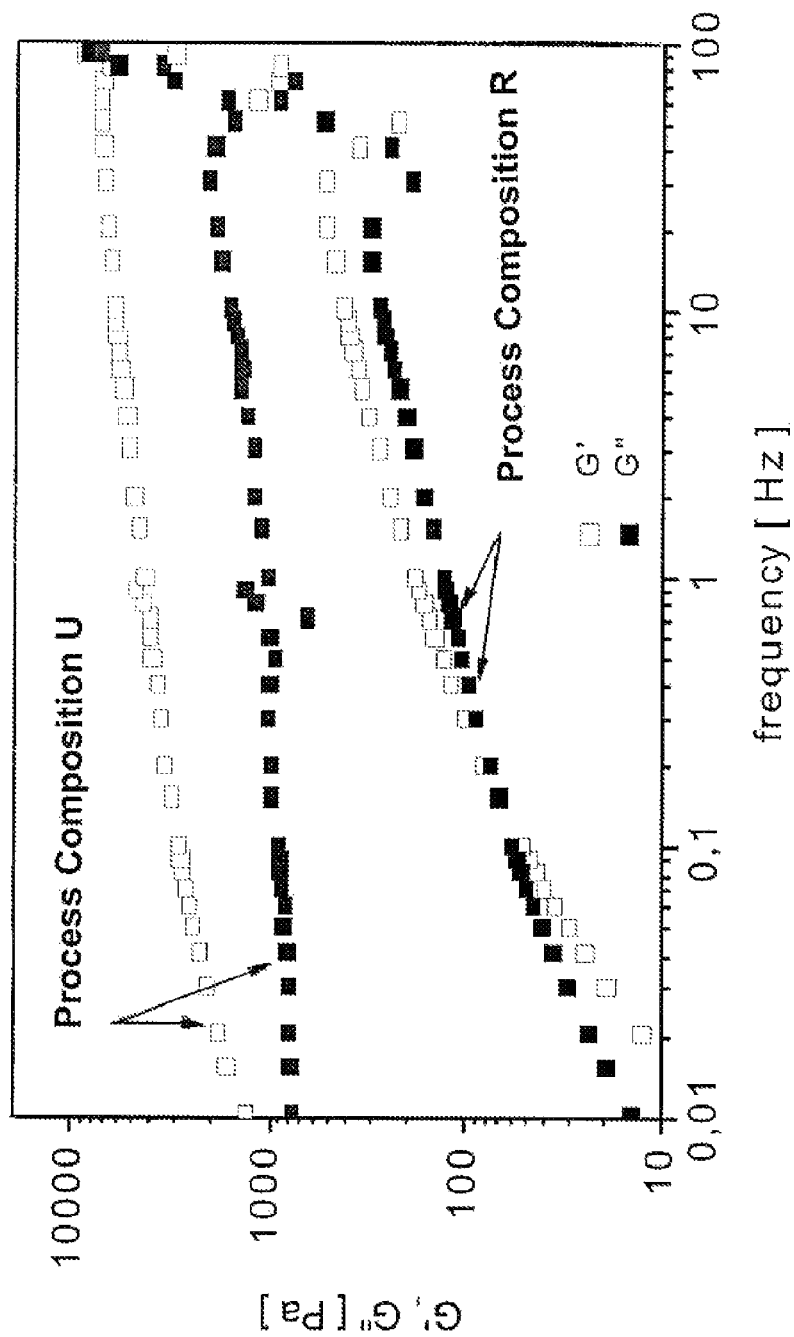
FIG. 5 is a plot of the rheological profile of a dispersion with a representative embodiment of inventive process compositions R and U, processed with and without hexamethyldisilazane, respectively. G' and G" refer to the viscous and elastic components of the complex rheological response curves as measured in units of Pascal (Pa) as a function of the oscillation frequency in Hertz (Hz), measured under the conditions indicated in the process description for the example compositions.

It was surprisingly found that these counteracting effects during the process can be balanced by the use of a disilazane derivative. The impact of hexamethyldisilazane, as one representative embodiment according to the present invention, on the rheological behavior of highly concentrated silica dispersions is shown in FIG. 5. FIG. 5 shows that a dispersion with 25 wt. % silica and without hexamethyldisilazane (Process Composition U) exhibits a yield point indicated by G'>G", which means it shows a solid-like behavior, whereas a dispersion with 25 wt. % silica and with 5 wt. % hexamethyldisilazane (Process Composition R) does not have a yield point. Process composition U demonstrates that it was basically possible to process a dispersion of silica at 25 wt. % without a disilazane derivative, but more effort was required to get this amount of silica incorporated into the solvent, and the viscosity was too high for proper processing. The disilazane derivative not only helps to keep the process viscosity at a practical level for convenient processing, but also helps to wet and disperse the silica in the solvent more easily. Besides the silica concentration, mixing process parameters such as stirrer speed and mixing duration have a significant impact on the particle size results as well, even though they are not as important as the silica concentration. Obviously it makes a big difference whether a disilazane derivative is present or not with respect to ease of processing, but the absolute amount present seems to be of lesser importance. In addition, it was observed that samples processed with a disilazane derivative show a retarded settlement of silica particles compared to those samples processed without the disilazane derivatives. In summary, it was thus surprisingly found that the combination of high silica concentration with a sufficiently high mixing speed or mixing power is critical to achieve the desired reduction to the desirable median particle size range of the present invention, and that the presence of a disilazane derivative facilitates the process dramatically.

The following examples O and P are further representative embodiments of materials prepared in the form of process compositions according to the processes of the present invention.

Example O

A quantity of 5 kg of hexamethyldisilazane (DYNASYLAN® HMDS) was dissolved in 70 kg of decamethylcyclopentasiloxane (TEGO® Polish Additiv 5, D 5). 25 kg of a commercially available, hydrophobized fumed silica with a BET surface area of 220 $m^2/g$ (AEROSIL® R 812 S) was added and passed repeatedly through a horizontal mill until the desired particle size had been achieved.

Preparation of example P follows the same procedure as for example O except using otherwise specified parameters as shown in Table 3 below.

TABLE 3

| Process Composition Example | AEROSIL® R 812 S wt. % | DYNASYLAN® HMDS wt. % | TEGO® Polish Additiv 5 wt. % | Particle Size Distribution[1] (median) nanometer |
|---|---|---|---|---|
| O | 15.0 | 3.0 | 82.0 | 174 |
| P | 15.0 | 1.5 | 83.5 | 296 |

[1]Particle size distribution analysis was performed with a Horiba LA 910 (use of 1.0 micron polystyrene dispersion as calibration standard, measurement of sample dispersions diluted with isopropyl alcohol and with Relative Refractive Index = 1.10). This instrument measures the size and distribution of particles suspended in liquid using laser diffraction.

Example Q is an example of a diluted process composition obtained by further diluting process composition O with TEGO® Polish Additiv 5.

TABLE 4

| Component | Process Composition (Diluted) Example[1] Q wt. % |
|---|---|
| Process Composition O | 33.3 |
| TEGO® Polish Additiv 5 | 66.6 |

[1]Corresponding to an active silica level of 5 wt. %.

The following examples R through V are representative embodiments of process compositions prepared according to the methods of the present invention. Preparation of examples R through V follows the same procedure as for example A except otherwise specified parameters in the table below. Examples A and R demonstrate the variance in the median particle size achievable under identical process parameters.

TABLE 5

| Process Composition Example | AEROSIL® R 812 S wt. % | DYNASYLAN® HMDS wt. % | TEGO® Polish Additiv 5 wt. % | Stirrer speed r.p.m. | Time min. | Particle Size Distribution[1] (median) nanometer |
|---|---|---|---|---|---|---|
| R | 25.0 | 5.0 | 70.0 | 10,000 | 15 | 186 |
| S | 25.0 | 2.5 | 72.5 | 10,000 | 15 | 209 |
| T | 25.0 | 0.5 | 74.5 | 10,000 | 15 | 225 |
| U | 25.0 | — | 75.0[2] | 10,000 | 15 | 317 |
| V | 25.0 | 5.0 | 70[3] | 10,000 | 15 | 271 |

[1]Particle size distribution analysis was performed with a Horiba LA 910 (use of 1.0 micron polystyrene dispersion as calibration standard, measurement of sample dispersions diluted with isopropyl alcohol and with Relative Refractive Index = 1.10). This instrument measures the size and distribution of particles suspended in liquid using laser diffraction.
[2]It was extremely difficult to stir in the AEROSIL® into TEGO® Polish Additiv 5.
[3]In example V isododecane was used as solvent instead of decamethylcyclopentasiloxane.

Examples W through BB are examples of a diluted process compositions obtained by further diluting some process compositions in Table 5 with TEGO® Polish Additiv 5.

TABLE 6

| | Process Composition (diluted) Example[1] | | | | | |
|---|---|---|---|---|---|---|
| Component | W wt. % | X wt. % | Y wt. % | Z wt. % | AA wt. % | BB wt. % |
| Process Composition R | 20.0 | — | — | — | 20.0 | — |
| Process Composition S | — | 20.0 | — | — | — | — |
| Process Composition T | — | — | 20.0 | — | — | 20.0 |
| Process Composition V | — | — | — | 20.0 | — | — |
| ABIL ® Wax 9814 | — | — | — | — | 2.0 | — |
| DYNASYLAN ® OCTEO[2] | — | — | — | — | — | 4.0 |
| TEGO ® Polish Additiv 5 | 80.0 | 80.0 | 80.0 | 80.0 | 78.0 | 76.0 |

[1]All diluted process compositions have an active silica level of 5 wt. %.
[2]Triethoxyoctylsilane Examples CC through HH are further representative embodiments of materials prepared in the form of process compositions according to the processes of the present invention. They were prepared following the same procedure as for example A.

TABLE 7

| Process Composition Example | AEROSIL ® R 812 S wt. % | DYNASYLAN ® HMDS wt. % | TEGO ® Polish Additiv 5 wt. % | TEGOPREN ® 6814 wt. % | DYNASYLAN ® OCTEO wt. % |
|---|---|---|---|---|---|
| CC | 25.0 | 5.0 | 60.0 | 10.0 | — |
| DD | 25.0 | 5.0 | 60.0 | — | 10.0 |
| EE | 25.0 | 5.0 | 50.0 | 10.0 | 10.0 |
| FF | 25.0 | — | 65.0 | — | 10.0 |
| GG | 25.0 | — | 65.0 | 10.0 | — |
| HH | 25.0 | — | 55.0 | 10.0 | 10.0 |

Examples II through NN are examples of diluted process compositions obtained by further diluting the process compositions in Table 7.

TABLE 8

| | Process Composition (diluted) Example[1] | | | | | |
|---|---|---|---|---|---|---|
| Component | II wt. % | JJ wt. % | KK wt. % | LL wt. % | MM wt. % | NN wt. % |
| Process Composition CC | 30.0 | — | — | — | — | — |
| Process Composition DD | — | 30.0 | — | — | — | — |
| Process Composition EE | — | — | 30.0 | — | — | — |
| Process Composition FF | — | — | — | 20.0 | — | — |
| Process Composition GG | — | — | — | — | 20.0 | — |
| Process Composition HH | — | — | — | — | — | 20.0 |
| TEGO Polish Additiv 5 | 70.0 | 70.0 | 70.0 | 80.0 | 80.0 | 80.0 |

[1]Process compositions II - KK have an active silica level of 7.5 wt. %, LL - NN an active silica level of 5 wt. %.

Treatment Compositions

Non-Porous Surface Modification

Examples of embodiments of the inventive treatment compositions suitable for use in modification of receptive surfaces, including non-porous surfaces and substrates, are provided in Table 9. The treatment compositions in these examples are prepared in the form of diluted silica dispersions for use with a suitable delivery means capable of applying the treatment compositions for surface modification of a variety of substrates and general usage on automotive, home and textile surfaces.

TABLE 9

| | Treatment Composition Example | | | | |
|---|---|---|---|---|---|
| Component | 1 wt. % | 2 wt. % | 3 wt. % | 4 wt. % | 5 wt. % |
| Process Composition I | 1.0[1] | 10.0[2] | 20.0[3] | 60.0[4] | 99.0[5] |
| Dow Corning DC 245 | 99.0 | 90.0 | 79.0 | 40.0 | — |
| DYNASYLANE ® OCTEO[6] | — | — | 1.0 | — | 1.0 |

[1]Corresponding to an active silica level of 0.05 wt. % in Treatment Composition 1
[2]Corresponding to an active silica level of 0.5 wt. % in Treatment Composition 2
[3]Corresponding to an active silica level of 1.0 wt. % in Treatment Composition 3
[4]Corresponding to an active silica level of 3.0 wt. % in Treatment Composition 4
[5]Corresponding to an active silica level of 4.95 wt. % in Treatment Composition 5

Additional embodiments of examples of suitable inventive treatment compositions for surface modification use are provided in Table 10, further including some optional functional adjuncts to provide additional benefits to the treatment compositions and improved methods of application onto targeted surfaces. Examples 9 and 10 are representative embodiments formulated as ready-to-use propellant-based aerosol treatment compositions.

TABLE 10

| | Treatment Composition Example | | | | |
|---|---|---|---|---|---|
| Component | 6 wt. % | 7 wt. % | 8 wt. % | 9 wt. % | 10 wt. % |
| Process Composition J | 10.0[1] | 10.0[2] | 50.0[3] | 10.0[4] | 20.0[5] |
| Dow Corning DC 245 | 88.5 | 90.0 | 49.0 | 39.0 | 18.8 |
| DYNASYLANE ® OCTEO | — | — | — | 1.0 | — |
| TEGOPREN ® 6814 | — | — | — | — | 0.2 |
| Adhesion Promoter[6] | 0.5 | — | 1.0 | — | 1.0 |
| Paraffinic Solvent[7] | 1.0 | — | — | — | — |
| Propellant[8] | — | — | — | 50.0 | 60.0 |

[1]Corresponding to an active silica level of 0.5 wt. % in Treatment Composition 6
[2]Corresponding to an active silica level of 0.5 wt. % in Treatment Composition 7
[3]Corresponding to an active silica level of 2.5 wt. % in Treatment Composition 8
[4]Corresponding to an active silica level of 0.5 wt. % in Treatment Composition 9
[5]Corresponding to an active silica level of 1.0 wt. % in Treatment Composition 10
[6]Licocene Polypropylene 1302 metallocene derived polymer particles, with 3000 average MW, particle size of 100-275 nm, available from Clariant Corporation, Charlotte, NC.
[7]Odorless mineral spirits, available from Ashland Corporation, Dublin, OH.
[8]Proprietary propellant mixture obtained form (ATI Corporation) capable of producing about 50 p.s.i.g. under standard conditions and temperature when packaged in an aerosol container.

Further embodiments of the inventive treatment compositions prepared to determine the dependence of properties of the protective coating on compositional variations were explored using a design of experiments model to vary component levels of the functional and optional ingredients as shown in Table 11. All treatment compositions were stable during spraying application, and were applied using a PreVal sprayer.

TABLE 11

| Component | Treatment Composition Example[1] | | | | | | | | | | | |
|---|---|---|---|---|---|---|---|---|---|---|---|---|
| | 11 wt. % | 12 wt. % | 13 wt. % | 14 wt. % | 15 wt. % | 16 wt. % | 17 wt. % | 18 wt. % | 19 wt. % | 20 wt. % | 21 wt. % | 22 wt. % |
| Process Composition W | 10 | — | — | — | — | — | — | — | — | — | — | — |
| Process Composition X | — | 10 | — | — | — | — | — | — | — | — | — | — |
| Process Composition Y | — | — | 10 | — | — | — | — | — | — | — | — | — |
| Process Composition Z | — | — | — | 10 | — | — | — | — | — | — | — | — |
| Process Composition Q | — | — | — | — | 10 | 10 | — | — | — | — | — | — |
| Process Composition L | — | — | — | — | — | — | 10 | — | — | — | — | — |
| Process Composition K | — | — | — | — | — | — | — | 10 | — | — | — | — |
| Process Composition M | — | — | — | — | — | — | — | — | 10 | — | — | — |
| Process Composition N | — | — | — | — | — | — | — | — | — | 10 | — | — |
| Process Composition PP | — | — | — | — | — | — | — | — | — | — | — | 10 |
| Process Composition H (Comparative) | — | — | — | — | — | — | — | — | — | — | 15 | — |
| DYNASYLANE® OCTEO | — | — | — | — | — | 4 | — | — | — | — | — | — |
| Dow Corning 245 | 90 | 90 | 90 | 90 | 90 | 86 | 90 | 90 | 90 | 90 | 85 | 90 |

[1]All treatment compositions have an active silica level of 0.5 wt. %, except comparative composition 21 which contains 0.75 wt. % active silica.

Measurements of the example embodiments were conducted according to the test procedures described hereinabove on high gloss black clear-coated automotive test panels, with test data presented in Table 12, and on the high-gloss mirror chrome panels. Results show that a clean, untreated black panel is fairly hydrophobic owing to the nature of the clear-coat finish and exhibits a water droplet contact angle of about 79.6°. Spraying of the panels according to the methods disclosed above with Example treatment compositions 2, 7, 11-14, 17, 18 and 22 provided treated test panels all exhibiting high water contact angles sufficient to repel water. After application of the inventive treatment compositions 2, 7, 17, 18 and 22 to chrome panels, treated sections of the panels were found to be nearly identical in appearance to untreated or control sections of the panels previously masked prior to spray treatment to prevent deposition of the inventive treatment compositions. A six person group visually evaluated the panels (corresponding to treatment with treatment compositions 2, 7, 17, 18 and 22 according to the "Chrome Test" appearance ranking and assigned scores on double-blind panel sections to prevent bias, with averaged scores obtained presented in Table 12. Results show that treatment according to methods of the present invention provided essentially clear surface coatings that did not detract from observed shine of the panels, and which were not readily discernable to the human eye, producing slight distortion or at worst some distortion while maintaining an overall clear and glossy appearance.

The ability of the treated black panels to shed water was measured using the roll-off height test, the height of the inclined panel from a flat horizontal position in centimeters at which water drops begin to move as shown in Table 12. Results show a tendency for the untreated panel, despite its moderate hydrophobic properties, to "pin" the water droplet in place, required a fairly large tilt angle (here in excess of 45°) and Roll-Off Height greater than 20 cm for water droplets to move. In contrast, the treated panels exhibited the ability to bead the water droplets, and essentially enable the water droplets to be completely shed from the surface with only a slight angle as the panels were inclined to a height of less than 1 cm to about 1.5 cm, which corresponded to an angle of less than 10° inclination from the horizontal.

Colorimetric test measurement of the treated panels are also shown in Table 12 as the component contributions Delta E and Delta L illustrating differences before and after treatment with the inventive treatment compositions. Changes in the control panel measured value (A) merely reflect the instrumental uncertainty and repeatability of the test. As discussed above, Delta E measurement reflect the total color difference between panels before and after treatment, while Delta L measurements best represent changes in white to black color scale "whiteness" of the panels, an indication of any whitish film attributable to haze seen on the panels after treatment. A higher, or positive Delta L value then corresponds to a greater observed visual haze on the panel surface, and conversely, a lower or negative Delta L number indicates a sample is darker than the untreated control. The inventive treatments are seen to affect the measured color minimally, as expected from the highly transparent nature and lack of visual indication of the film present on the treated panel surfaces. Colorimeter measurements employing both Delta E and Delta L components show that the inventive treatments, which have a minimal impact on visual appearance, correspondingly exhibit very small changes in both of these parameters, showing a minimal effect on color (total energy of reflectance, E) and negligible contribution to haze (white component of reflectance, L).

TABLE 12

| | Test Results | | | | |
|---|---|---|---|---|---|
| Treatment Composition | Water Contact Angle | "Chrome Test" Appearance[2] | Roll-Off Height (cm) | Black Panel Delta E | Black Panel Delta L |
| 2 | 154.8° | 1.8 | <1 | 0.85 | 0.55 |
| 7 | 153.4° | 2.8 | <1 | 1.19 | 0.92 |
| 12 | 153.5° | — | 1.5[3] | 2.68 | −2.49 |
| 13 | 153.5° | — | 2.5[3] | 1.89 | −0.55 |
| 14 | 151.2°[3] | — | 6 | — | — |
| 17 | 152.6° | 3.0 | <1 | 1.10 | 0.87 |
| 18 | 154.2° | 3.8 | 1 | 0.92 | 0.52 |
| 22 | 152.4° | 3.7 | 1.5 | 1.06 | 0.86 |
| Control[1] | 79.6° | 1.2 | >20 | 0.19 | −0.02 |

[1]Control is untreated black Ford paint panel
[2]Average of six person visual appearance ratings using chrome control panel A as reference.
[3]Average of two trials.
[4]Control is untreated black Ford paint panel.

The durability and self cleaning ability of surfaces treated using several example embodiments was tested using treated black automotive panels exposed to water and/or brake dust, with results presented in Table 13.

In one test, panels treated with the inventive treatment compositions were first tested for dry dirt repellency. In a second test, the panels were then exposed to a continuous spray of water and the time at which the panels first showed an indication to form adherent droplets and hold beads of water on the surface was noted to the nearest 15 second interval to determine durability of the coating to a water spray. Alternatively, panels were treated with a 15 second water spray and the surface appearance ranked by visual inspection according the visual ranking scale described hereinabove to measure the appearance with respect to any adherent water droplets. All treatment examples provided an initial benefit in readily shedding water from the surface compared to an untreated control panel. It needs to be emphasized that all treatment compositions in Table 13 do not contain a durability agent and yet provide good to excellent durability of the protective coating. The SCL Brake Dust test results demonstrate the ability of the dry treated surface to resist adhesion of dry brake-dust without the use of any water or cleaning action. Here, after exposure to the dry brake-dust test soil according to the methods described herein above, a single tap was sufficient to remove most if not all of the brake-dust present on the black test surface treated with the inventive treatment compositions indicated in Table 13. These test results demonstrate that a deposited film of hydrophobically modified fumed silica delivered via use of a treatment composition according to the present invention is capable of providing both wet and dry surface protective benefits, producing a treated article with the protective film deposited thereon, that exhibits self-cleaning and easier cleaning benefits.

TABLE 13

| Treatment Composition | Test Results | | |
|---|---|---|---|
| | Durability[1] Duration (sec) | Visual Appearance Ranking[2] | SCL Brake Dust[3] |
| 2 | 90 | — | −2 |
| 7 | 60 | — | −2 |
| 11 | 15 | 10 | −3 |
| 12 | 15 | 8.5 | −3 |
| 13 | 15 | 9 | −3 |
| 14 | — | — | −2 |
| 15 | 30 | — | −3 |
| 17 | 45 | — | −2 |
| 18 | 135 | — | −2 |
| 19 | 30 | — | −1 |
| 20 | 15 | — | −1 |
| 22 | 60 | — | −2 |
| Control | 0 | 0 | 0 |

[1]Time (in seconds) before adherent water beads observed on surface during spraying. Average of two trials
[2]Visual Appearance Ranking for water adhesion using appearance scale indicated hereinabove versus the control panel
[3]Dry brake-dust test, ranked on appearance scale (Dry test) using appearance scale indicated hereinabove versus the control panel Haze Test Results Measurements of the example embodiments were taken according to the Chrome Test procedures described hereinabove on the high shine chrome test panels, with results presented in Table 14. The chrome test panels have mirror-like finishes and any surface distortion or residue is readily perceivable by eye, as well as instrumentally, where the Haze measurement technique appears to be the most suited for quantifying very slight changes in appearance. Treatment weight recorded in Table 14 reflects the amount of applied treatment composition, obtained by weighing the aerosol can containing the respective treatment before and after controlled dispensing onto the test panel. Compositions had comparable level of the silica active, so that the amount of deposited silica materials would be comparable. Application of the comparative example 21 produced a visually hazy and non-uniform coating on the chrome test panel that was not acceptable, and had a very large Delta Haze unit value of 288. In comparison, inventive treatment compositions, Examples 16, 20 and 22, when applied resulted in transparent and barely perceptible coatings on the chrome surface, all with very low Delta Haze unit values. Example 16 produced an invisible coating that could not be discerned by the eye, yet exhibited the full range of protective performance benefits demonstrated by use of the present invention. A variety of tests on the polished chrome revealed that an preferred transparent surface coatings could be obtained from inventive treatment compositions providing a measured Delta Haze unit value of equal to or less than about 250, as determined by following the Chrome Test procedure as described hereinabove.

TABLE 14

| Treatment Composition | Haze Measurement[1] | | Treatment Weight[3] | Median particle size of base process composition (nanometers) |
|---|---|---|---|---|
| | Delta Haze[2] | Standard Deviation | | |
| 21 | 288.4 | 13.8 | 1.25 | 41,265 |
| 20 | 78.4 | 15.6 | 1.16 | 3,771 |
| 22 | 28.2 | 4.19 | 1.16 | 2,851 |
| 16 | 9.1 | 6.1 | 1.27 | 174 |

[1]Following methodology described hereinabove.
[2]For improved accuracy readings taken before and after treatment on each test panel. For comparison, initial Haze values of an untreated chromed panel was about 100 units.
[3]Weight of applied aerosol composition (grams).

Thus, surprisingly low Delta Haze units below around 250 before and after treatment are demonstrated by the inventive treatment compositions even on highly polished chrome, corresponding to a surface protective treatment that is transparent and nearly invisible to the eye, and yet maintain the surface protective benefits desirable in a protective film that still retains effectiveness in resisting and repelling dirt, water and soil, yet can be easily removed from the treated surfaces. The noted decrease in observable haze corresponds to the reduced particle size, suggesting that Delta Haze values below 25, which is essentially invisible, are possible when the median particle size is reduced to below 1000 nanometers. In addition, using colorimetric measurements, very low Delta E values below around 3.0 as measured on shiny black metal test panels demonstrate the ability of the inventive methods and treatment compositions to exhibit self-cleaning capability and ability to maintain visual appearance close to that of the treated surface prior to soiling and application of the inventive treatments, thus providing a means for nearly invisible surface protection applicable to a wide variety of surfaces, including glossy and reflective surfaces.

Treatment of Wood Panels

The ability of an example embodiment of the inventive treatment composition in a convenient aerosol form (using Example 23 below) to provide water roll-off properties to a commercially available varnished wood panel was tested.

Treatment Composition Example 23

| Ingredient | Wt. % |
|---|---|
| Process Composition I | 5.0 |
| DYNASYLANE ® OCTEO | 2.0 |
| DC 245 | 43.0 |
| ATI Propellant | 50.0 |

The finished wood substrate was a 3"×6" section of tongue and groove wood flooring purchased from Home Depot, with a factory applied coating of an OEM polyurethane finish, which being hydrophobic in nature provides the wood with high water resistance. Half of the surface of the sample was treated by spraying with the aerosol treatment composition from a distance of 6", with the sample lying horizontally, with the second half was masked to prevent overspray. The sample was then allowed to dry overnight at ambient conditions.

The roll-off behavior of several water drops placed on the surface in a horizontal position was tested, comparing the treated and untreated regions of the surfaces. Surface behavior of multiple water droplets on the surface were observed using and found to provide a Roll-off test rating of 2 on the treated side, and a rating of 6 on the untreated side. Visual comparison of the treated and untreated areas provided a uniformity appearance rating of 2 for the side treated with the inventive treatment compositions, which provided a clear, transparent protective coating on the finished wood surface.

In a demonstration of the removability of the treatment, the treated surface was wiped three times with a dry paper towel. This dry wiping was effective at removing the inventive treatment compositions, as evidenced by a repeated Roll-off test performed thereafter that provided equivalent ratings of 6, respectively on both the previously treated, yet cleaned, and original untreated control side of the wood panel.

Thus, the utility of the inventive treatment compositions to provide protection of varnished decorative household surfaces against accidental splashes of water is demonstrated. In addition, the easy removal of the treatment without special chemical means is also demonstrated here.

Treatment of Plastic Surfaces

The ability of the inventive treatment composition examined above to provide water roll-off properties to commercially available plastics was then tested. Plastic sheet materials, obtained from McMaster-Carr, were cut into 4"×4" sections. Two types of materials were investigated: a black "acrylic" plastic and a gray "PVC" (polyvinyl chloride) plastic. Each test treatment was conducted at least on duplicate samples.

The plastic panels were cut, and cleaned briefly by wiping with a paper towel moistened with isopropanol (IPA). After drying completely, the panels were treated with the aerosol formulation sprayed from a distance of 6" for 3 seconds, with the panels in a horizontal position. The panels were then allowed to dry overnight, before testing.

The behavior of several water drops placed on the surface in a horizontal position was tested, comparing treated and untreated surfaces as control. Surface behavior of several water droplets on the treated surfaces of the black acrylic plastic achieved a Roll-off test rating of 2, while the untreated acrylic control exhibited a rating of 6, even though the water did not "wet" the surface of the untreated hydrophobic plastic. Surface behavior of several water droplets on the treated surfaces of the gray PVC plastic also achieved a Roll-off test rating of 2, while the untreated PVC control exhibited a rating of 6. The uniformity appearance ratings of both the treated acrylic test panel, and the treated PVC panel both gave a rating of 2 in comparison to their respective controls, thus providing a clear, invisible protective coating on the plastic surfaces.

To test the removability of the inventive treatment from these plastic treatments, the treated panels were wiped three times with a dry paper towel and retested as to their water roll-of properties. As with the wood paneling, behavior reverted to that observed on the original untreated panels. This further demonstrates the utility of the inventive treatment compositions in providing non-durable protection to plastic surfaces and materials. In addition, the easy removal of the treatment without special chemical means is also demonstrated on these materials.

Textile Surface Modification

Example embodiments of the present invention were also tested for their ability to impart water roll-off properties to woven porous textiles typically used in the manufacture of clothing.

In this example, testing employed approximately 3"×5" swatches of white (undyed and non-brightened) 100% cotton fabric, white 100% Nylon 6.6 knit fabric, white 50-50 (%) cotton-polyester fabric, navy colored 100% Dacron 56 polyester texturized double knit heat set fabric dyed with Disperse Blue 167, Style No. TIC-720H and a dark blue colored 100% nylon texturized Nylon 6.6 knit fabric dyed with Acid Blue 113, Style No. TIC-314, all obtained from Textile Innovators Co., Windsor N.C.

The swatches were hung vertically and then treated with the same inventive aerosol treatment composition as used above to treat plastic substrates. Treatment was accomplished by spraying the fabrics at a distance of 6 inches for about 3 seconds each, after which the swatches were allowed to dry overnight under ambient conditions. Three swatches of each type were treated, and the results obtained from each replicate were averaged.

The ability of the inventive treatment to produce water roll-off from the swatches was tested as follows. The swatches were placed on a hard flat surface which was inclined from the horizontal by about 20°. Using a pipette, 6 drops of de-ionized water (approximately 200 microliters each) were allowed to fall onto the swatch from a height of 6 inches. In this manner, the effect of the momentum of the falling drops on their ability to wet and penetrate the swatches is compared. Simple placement of the water drops onto fabric swatches can sometimes yield false positives, in that the water droplets tend to remain on the surface for a variable and non-reproducible period of time before finally wicking into, or through the fabric. It was thus found that with some momentum, the force of the water drop impacting the surface of the fabric results in the fabric exhibiting its ultimate water wicking, and/or water resistive nature more reproducibly for the purposes of test comparisons.

Fabrics with and without the inventive treatment were tested by the above method, and a Repellency Score was assigned by visually observing and counting the number of repetitive water droplets impacting on the same spot of the fabric required to produce wetting of the fabric at that spot. The Repellency Score is the average number of water drops out of 18 (6 drops, three replicates of each swatch) that rolled off the fabric without sticking or wicking into the fabric. Thus, treatments with higher scores represent the ability of the fabric to resist wetting by water and repel water droplets. Fabric test results are presented in Table 15.

TABLE 15

| | Repellency Score[2] | |
|---|---|---|
| Fabric Type (White) | No Treatment | Inventive Treatment |
| 100% Cotton | 0 | 1 |
| 100% Nylon | 0 | 18[1] |
| Cotton Polyester blend | 0 | 18[1] |

[1]No wetting observed after 18 consecutive drops. Testing stopped.
[2]Three replicates tested.

Results show that the inventive treatment compositions are most effective on porous textile materials having at least some synthetic fibers present, as performance on the 100% cotton (a natural, fairly hydrophilic biopolymer) was marginal at best in repelling water following treatment.

The white fabrics were used to screen for any negative effects of the inventive treatments on yellowing or staining the fabrics. No yellowing or staining of the white fabrics was observed. The dark blue fabrics were used to observe whether use of the inventive treatments resulted in any appearance of visual fading, discoloration or greying of the fabrics. No fading, discoloration or greying effects were noted after application to the dark fabrics. It was noted however that use of the inventive treatments on dark fabrics was observed to make them very slightly darker in appearance when observed side by side with an untreated fabric test swatch. Colorimetric measurements revealed that use of the inventive treatments yielded a Delta L value well below 3 units, and with the dark fabrics a small negative Delta L value was observed, corresponding to the very slightly darker appearance noted by eye. This effect, though slight, is generally beneficially perceived as a color enhancement on darker fabrics, since fading due to wear, abrasion, washing, surface fiber damage and subsequent dye loss, otherwise produces changes in L resulting in larger positive Delta L changes, generally observable by eye when positive Delta L values exceed a value of greater than 5, the effect generally being attributed to overall "fading." Thus, the inventive treatment compositions tend to exhibit a slight anti-fading benefit on darker fabrics, and are essentially invisible on white and lighter-colored fabrics when applied according to the methods of application described herein.

TABLE 16

| Fabric Type (Dyed) | Colorimetric Measurement[1] | | |
| --- | --- | --- | --- |
|  | Delta L[2] | Delta a | Delta b |
| 100% Nylon (Blue) | −1.01 | 1.22 | −0.60 |
| 100% Polyester (Navy) | −0.49 | 0.61 | −0.96 |

[1]Measurements taken with plain white backing, UV filter selected
[2]Colorimetric Lab values calculated from values before and after treatment of same test swatch These last few examples further demonstrate the utility of the inventive treatment compositions to be used to treat a wide variety of both hard, non-porous materials such as plastics, wood, metal painted paneling, chrome and the like, as well as porous materials such as textiles, and to provide clear, protective coatings that repel water and dirt readily from the surfaces of the treated materials, substrates and articles treated according to the methods disclosed herein.

While the present invention has been shown and described in accordance with practical and preferred embodiments thereof, it is recognized that departures from the instant disclosure are contemplated within the spirit of the invention and, therefore, the scope of the invention should not be limited except as defined within the following claims as interpreted under the doctrine of equivalents.

We claim:

1. A method of forming a detachable and renewable protective coating on a receptive surface comprising the steps of:
   (a) applying a treatment composition to said receptive surface, said treatment composition comprising a plurality of hydrophobically modified fumed silica particles colloidally dispersed in a volatile solvent;
   (b) allowing said volatile solvent to evaporate from said receptive surface; and
   (c) thereby depositing said protective coating on said receptive surface,
   wherein said protective coating provides dirt- and water-repellency to said receptive surface;
   wherein the protective coating comprises a non-smooth coating on the receptive surface at least after the treatment composition has been applied to the receptive surface and has substantially dried or set, and wherein said non-smooth coating on the receptive surface includes valleys and peaks and an average height between the valleys and peaks of about 1-2500 nm.

2. The method of claim 1 wherein the treatment composition comprises a first and second set of hydrophobically modified fumed silica colloidal particles, each of said first and second sets of hydrophobically modified fumed silica colloidal particles including a plurality of hydrophobically modified fumed silica colloidal particles, each of said first and second sets of hydrophobically modified fumed silica colloidal particles having an average particle size of hydrophobically modified fumed silica colloidal particles, said first set of hydrophobically modified fumed silica colloidal particles having an average particle size that is greater than said average size of said second set of hydrophobically modified fumed silica colloidal particles, said composition including a greater number of hydrophobically modified fumed silica colloidal particles in said second set of colloidal particles than a number of hydrophobically modified fumed silica colloidal particles in said first set of colloidal particles.

3. The method of claim 2 wherein a size ratio of said average particle size of said first set of hydrophobically modified fumed silica colloidal particles to said average particle size of said second set of hydrophobically modified fumed silica colloidal particles is at least about 1.1:1.

4. The method of claim 2 wherein a size ratio of said average particle size of said first set of hydrophobically modified fumed silica colloidal particles to said average particle size of said second set of hydrophobically modified fumed silica colloidal particles is at least about 1.5-20:1.

5. The method of claim 2 wherein a number ratio of said number colloidal particles of said second set of hydrophobically modified fumed silica colloidal particles to said number of particles of said first set of hydrophobically modified fumed silica colloidal particles is at least about 2:1.

6. The method of claim 2 wherein a number ratio of said number of colloidal particles of said second set of hydrophobically modified fumed silica colloidal particles to said number of particles of said first set of hydrophobically modified fumed silica colloidal particles is about 10-1000:1.

7. The method of claim 2 wherein said formed non-smooth surface on the substrate surface includes valleys and peaks and an average height between the valley and peaks of about 2-100 nm.

8. The method of claim 2 wherein at least a portion of said colloidal particles in said first set of hydrophobically modified fumed silica colloidal particles, said second set of hydrophobically modified fumed silica colloidal particles, or combinations thereof includes modified colloidal particles, said modified colloidal particles including at least one hydrocarbon chain.

9. The method of claim 8 wherein at least one of said hydrocarbon chains is an alkyl chain having 1-24 carbon atoms.

10. The method of claim 1 wherein said hydrophobically modified fumed silica particles have a median particle size of between 100 and 4,000 nanometers.

11. The method of claim 1 wherein said detachable coating is substantially transparent and results in a change of less than 3.0 Delta E units to said receptive surface measured before and after deposition of said coating.

12. The method of claim 1 wherein said protective coating on said porous surface is substantially transparent and results in a change of less than 3.0 Delta L units of said porous substrate after application of said coating.

13. The method of claim 1 wherein said receptive surface comprises a non-porous substrate.

14. The method of claim 1 wherein said receptive surface is selected from the group consisting of automotive surfaces, household interior surfaces, household exterior surfaces, articles of construction, and combinations thereof.

15. The method of claim 1 wherein said non-porous substrate is selected from the group consisting of metal, metal oxides, aluminum, anodized aluminum, painted substrates, stainless steel, chrome, clear-coated automotive surfaces, elastomers, vinyl, plastics, polymers, sealed wood, laminates, composites, and combinations thereof.

16. The method of claim 1 wherein said porous substrate is selected from the group consisting of fibers, textiles, nonwovens, foam substrates, cloth, clothing, leather, upholstery, carpet, curtains, marble, granite, grout, mortar, concrete, spackling, plaster, adobe, stucco, brick, unglazed tile, tile, unglazed porcelain, porcelain, clay, wallpaper, cardboard, paper, wood, and combinations thereof.

17. The method of either claim 1 wherein said coating further exhibits a Durability Duration value of greater than or equal to 15 seconds.

18. The method of claim 1 wherein said receptive surface comprises a porous substrate.

19. The method of claim 1 wherein said receptive surface comprises a combination of a non-porous substrate and a porous substrate.

20. A treatment composition for forming a detachable and renewable protective coating on a receptive surface comprising:
  (i) 0.05 to 5.0 percent by weight of a plurality of hydrophobically modified fumed silica particles having a median particle size of between 100 and 4,000 nanometers;
  (ii) 99.95 to 5 percent by weight of a volatile solvent;
  (iii) optionally, 0.001 to 5 percent by weight of a suspending agent;
  (iv) optionally, 0.001 to 5 percent by weight of a functional adjunct; and
  (v) optionally, in balance to 100 percent by weight if present, a propellant;
  wherein said treatment composition when applied to said receptive surface deposits said protective coating on said receptive surface, wherein said protective coating provides dirt- and water-repellency to said receptive surface; and
  wherein the protective coating comprises a non-smooth coating on the receptive surface at least after the treatment composition has been applied to the receptive surface and has substantially dried or set, and wherein said non-smooth coating on the receptive surface includes valleys and peaks and an average height between the valleys and peaks of about 1-2500 nm.

21. The treatment composition of claim 20 which comprises a first and second set of hydrophobically modified fumed silica colloidal particles, each of said first and second sets of hydrophobically modified fumed silica colloidal particles including a plurality of hydrophobically modified fumed silica colloidal particles, each of said first and second sets of hydrophobically modified fumed silica colloidal particles having an average particle size of hydrophobically modified fumed silica colloidal particles, said first set of hydrophobically modified fumed silica colloidal particles having an average particle size that is greater than said average size of said second set of hydrophobically modified fumed silica colloidal particles, said composition including a greater number of hydrophobically modified fumed silica colloidal particles in said second set of colloidal particles than a number of hydrophobically modified fumed silica colloidal particles in said first set of colloidal particles.

22. The treatment composition of claim 20, wherein said suspending agent is selected from the group consisting of polymers, surfactants, and mixtures thereof.

23. The treatment composition of claim 20, wherein said functional adjunct is selected from the group consisting of ultraviolet light absorbers, ultraviolet light blockers, free-radical scavengers, fluorescent whitening agents, colorants, dyes, pigments, photoactive particles, color changing dyes, color fading dyes, bleaching agents, fixative agents, spreading agents, evaporation modifiers, azeotropic cosolvents, stabilizers, perfume, fragrance, odor control agents, anti-static agents, thickeners, and mixtures thereof.

24. The treatment composition of claim 20, wherein said receptive surface comprises a non-porous substrate, porous substrate, and combinations thereof; wherein said detachable coating on said non-porous substrate results in a change of less than 3.0 Delta E units of said surface of said non-porous substrate after application of said coating; and wherein said protective coating on said porous substrate results in a change of less than either a) 3.0 Delta E units and/or (b) 3.0 Delta L units of said surface of said porous substrate after application of said coating.

25. A treatment system for applying and forming a detachable and renewable protective coating on a receptive surface comprising:
  (a) an applicator; and
  (b) a treatment composition for forming a protective coating on said receptive surface comprising:
    i. 0.05 to 5.0 percent by weight of a plurality of hydrophobically modified fumed silica particles having a median particle size of between 100 and 4,000 nanometers;
    ii. 99.95 to 5 percent by weight of a volatile solvent;
    iii. optionally, 0.001 to 5 percent by weight of a suspending agent;
    iv. optionally, 0.001 to 5 percent by weight of a functional adjunct; and
    v. optionally, in balance to 100 percent by weight if present, a propellant;
  (c) optionally, a drying article;
  wherein said treatment composition when applied to said receptive surface deposits said protective coating on said receptive surface, wherein said protective coating provides dirt- and water-repellency to said receptive surface; and
  wherein the protective coating comprises a non-smooth coating on the receptive surface at least after the treatment composition has been applied to the receptive surface and has substantially dried or set, and wherein said non-smooth coating on the receptive surface includes valleys and peaks and an average height between the valleys and peaks of about 1-2500 nm.

26. The treatment system of claim 25 wherein the treatment composition comprises a first and second set of hydrophobically modified fumed silica colloidal particles, each of said first and second sets of hydrophobically modified fumed silica colloidal particles including a plurality of hydrophobically modified fumed silica colloidal particles, each of said first and second sets of hydrophobically modified fumed silica colloidal particles having an average particle size of hydrophobically modified fumed silica colloidal particles, said first set of hydrophobically modified fumed silica colloidal particles having an average particle size that is greater than said average size of said second set of hydrophobically modified fumed silica colloidal particles, said composition including a greater number of hydrophobically modified fumed silica colloidal particles in said second set of colloidal particles than a number of hydrophobically modified fumed silica colloidal particles in said first set of colloidal particles.

27. The treatment system of claim 25 wherein said receptive surface is a non-porous substrate and/or a porous substrate, wherein said coating is substantially transparent and results in a change of less than 3.0 Delta E units to said non-porous substrate and/or results in a change of less than 3.0 Delta L units to said porous substrate, wherein the surface is measured before and after deposition of said coating.

28. The treatment system of claim 25 wherein said applicator comprises a device capable of dispensing said treatment composition in the form of a fine spray comprising a plurality of liquid droplets, and capable of directing said plurality of liquid droplets onto said receptive surface.

29. The treatment system of claim 25 wherein said applicator comprises a pressurized delivery device.

30. The treatment system of claim 25 wherein said drying article is selected from an absorbent article, a drying device, and combinations thereof;
wherein said absorbent article is selected from a woven, non-woven, sponge, polymeric foam, microfiber, paper towel, paper pad, paper towel, cloth, and combinations thereof; wherein said drying device is selected from a compressed gas source, infrared heat generating device, forced air device, battery powered fan, and combinations thereof.

31. The treatment system of claim 25 wherein said applicator comprises a non-pressurized delivery device.

32. A method of forming a detachable and renewable protective coating on a receptive surface comprising the steps of:
(a) applying a treatment composition to said receptive surface, said treatment composition comprising a plurality of hydrophobically modified fumed silica particles colloidally dispersed in a volatile solvent;
(b) allowing said volatile solvent to evaporate from said receptive surface; and
(c) thereby depositing said protective coating on said receptive surface, wherein said protective coating provides dirt- and water-repellency to said receptive surface;
wherein the protective coating comprises a non-smooth coating on the receptive surface at least after the treatment composition has been applied to the receptive surface and has substantially dried or set, and wherein said non-smooth coating on the receptive surface includes valleys and peaks and an average height between the valleys and peaks of about 1-2500 nm.

33. The method of claim 32 wherein the treatment composition comprises a first and second set of hydrophobically modified fumed silica colloidal particles, each of said first and second sets of hydrophobically modified fumed silica colloidal particles including a plurality of hydrophobically modified fumed silica colloidal particles, each of said first and second sets of hydrophobically modified fumed silica colloidal particles having an average particle size of hydrophobically modified fumed silica colloidal particles, said first set of hydrophobically modified fumed silica colloidal particles having an average particle size that is greater than said average size of said second set of hydrophobically modified fumed silica colloidal particles, said composition including a greater number of hydrophobically modified fumed silica colloidal particles in said second set of colloidal particles than a number of hydrophobically modified fumed silica colloidal particles in said first set of colloidal particles.

34. The method of claim 32 wherein said detachable coating is substantially transparent and results in a change of less than 250 Delta Haze units to said receptive surface measured before and after deposition of said coating, as measured by the Chrome Test.

35. A treatment composition for forming a detachable and renewable protective coating on a receptive surface comprising:
(a) 0.05 to 5.0 percent by weight of a plurality of hydrophobically modified fumed silica particles having a median particle size of between 100 and 4,000 nanometers;
(b) 99.95 to 5 percent by weight of a volatile solvent;
(c) optionally, 0.001 to 5 percent by weight of a suspending agent;
(d) optionally, 0.001 to 5 percent by weight of a functional adjunct; and
(e) optionally, in balance to 100 percent by weight if present, a propellant;
wherein said treatment composition when applied to said receptive surface deposits said protective coating on said receptive surface, wherein said protective coating provides dirt- and water-repellency to said receptive surface;
wherein the protective coating comprises a non-smooth coating on the receptive surface at least after the treatment composition has been applied to the receptive surface and has substantially dried or set, and wherein said non-smooth coating on the receptive surface includes valleys and peaks and an average height between the valleys and peaks of about 1-2500 nm.

36. The treatment composition of claim 35 which comprises a first and second set of hydrophobically modified fumed silica colloidal particles, each of said first and second sets of hydrophobically modified fumed silica colloidal particles including a plurality of hydrophobically modified fumed silica colloidal particles, each of said first and second sets of hydrophobically modified fumed silica colloidal particles having an average particle size of hydrophobically modified fumed silica colloidal particles, said first set of hydrophobically modified fumed silica colloidal particles having an average particle size that is greater than said average size of said second set of hydrophobically modified fumed silica colloidal particles, said composition including a greater number of hydrophobically modified fumed silica colloidal particles in said second set of colloidal particles than a number of hydrophobically modified fumed silica colloidal particles in said first set of colloidal particles.

37. The treatment composition of claim 35 wherein said coating is substantially transparent and results in a change of less than 250 Delta Haze units to said receptive surface measured before and after deposition of said coating, as measured by the Chrome Test.

38. A treated article comprising:
(1) a substrate bearing at least one receptive surface; and
(2) a detachable and renewable protective coating deposited onto said receptive surface, wherein said protective coating is formed by the use of a treatment composition comprising:

(a) 0.05 to 5.0 percent by weight of a plurality of hydrophobically modified fumed silica particles having a median particle size of between 100 and 4,000 nanometers;
(b) 99.95 to 5 percent by weight of a volatile solvent;
(c) optionally, 0.001 to 5 percent by weight of a suspending agent;
(d) optionally, 0.001 to 5 percent by weight of a functional adjunct; and
(e) optionally, in balance to 100 percent by weight if present, a propellant;
wherein the protective coating comprises a non-smooth coating on the receptive surface at least after the treatment composition has been applied to the receptive surface and has substantially dried or set, and wherein said non-smooth coating on the receptive surface includes valleys and peaks and an average height between the valleys and peaks of about 1-2500 nm.

39. The treated article of claim 38 wherein the treatment composition comprises a first and second set of hydrophobically modified fumed silica colloidal particles, each of said first and second sets of hydrophobically modified fumed silica colloidal particles including a plurality of hydrophobically modified fumed silica colloidal particles, each of said first and second sets of hydrophobically modified fumed silica colloidal particles having an average particle size of hydrophobically modified fumed silica colloidal particles, said first set of hydrophobically modified fumed silica colloidal particles having an average particle size that is greater than said average size of said second set of hydrophobically modified fumed silica colloidal particles, said composition including a greater number of hydrophobically modified fumed silica colloidal particles in said second set of colloidal particles than a number of hydrophobically modified fumed silica colloidal particles in said first set of colloidal particles.

40. A protective coating on a receptive surface that is formed by the use of a treatment composition comprising:

(a) 0.05 to 5.0 percent by weight of a plurality of hydrophobically modified fumed silica particles having a median particle size of between 100 and 4,000 nanometers;
(b) 99.95 to 5 percent by weight of a volatile solvent;
(c) optionally, 0.001 to 5 percent by weight of a suspending agent;
(d) optionally, 0.001 to 5 percent by weight of a functional adjunct; and
(e) optionally, in balance to 100 percent by weight if present, a propellant;
wherein the protective coating comprises a non-smooth coating on the receptive surface at least after the treatment composition has been applied to the receptive surface and has substantially dried or set, and wherein said non-smooth coating on the receptive surface includes valleys and peaks and an average height between the valleys and peaks of about 1-2500 nm.

41. The protective coating of claim 40 wherein the treatment composition comprises a first and second set of hydrophobically modified fumed silica colloidal particles, each of said first and second sets of hydrophobically modified fumed silica colloidal particles including a plurality of hydrophobically modified fumed silica colloidal particles, each of said first and second sets of hydrophobically modified fumed silica colloidal particles having an average particle size of hydrophobically modified fumed silica colloidal particles, said first set of hydrophobically modified fumed silica colloidal particles having an average particle size that is greater than said average size of said second set of hydrophobically modified fumed silica colloidal particles, said composition including a greater number of hydrophobically modified fumed silica colloidal particles in said second set of colloidal particles than a number of hydrophobically modified fumed silica colloidal particles in said first set of colloidal particles.

* * * * *